United States Patent
Miyamoto et al.

(10) Patent No.: US 10,600,134 B2
(45) Date of Patent: Mar. 24, 2020

(54) POWER IDENTIFICATION DEVICE, POWER IDENTIFICATION METHOD, AND NON-TRANSITORY COMPUTER READABLE MEDIUM STORING POWER IDENTIFICATION PROGRAM

(71) Applicant: NEC CORPORATION, Tokyo (JP)

(72) Inventors: Yoshinori Miyamoto, Tokyo (JP); Toshiya Okabe, Tokyo (JP); Kiyohisa Ichino, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 298 days.

(21) Appl. No.: 15/541,549

(22) PCT Filed: Dec. 22, 2015

(86) PCT No.: PCT/JP2015/006392
§ 371 (c)(1),
(2) Date: Jul. 5, 2017

(87) PCT Pub. No.: WO2016/110920
PCT Pub. Date: Jul. 14, 2016

(65) Prior Publication Data
US 2018/0005325 A1     Jan. 4, 2018

(30) Foreign Application Priority Data
Jan. 6, 2015 (JP) ................................ 2015-000610

(51) Int. Cl.
*G06Q 50/06* (2012.01)
*G01D 4/00* (2006.01)
(Continued)

(52) U.S. Cl.
CPC ............. *G06Q 50/06* (2013.01); *G01D 4/002* (2013.01); *H02J 4/00* (2013.01); *H02J 13/0006* (2013.01); *H02J 13/001* (2013.01); *Y04S 10/60* (2013.01)

(58) Field of Classification Search
None
See application file for complete search history.

(56) References Cited

U.S. PATENT DOCUMENTS

| | | | |
|---|---|---|---|
| 8,674,823 B1 * | 3/2014 | Contario | ................... H02J 1/10 340/333 |
| 2008/0091580 A1 * | 4/2008 | Kremen | ................. G06Q 40/00 705/35 |

(Continued)

FOREIGN PATENT DOCUMENTS

| | | |
|---|---|---|
| JP | 2002-238153 A | 8/2002 |
| JP | 2011-164700 A | 8/2011 |
| JP | 2014-180162 A | 9/2014 |

OTHER PUBLICATIONS

Heiko Thomas in Efficiency of superconducting transmission lines: An analysis withrespect to the load factor and capacity rating, Sep. 6, 2016, 11 pages.*

(Continued)

*Primary Examiner* — Tung S Lau
(74) *Attorney, Agent, or Firm* — Sughrue Mion, PLLC

(57) ABSTRACT

A power identification device at least includes a measurement information acquisition unit for acquiring the amount of power generation by a power producer and the amount of power consumption by a consumer respectively as measurement information, a rule management unit for managing a generation rule for generating attribute information, a distribution rule and a loss rule for distributing the attribute information to the consumer, the attribute information containing a primary attribute related to each of the amount of (Continued)

power generation and the amount of power consumption and an additive attribute related to the amount of power generation, an attribute computation unit for generating the attribute information from the measurement information based on the generation rule and distributing the attribute information from the power producer to the consumer based on the distribution rule and the loss rule, and an attribute output (visualization) unit for outputting the attribute information to the outside.

20 Claims, 22 Drawing Sheets

(51) Int. Cl.
    *H02J 13/00*     (2006.01)
    *H02J 4/00*     (2006.01)

(56) References Cited

U.S. PATENT DOCUMENTS

| | | | | |
|---|---|---|---|---|
| 2008/0091626 A1* | 4/2008 | Kremen | G06Q 40/00 | 705/412 |
| 2011/0202446 A1* | 8/2011 | Kremen | G01D 4/004 | 705/37 |
| 2012/0326503 A1* | 12/2012 | Birkelund | G06Q 10/04 | 307/24 |

OTHER PUBLICATIONS

Reduce Losses in the Transmission and Distribution System, 10 pages, printed on Jul. 2, 2019.*
Electricity Transmission and Distribution, Apr. 2014, 16 pages.*
Electric Transmission Lines, 14 pages, Oct. 2013.*
The Transmission & Distribution of Electricity, 2014, 67 pages.*
Transmission Planning White Paper, Jan. 2014, 101 pages.*
"Tradable Green Certificates", Japan Natural Energy Company Limited, http://www.natural-e.co.jp/green/, Dec. 3, 2014, 1 page.
Written Opinion for PCT/JP2015/006392, dated Mar. 22, 2016 [PCT/ISA/237].
International Search Report for PCT/JP2015/006392, dated Mar. 22, 2016 [PCT/ISA/210].

* cited by examiner

| POWER PRODUCER IDENTIFIER | TIME | AMOUNT OF POWER |
|---|---|---|
| POWER PRODUCER 1 | 2014/1/1 00:00:00 | 10Wh |

Fig. 4A

| CONSUMER IDENTIFIER | TIME | AMOUNT OF POWER |
|---|---|---|
| CONSUMER 1 | 2014/1/1 00:00:00 | 15Wh |

Fig. 4B

| POWER PRODUCER IDENTIFIER | TIME | AMOUNT OF POWER |
|---|---|---|
| POWER PRODUCER 0 | 2014/1/1 00:00:00 | 60/9Wh |

Fig. 5A

| CONSUMER IDENTIFIER | TIME | AMOUNT OF POWER |
|---|---|---|
| CONSUMER 0 | 2014/1/1 00:00:00 | 0Wh |

Fig. 5B bdd ATTRIBUTE INFORMATION

```
                    <block>
                ATTRIBUTE INFORMATION values      #PRIMARY ATTRIBUTE
                         #PRIMARY ATTRIBUTE
                         #ADDITIVE ATTRIBUTE
                         #ADDITIVE ATTRIBUTE
                         #ADDITIVE ATTRIBUTE
                         #ADDITIVE ATTRIBUTE(VALUE GENERATED BY
                                    DISTRUBTION AND LOSS RULES)

AMOUNT OF POWER : Wh
TIME : TIME
POWER PRODUCER IDENTIFIER : NUMBER
CONSUMER IDENTIFIER : NUMBER
POWER SOURCE TYPE : CHARACTER STRING
EXPECTED AMOUNT OF POWER : Wh
```

Fig. 6

| GENERATION CONDITION | GENERATION METHOD | |
|---|---|---|
| POWER PRODUCER IDENTIFIER | ADDITIVE ATTRIBUTE (POWER SOURCE TYPE) | RATIO |
| POWER PRODUCER 0 | ELECTRICITY COMPANY POWER | 100% |
| POWER PRODUCER 1 | WIND POWER | 100% |
| POWER PRODUCER 2 | THERMAL POWER | 80% |
| | WIND POWER | 20% |

Fig. 7

| DISTIRUBTION CONDITION | DISTIRUBTION METHOD | |
|---|---|---|
| POWER PRODUCER IDENTIFIER | CONSUMER IDENTIFIER | DISTRIBUTION RATIO |
| POWER PRODUCER 1 | CONSUMER 1 | 100% |
| POWER PRODUCER 2 | CONSUMER 2 | 60% |
| | CONSUMER 3 | 40% |

Fig. 8

| LOSS CONDITION | | LOSS METHOD |
|---|---|---|
| POWER PRODUCER IDENTIFIER | CONSUMER IDENTIFIER | LOSS RATE |
| ARBITRARY POWER PRODUCER | ARBITRARY CONSUMER | 10% |

Fig. 9

| CONSUMER IDENTIFIER | IP ADDRESS |
|---|---|
| CONSUMER 1 | AAA.BBB.CCC.DDD |

Fig. 10A

| POWER PRODUCER IDENTIFIER | IP ADDRESS |
|---|---|
| POWER PRODUCER 1 | EEE.FFF.GGG.HHH |

Fig. 10B

| | POWER PRODUCER 1 | CONSUMER 1 | CONSUMER 2 | CONSUMER 3 | BRANCH POINT 1 | BRANCH POINT 2 |
|---|---|---|---|---|---|---|
| POWER PRODUCER 1 | 0 | 0 | 0 | 0 | 1 | 0 |
| CONSUMER 1 | 0 | 0 | 0 | 0 | 0 | 1 |
| CONSUMER 2 | 0 | 0 | 0 | 0 | 1 | 0 |
| CONSUMER 3 | 0 | 0 | 0 | 0 | 0 | 1 |
| BRANCH POINT 1 | 1 | 0 | 1 | 0 | 0 | 1 |
| BRANCH POINT 2 | 0 | 1 | 0 | 1 | 1 | 0 |

Fig. 23

| DISTIRUBTION CONDITION | | DISTIRUBTION METHOD | |
|---|---|---|---|
| POWER PRODUCER IDENTIFIER | BRANCH POINT IDENTIFIER | DISTRIBUTION RATIO | DISTRIBUTION DESTINATION IDENTIFIER |
| POWER PRODUCER 1 | BRANCH POINT 1 | 100% | BRANCH POINT 2 |
| | BRANCH POINT 2 | 100% | CONSUMER 1 |
| POWER PRODUCER 2 | BRANCH POINT 1 | 60% | CONSUMER 2 |
| | | 40% | BRANCH POINT 2 |

Fig. 24

| LOSS CONDITION | LOSS METHOD |
|---|---|
| LINK IDENTIFIER | LOSS RATE |
| LINK 1 | 10% |
| LINK 2 | 9% |
| LINK 3 | 10% |
| LINK 4 | 10% |
| LINK 5 | 8% |

Fig. 25

POWER IDENTIFICATION DEVICE, POWER IDENTIFICATION METHOD, AND NON-TRANSITORY COMPUTER READABLE MEDIUM STORING POWER IDENTIFICATION PROGRAM

CROSS REFERENCE TO RELATED APPLICATIONS

This application is a National Stage of International Application No. PCT/JP2015/006392 filed Dec. 22, 2015, claiming priority based on Japanese Patent Application No. 2015-000610 filed Jan. 6, 2015, the contents of all of which are incorporated herein by reference in their entirety.

TECHNICAL FIELD

The present invention relates to a power identification device, a power identification method, and a power identification program.

BACKGROUND ART

Big consumers of power such as factories and companies can select and purchase natural energy today. An example of a service that allows a consumer of power to specify and purchase natural energy is a service that provides new power as described in Non Patent Literature 1 "Tradable Green Certificates" (Japan Natural Energy Company Limited, http://www.natural-e.co.jp/green/, 2014, Dec. 3).

Electricity that is generated by natural energy (renewable energy) such as wind power, solar light and biomass (biological resources) is called "green electricity", and it has "environmental value" that contributes to $CO_2$ emission reduction and has a low impact on the environment, in addition to "value as electricity". "Tradable green certificates" are certificates that certify "environmental value", thus separating "environmental value" from "value as electricity". A consumer of power who specifies and purchases natural energy can receive tradable green certificates in accordance with the performance of power consumption.

CITATION LIST

Non Patent Literature

NPL1: "Tradable Green Certificates", Japan Natural Energy Company Limited, http://www.natural-e.co.jp/green/, 2014, Dec. 3

SUMMARY OF INVENTION

Technical Problem

However, in the case of "tradable green certificates" disclosed in the above-described Non Patent Literature 1, natural energy is allocated to power consumption of a consumer on a monthly or yearly basis based on a paper-based contract. Therefore, a consumer of power cannot grasp the fact that power supply is being performed in real time (for example, on an hourly or minutely basis).

For example, in the case where a consumer of power desires to purchase a power supply which is 100% natural energy, the following issue can occur. The amount of power generation from natural energy such as wind power and mega solar varies with weather conditions. Therefore, in some cases, electric power generated from natural energy is insufficient and the relationship of (the amount of power generation<the amount of power consumption) occurs for a short time such as several minutes; however, a consumer cannot grasp the fact that there is a shortage of power generation. Further, although the shortage of power is offset by another generated power, a consumer cannot grasp the fact that another power is being supplied as well. Another power is electric power owned by a PPS (Power Producer and Supplier) or an electricity company (wheeling service), for example.

Note that a wheeling service is a service provided by an electricity company to a PPS. An electricity company receives generated power from a PPS and delivers (transmits and distributes) power to a consumer and, in accordance with changing demand, sells power when power generation is insufficient and purchases power when power generation is excessive in order to balance power generation and consumption.

Further, in the case where a consumer makes a bulk purchase of natural energy (for example, purchase of 100% of outside small hydroelectric power) from a PPS, the following issue can occur. Because all of power generated from natural energy purchased in bulk by a consumer is owned by that consumer, even when the amount of power generated from natural energy is excessive and the relationship of (the amount of power supply<the amount of power demand) occurs, this consumer cannot grasp the fact that there is an excess of power in spite of that the excess is in the possession of this consumer. Further, although the excess of power is automatically supplied to another consumer, this consumer cannot also grasp the fact that power supply to another consumer is occurring. Another consumer means power purchase by another consumer who holds membership in a PPS or an electricity company.

Exemplary Object of Invention

The present invention has been accomplished to solve the above problems and an exemplary object of the present invention is thus to provide a power identification device, a power identification method, and a power identification program that, when a consumer of power has purchased electric power of one's choice, enable the consumer to grasp the performance of power supply in real time.

Solution to Problem

To solve the above problems, a power identification device, a power identification method, and a power identification program according to exemplary aspects of the present invention mainly employ the following characteristic structure.

(1) A power identification device according to an exemplary aspect of the present invention is a power identification device that identifies performance of power supply from a power producer to a consumer, the device at least including a measurement information acquisition means for acquiring an amount of power generation by the power producer and an amount of power consumption by the consumer from a power generation unit and a consumption unit, respectively, as measurement information at predetermined intervals; a rule management means for managing a generation rule for generating attribute information containing a primary attribute related to each of the amount of power generation and the amount of power consumption and an additive attribute related to the amount of power generation, a distribution rule for distributing the attribute information to the consumer through a transmission line in accordance with the consumer's preferences, and a loss rule for specifying a loss on the transmission line; an attribute computation means for generating the attribute information from the measurement information based on the generation rule and distributing the generated attribute information from the power producer to the consumer through the transmission line based on the distribution rule and the loss rule; and an attribute output means for storing the attribute information and outputting the attribute information to outside.

(2) A power identification method according to an exemplary aspect of the present invention is a power identification method that identifies performance of power supply from a power producer to a consumer, the method at least including a measurement information acquisition step of acquiring an amount of power generation by the power producer and an amount of power consumption by the consumer from a power generation unit and a consumption unit, respectively, as measurement information at predetermined intervals; a rule management step of managing a generation rule for generating attribute information containing a primary attribute related to each of the amount of power generation and the amount of power consumption and an additive attribute related to the amount of power generation, a distribution rule for distributing the attribute information to the consumer through a transmission line in accordance with the consumer's preferences, and a loss rule for specifying a loss on the transmission line; an attribute computation step of generating the attribute information from the measurement information based on the generation rule and distributing the generated attribute information from the power producer to the consumer through the transmission line based on the distribution rule and the loss rule; and an attribute output step of storing the attribute information and outputting the attribute information to outside.

(3) A power identification program according to an exemplary aspect of the present invention performs the power identification method according to the above (2) as a computer executable program.

Advantageous Effects of Invention

In the power identification device, the power identification method, and the power identification program according to the exemplary aspects of present invention, it is possible to produce the following advantageous effects.

In the present invention, attribute information is generated based on a generation rule for generating attribute information containing information about the amounts of power of a power producer and a consumer and information related to the amount of power generation such as a power source type, a distribution rule for distributing the attribute information to the consumer in accordance with the consumer's preferences, and a loss rule for taking a power loss on a transmission line from the power producer to the consumer into consideration, and the generated attribute information is output to the consumer at predetermined intervals. Therefore, when a consumer of power has purchased electric power of one's choice, the consumer can easily and reliably grasp the performance of power supply in substantially real time at predetermined intervals.

Thus, the power identification device according to the exemplary aspects of present invention may be used as a device for presenting the performance of power supply in real time to a subscriber (consumer) of a PPS, an operator or the like in electricity retail operations by an electric power provider such as a PPS.

BRIEF DESCRIPTION OF DRAWINGS

FIG. 4A is a table illustrating, in a table form, an example of measurement information acquired by an attribute computation unit in the first exemplary embodiment of the present invention.

FIG. 4B is a table illustrating, in a table form, an example of measurement information acquired by the attribute computation unit in the first exemplary embodiment of the present invention.

FIG. 5A is a table illustrating, in a table form, an example of virtual measurement information acquired by the attribute computation unit in the first exemplary embodiment of the present invention.

FIG. 5B is a table illustrating, in a table form, an example of virtual measurement information acquired by the attribute computation unit in the first exemplary embodiment of the present invention.

FIG. 6 is a block definition diagram showing an example of block definition of attribute information generated by the attribute computation unit in the first exemplary embodiment of the present invention.

FIG. 7 is a table illustrating, in a table form, an example of a generation rule managed by a rule management unit in the first exemplary embodiment of the present invention.

FIG. 8 is a table illustrating, in a table form, an example of a distribution rule managed by the rule management unit in the first exemplary embodiment of the present invention.

FIG. 9 is a table illustrating, in a table form, an example of a loss rule managed by the rule management unit in the first exemplary embodiment of the present invention.

FIG. 10A is a table illustrating, in a table form, an example of information that associates an IP address and an identifier of a consumption unit in the first exemplary embodiment of the present invention.

FIG. 10B is a table illustrating, in a table form, an example of information that associates an IP address and an identifier of a power generation unit in the first exemplary embodiment of the present invention.

FIG. 23 is a table illustrating, in a table form, an example of topology information for defining a transmission line model in the third exemplary embodiment of the present invention.

FIG. 24 is a table illustrating, in a table form, an example of a distribution rule managed by a rule management unit in the third exemplary embodiment of the present invention.

FIG. 25 is a table illustrating, in a table form, an example of a loss rule managed by the rule management unit in the third exemplary embodiment of the present invention.

DESCRIPTION OF EMBODIMENTS

Figure 1:
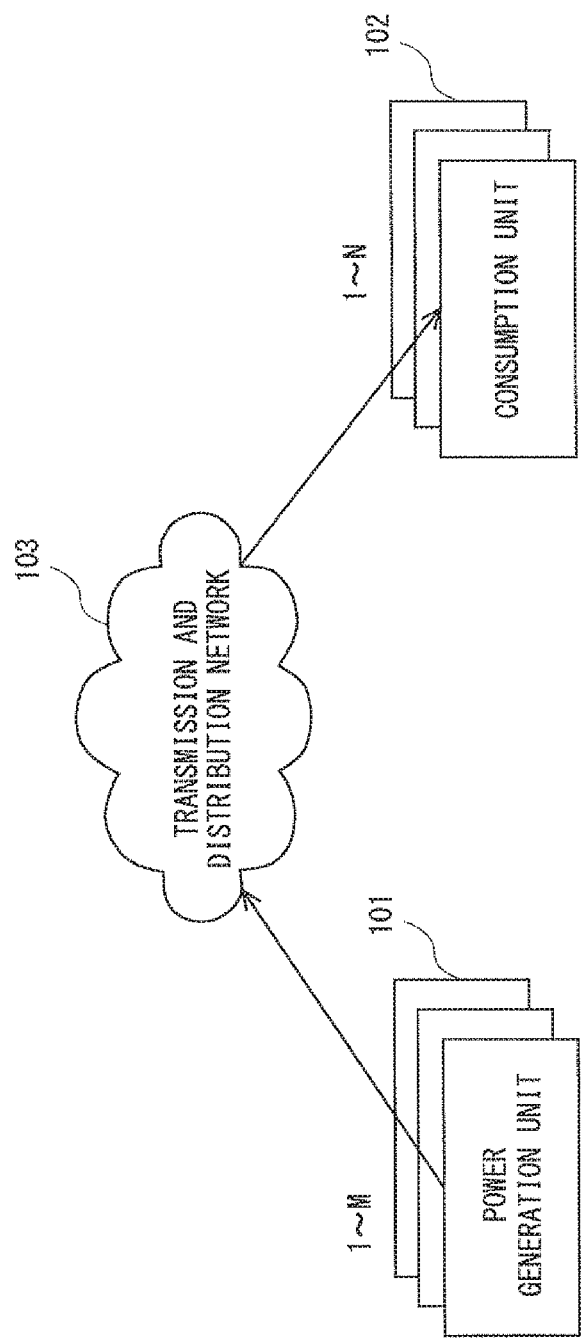
FIG. 1 is a connection schematic diagram showing an example of a connection structure of a power generation unit, a consumption unit and a transmission and distribution network for which a power identification device in a first exemplary embodiment of the present invention is configured.

Preferred exemplary embodiments of a power identification device, a power identification method, and a power identification program according to the present invention are described hereinafter with reference to the accompanying drawings. Note that, although a power identification device and a power identification method according to exemplary embodiments of the present invention are described hereinbelow, the power identification method may be implemented by causing a computer to execute a power identification program. Further, the power identification program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, DVD-ROM (Digital Versatile Disc Read Only Memory), DVD-R (DVD Recordable)), DVD-R DL (DVD-R Dual Layer)), DVD-RW (DVD ReWritable)), DVD-RAM), DVD+R), DVR+R DL), DVD+RW), BD-R (Blu-ray (registered trademark) Disc Recordable)), BD-RE (Blu-ray (registered trademark) Disc Rewritable)), BD-ROM), and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line. Further, in each of the drawings, the same elements are denoted by the same reference symbols, and redundant description thereof is omitted as appropriate in the subsequent drawings. Note that the reference symbols in each of the drawings are shown by way of illustration only for easier understanding and are not intended to limit the invention to those illustrated in the drawings.

When a consumer of power has purchased electric power of one's choice, the consumer can easily grasp the performance of power supply in real time (for example, on a minutely basis).

First Exemplary Embodiment

[Configuration Example of First Exemplary Embodiment]

A configuration example of a power identification device according to a first exemplary embodiment of the present invention is described hereinafter in detail with reference to the drawings.

FIG. 1 is a connection schematic diagram showing an example of a connection structure of a power generation unit, a consumption unit and a transmission and distribution network for which a power identification device in the first exemplary embodiment of the present invention is configured. As shown in FIG. 1, the power identification device in the first exemplary embodiment of the present invention is configured for a power transmission and distribution system in which M number of (1 to M) power generation units 101 that generate electric power and N number of (1 to N) consumption units 102 that consume electric power are connected through a transmission and distribution network 103. Each block shown in FIG. 1 is a functional structure, not a hardware structure.

As indicated by the arrow in FIG. 1, the M number of power generation units 101 supply power to the N number of consumption units 102 through the transmission and distribution network 103. Each of the power generation units 101 includes a power generation device that generates electric power and supplies the generated electric power, an electric storage device that supplies stored electric power and the like, although they are not shown. Each of the power generation units 101 includes a power generation information output means, and it measures the amount of power generated by itself and, in response to a request from the outside, outputs the amount of power generation and the measurement time to a requestor. Each of the power generation units 101 may include a plurality of power generation devices or a plurality of electric storage devices, or each of the power generation units 101 may include a combination of one or more power generation devices and one or more electric storage devices. Note that each of the power generation units 101 may be owned by an electricity company or owned by another company or an individual.

On the other hand, each of the N number of consumption units 102 includes various loads that consume power received through the transmission and distribution network 103, an electric storage device that stores power received through the transmission and distribution network 103 and the like. Each of the consumption units 102 includes a consumption information output means, and it measures the amount of power consumed by itself and, in response to a request from the outside, outputs the amount of power consumption and the measurement time to a requestor. Each of the consumption units 102 may include a plurality of loads or a plurality of electric storage devices, or may include a combination of one or more loads and one or more electric storage devices. Note that the consumer that owns each of the consumption units 102 may be a company or an individual.

The transmission and distribution network 103 may have any structure, and it is not limited to a specific structure as long as it can distribute power so that power supplied from each of the M number of power generation units 101 can be received by each of the N number of consumption units 102. The transmission and distribution network 103 includes one or a plurality of distribution devices for distributing power and the like.

Figure 2:
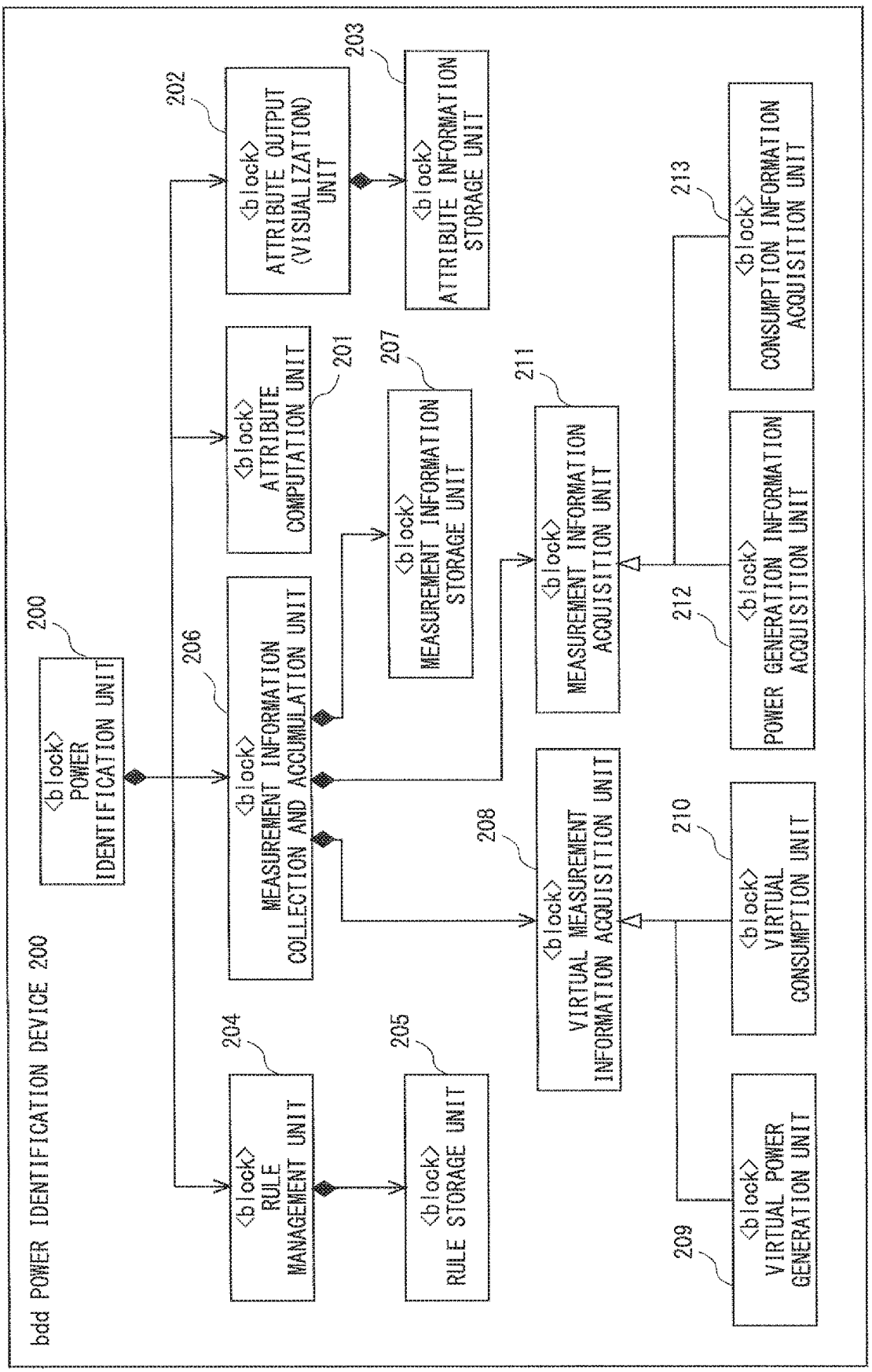
FIG. 2 is a block definition diagram showing an example of functional block definition of the power identification device in the first exemplary embodiment of the present invention.

A configuration example of a power identification device in the first exemplary embodiment of the present invention is described hereinafter with reference to the block definition diagram of FIG. 2. FIG. 2 is a block definition diagram showing an example of functional block definition of the power identification device in the first exemplary embodiment of the present invention. Note that each of the functional blocks shown in FIG. 2 is a functional structure, not a hardware structure. Further, the arrow shown in each functional block of FIG. 2 indicates the connection between functional blocks.

As shown in FIG. 2, a power identification device 200 (i.e. power identification unit 200) at least includes functional blocks of: an attribute computation unit 201, an attribute output (visualization) unit 202, an attribute information storage unit 203, a rule management unit 204, a rule storage unit 205, a measurement information collection and accumulation unit 206, a measurement information storage unit 207, a virtual measurement information acquisition unit 208, a virtual power generation unit 209, a virtual consumption unit 210, a measurement information acquisition unit 211, a power generation information acquisition unit 212, and a consumption information acquisition unit 213.

In FIG. 2, the attribute computation unit 201, the attribute output (visualization) unit 202, the rule management unit 204 and the measurement information collection and accumulation unit 206 are component parts of the power identification device 200 (i.e. power identification unit 200). Further, the attribute information storage unit 203 is a component part of the attribute output (visualization) unit 202, and the rule storage unit 205 is a component part of the rule management unit 204. Further, the measurement information storage unit 207, the virtual measurement information acquisition unit 208 and the measurement information acquisition unit 211 are component parts of the measurement information storage unit 206. The virtual power generation unit 209 and the virtual consumption unit 210 are generalization blocks of the virtual measurement information acquisition unit 208, and the power generation information acquisition unit 212 and the consumption information acquisition unit 213 are generalization blocks of the measurement information acquisition unit 211.

Figure 3:
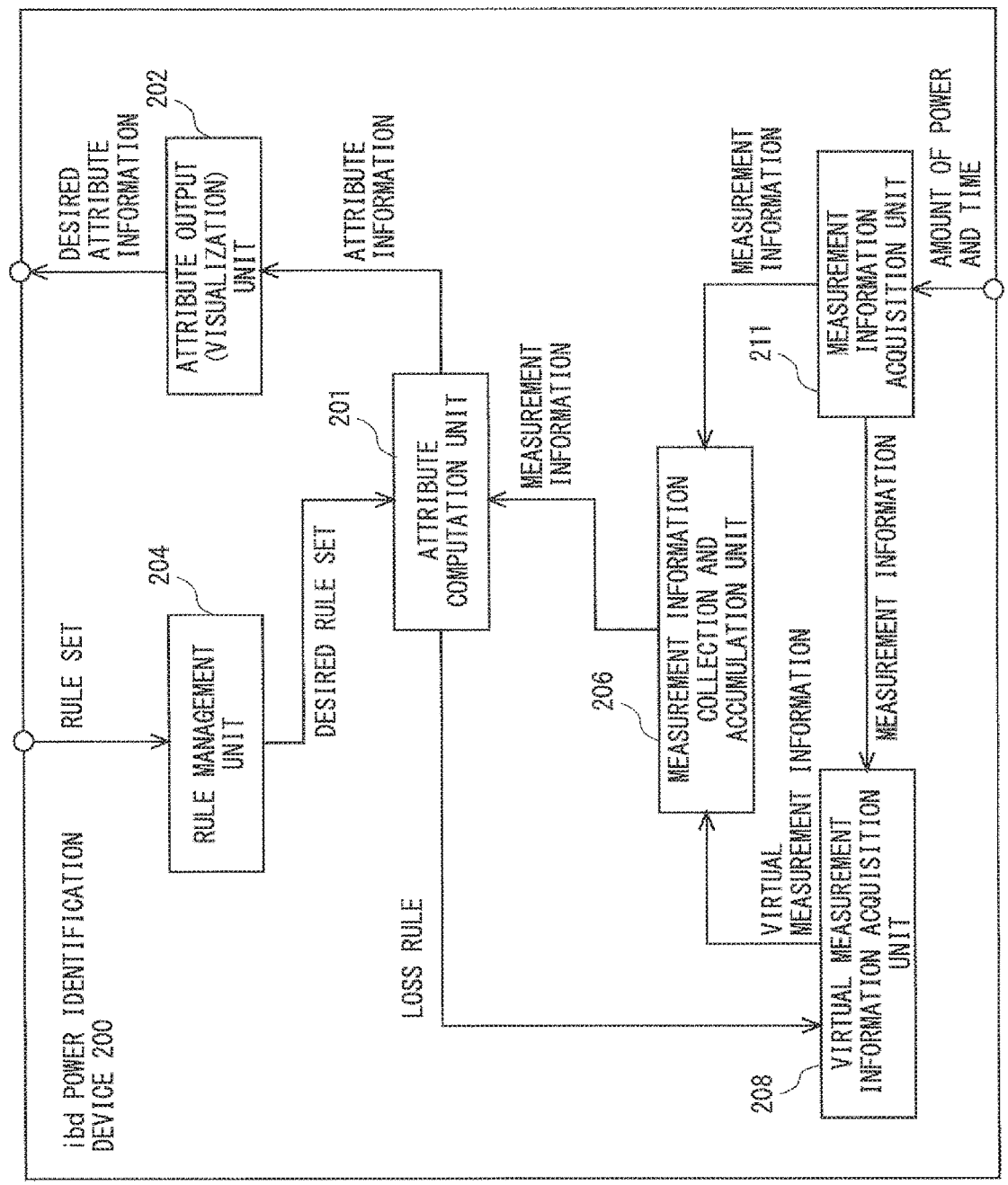
FIG. 3 is an internal block diagram showing an example of an internal block of the power identification device in the first exemplary embodiment of the present invention.

An example of the block configuration of the power identification device 200 of which functional blocks are defined in FIG. 2 is described hereinafter with reference to FIG. 3. FIG. 3 is an internal block diagram showing an example of an internal block of the power identification device in the first exemplary embodiment of the present invention. FIG. 3 also shows the flow of information between the functional blocks of the power identification device 200. Hereinafter, each of the functional blocks of the power identification device 200 is described with reference to the internal block diagram of FIG. 3.

<Attribute Computation Unit 201>

The attribute computation unit 201 receives measurement information from the measurement information collection and accumulation unit 206, receives a desired rule set (a generation rule, a distribution rule and a loss rule) from the rule management unit 204, generates attribute information based on the received measurement information and rule set, passes the generated attribute information to the attribute output (visualization) unit 202 and further passes the loss rule to the virtual measurement information acquisition unit 208. This is described in more detail below.

The attribute computation unit 201 acquires the measurement information from the measurement information collection and accumulation unit 206 at predetermined intervals such as every 1 minute, for example. The measurement information is information that contains the amount of power generation, the amount of power consumption, and measurement times acquired by the measurement information acquisition unit 211. Note that information acquired by the attribute computation unit 201 includes not only the measurement information but also virtual measurement information acquired by the virtual measurement information acquisition unit 208. Each of the measurement information and the virtual measurement information is information that contains identifiers, the amounts of power, and measurement times.

Specifically, the measurement information is information that contains identifiers for identifying each of the power generation units 101 and each of the consumption units 102 shown in FIG. 1, the actual measured amounts of power acquired from the power generation unit 101 and the consumption unit 102 (the amount of power generated by each power generation unit 101, the amount of power consumed by each consumption unit 102), and the measurement times at which the amounts of power are measured. Further, the virtual measurement information is, as described in detail later, virtual measurement information (simulated data) related to a virtual power producer and a virtual consumer generated by the virtual measurement information acquisition unit 208, and it is information that contains identifiers for identifying a virtual power producer and a virtual consumer, the virtual amounts of power in the virtual power producer and the virtual consumer (the virtual amount of power generated by each virtual power producer, the virtual amount of power consumed by each virtual consumer), and the virtual measurement times at which the virtual amounts of power are measured.

The attribute computation unit 201 may request and acquire the measurement information from the measurement information collection and accumulation unit 206 at predetermined intervals such as every 1 minute, or it may receive a notice (measurement information) autonomously transmitted from the measurement information collection and accumulation unit 206 at predetermined intervals such as every 1 minute. Note that, a communication time for acquiring the measurement information from the power generation unit 101 and the consumption unit 102, or a wait time for waiting for a predetermined time to acquire the measurement information from all of the power generation units 101 and the consumption units 102 at predetermined intervals such as every 1 minute in consideration of a time lag between the power identification device 200 and the power generation unit 101 or the consumption unit 102 may be set.

A specific example of the measurement information which is acquired by the attribute computation unit 201 from the measurement information acquisition unit 211 that has acquired actual measured values from each of the power generation units 101 and each of the consumption units 102 is described hereinafter. FIGS. 4A and 4B are tables illustrating, in a table form, an example of the measurement information acquired by the attribute computation unit 201 in the first exemplary embodiment of the present invention. The example of FIG. 4A shows that, in the measurement information related to a power producer, the power producer identifier is a power producer 1, the time at which the amount of power generation is measured is 2014/1/1 00:00:00, and the amount of power generation is 10 Wh. The example of FIG. 4B shows that, in the measurement information related to a consumer, the consumer identifier is a consumer 1, the time at which the amount of power consumption is measured is 2014/1/1 00:00:00, and the amount of power consumption is 15 Wh.

A specific example of the virtual measurement information which is acquired by the attribute computation unit 201 from the virtual measurement information acquisition unit 208 is described hereinafter. FIGS. 5A and 5B are tables illustrating, in a table form, an example of the virtual measurement information acquired by the attribute computation unit 201 in the first exemplary embodiment of the present invention. The example of FIG. 5A shows that, in the virtual measurement information of an electricity company (power purchase), the power producer identifier is a power producer 0, the time at which the virtual amount of power generation (power purchase) is measured is 2014/1/1 00:00:00, and the virtual amount of power generation (power purchase) is 60/9 Wh. The example of FIG. 5B shows that, in the virtual measurement information of an electricity company (power selling), the consumer identifier is a consumer 0, the time at which the virtual amount of power consumption (power selling) is measured is 2014/1/1 00:00:00, and the virtual amount of power consumption (power selling) is 0 Wh. The virtual measurement information is, as described above, virtual measurement information (simulated data) generated in the virtual measurement information acquisition unit 208, and it means information related to the amount of power for offsetting a difference (deviation) in the amount of power between the sum of the amount of power generation supplied from a power producer and the sum of the amount of power consumption consumed by a consumer.

Further, the attribute computation unit 201 generates attribute information based on the measurement information (including the virtual measurement information) and the generation rule, determines distribution of the generated attribute information to a consumer (an owner of the consumption unit 102) based on the distribution rule and the loss rule, and passes the generated attribute information to the attribute output (visualization) unit 202. The generation rule is a rule that specifies information about the details of attributes for generating the attribute information in accordance with the amount of power generation acquired by the measurement information acquisition unit 211 and, when adding a plurality of attributes, specifies the ratio and the amount of each attribute. Further, the distribution rule is a rule that specifies the ratio and the amount of distribution in accordance with consumer preferences when the attribute information is being distributed to a consumer and delivered to an element that consumes power such a load. Further, the loss rule is a rule that specifies the ratio and the amount of loss of power generation in the attribute information on a transmission line (a transmission line for transmitting and distributing power) when the attribute information is being transmitted from a power producer (an owner of the power generation unit 101) to a consumer. The details of each rule are described later.

The attribute information which is generated by the attribute computation unit 201 is described hereinafter with reference to FIG. 6. FIG. 6 is a block definition diagram showing an example of a block definition of the attribute information generated by the attribute computation unit 201 in the first exemplary embodiment of the present invention. As shown in FIG. 6, the attribute information is information that contains both a primary attribute at least containing information about the amount of generated power to be supplied to a consumer (in the format of Wh) and a time when the amount of generated power is measured (in the format of year, month, day, hours, minutes and seconds), and an additive attribute containing any one or a plurality of information items about the power source type of power to be supplied (in the format of a character string), the expected amount of power consumed by a consumer (in the format of Wh), a power producer identifier (in the format of a number), and a consumer identifier (in the format of a number).

Note that the expected amount of power is a value that is generated by applying the distribution rule and the loss rule, which are described later, and it is information indicating the amount of power that is expected to be distributed to a consumer in accordance with the consumer's preferences. A difference between the amount of power generation, which is the primary attribute of the attribute information, and the expected amount of power, which is the additive attribute of the attribute information, indicates a deviation between the performance of power supply (the amount of power generation in the attribute information) and the expected value (the expected amount of power). Such a deviation arises due to the occurrence of a situation where the amount of power consumption by a consumer (consumer measurement information) is smaller than the amount of power generation in the attribute information that is distributed to the consumer by the distribution rule and the loss rule.

Further, the attribute computation unit 201 passes the generated attribute information to the attribute output (visualization) unit 202 and further passes the applied loss rule to the virtual measurement information acquisition unit 208.

<Attribute Output (Visualization) Unit 202>

The attribute output (visualization) unit 202 receives the attribute information from the attribute computation unit 201, and stores the received attribute information into the attribute information storage unit 203 defined in FIG. 2. Further, in response to a request from the outside, the attribute output (visualization) unit 202 outputs the attribute information stored in the attribute information storage unit 203 to a requestor. The attribute information may be output to a requestor in the form of numerical values, text, graphs and the like, although not limited thereto.

An outside requestor is a consumer, an operator (an owner or an administrator of the power identification device 200), a power producer, another third-party system (an application or system which uses the attribute information) or the like, and the attribute information is output to one or a plurality of those requestors. For example, in the case where the measurement information illustrated in FIGS. 4A and 4B is acquired, when a consumer with the amount of power consumption of 15 Wh, which is the consumer 1, requests the attribute information that is allocated to this consumer at the time 2014/1/1 00:00:00, the attribute output (visualization) unit 202 has received from the attribute computation unit 201 two pieces of attribute information: the attribute information where "the amount of power", which is the amount of power supplied from the power producer 1 that generates power by wind, for example, indicates 10 Wh and "the power source type" indicates wind power, and the attribute information where "the amount of power", which is the amount of power supplied from the electricity company power, for example, indicates 5 Wh and "the power source type" indicates electricity company power, as the attribute information illustrated in FIG. 6. Therefore, the attribute output (visualization) unit 202 converts the two attribute information received from the attribute computation unit 201 to visualized information, and outputs the information to the consumer, which is the consumer 1. The consumer, which is the consumer 1, receives the two pieces of attribute information from the power identification device 200 and can thereby grasp the performance of power supply immediately (in real time) after request. To be specific, the consumer, which is the consumer 1, can grasp in real time the fact that 10 Wh is wind-generated power and the remaining 5 Wh is electricity company power, as a breakdown of the amount of power consumption by the consumer 1.

<Rule Management Unit 204>

The rule management unit 204 receives a rule set composed of the generation rule, the distribution rule and the loss rule from the outside, and stores the received rule set into the rule storage unit 205 defined in FIG. 2. The outside is a consumer, an operator, a power producer, another third-party system (an application or system which generates the rule) or the like. Further, the rule management unit 204 reads the rule set stored in the rule storage unit 205, and passes the read rule set composed of the generation rule, the distribution rule and the loss rule as a desired rule set to the attribute computation unit 201. Examples of the generation rule, the distribution rule and the loss rule that constitute the rule set are described hereinbelow.

(Generation Rule)

The generation rule is a rule that specifies a generation condition and a generation method of attribute information, and specifies to generate the attribute information by using the generation method that is specified corresponding to the generation condition when the specified generation condition is matched. For example, the generation condition specifies a power producer identifier, and the generation method specifies the details of attributes for generating the attribute information in accordance with the amount of power generation acquired by the power generation information acquisition unit 212 defined in FIG. 2 and, when adding a plurality of attributes, specifies the ratio and the amount of a plurality of attributes.

FIG. 7 shows an example of the generation rule. FIG. 7 is a table illustrating, in a table form, an example of the generation rule managed by the rule management unit 204 in the first exemplary embodiment of the present invention. The generation rule illustrated in FIG. 7 shows the case where the generation condition is information that specifies a power producer identifier in the additive attribute of the attribute information in FIG. 6, and the generation method is information that specifies the ratio of the power source type in the additive attribute of the attribute information in FIG. 6.

For example, in the generation rule illustrated in FIG. 7, in the case of the power producer whose power producer identifier as the generation condition is the power producer 0, it is specified as the generation method of the attribute information that the power source type in the additive attribute of the attribute information is "electricity company power", and its ratio is 100% (the entire amount of power supplied by the power producer 0 is electricity company power in the measurement information). Further, in the case of the power producer whose power producer identifier is the power producer 1, it is specified as the generation method of the attribute information that the power source type in the additive attribute of the attribute information is "wind power", and its ratio is 100% (the entire amount of power supplied by the power producer 1 is wind-generated power in the measurement information). Furthermore, in the case of the power producer whose power producer identifier is the power producer 2, it is specified as the generation method of the attribute information that two pieces of attribute information are generated corresponding to two power source types, and the ratio of the power source type "thermal power" in the additive attribute of the attribute information is 80% in one attribute information, and the ratio of the power source type "wind power" in the additive attribute of the attribute information is 20% the other attribute information.

(Distribution Rule)

The distribution rule is a rule that specifies a distribution condition and a distribution method of attribute information, and specifies to distribute the attribute information by using the distribution method that is specified corresponding to the distribution condition when the specified distribution condition is matched. For example, the distribution condition specifies a power producer identifier for identifying a power producer, and the distribution method specifies information that specifies a consumer identifier for identifying a consumer and specifies the ratio and the amount of distribution of attribute information in accordance with the consumer's preferences.

FIG. 8 shows an example of the distribution rule. FIG. 8 is a table illustrating, in a table form, an example of the distribution rule managed by the rule management unit 204 in the first exemplary embodiment of the present invention. The distribution rule illustrated in FIG. 8 shows the case where the distribution condition is information that specifies a power producer identifier in the additive attribute of the attribute information in FIG. 6, and the distribution method is information that specifies a consumer identifier in the additive attribute of the attribute information in FIG. 6 and information that specifies the ratio of distributing power from the power producer identified by the power producer identifier to the consumer identified by that consumer identifier.

For example, in the distribution rule illustrated in FIG. 8, in the case of the power producer whose power producer identifier as the distribution condition is the power producer 1, it is specified as the distribution method of the attribute information that the distribution ratio to the consumer whose consumer identifier in the additive attribute of the attribute information is the consumer 1 is 100% (the entire power indicated by the power value in the attribute information is distributed to the consumer 1). Further, in the case of the power producer whose power producer identifier is the power producer 2, it is specified as the distribution method of the attribute information that power is distributed to two consumers, and the distribution ratio to the consumer whose consumer identifier in the additive attribute of the attribute information is the consumer 2 is 60% of the power value in the attribute information, and the distribution ratio to the consumer whose consumer identifier in the additive attribute of the attribute information is the consumer 2 is 40% of the power value in the attribute information.

(Loss Rule)

The loss rule is a rule that specifies a loss condition and a loss method of attribute information, and specifies to subtract the amount of power generation in the attribute information by using the loss method that is specified corresponding to the loss condition when the specified loss condition is matched. For example, the loss condition specifies a power producer identifier and a consumer identifier, and the loss method specifies the rate and amount of loss in the amount of power in the attribute information on a transmission line when transmitting power indicated by the power value in the attribute information from the power producer identified by that power producer identifier to the consumer identified by that consumer identifier.

FIG. 9 shows an example of the loss rule. FIG. 9 is a table illustrating, in a table form, an example of the loss rule managed by the rule management unit 204 in the first exemplary embodiment of the present invention. In the loss rule illustrated in FIG. 8, the loss condition is information that specifies the power producer identifier and the consumer identifier in the additive attribute of the attribute information in FIG. 6, and it is specified as the loss method that the loss rate in the attribute information is fixed to 10% in a combination of an arbitrary power producer and an arbitrary consumer, which is, in any combination of a power producer and a consumer.

<Measurement Information Collection and Accumulation Unit 206>

The measurement information collection and accumulation unit 206 receives the measurement information from all of the power generation units 101 and all of the consumption units 102 from the measurement information acquisition unit 211 at predetermined intervals such as every 1 minute, and stores the received measurement information into the measurement information storage unit 207 defined in FIG. 2. The measurement information is information related to identifiers for identifying a power producer and a consumer, the amount of power generation and the amount of power consumption, and measurement times when those amounts of power are measured.

The measurement information collection and accumulation unit 206 may request and acquire the measurement information from the measurement information acquisition unit 211 at predetermined intervals such as every 1 minute, or it may receive a notice (measurement information) autonomously transmitted from the measurement information acquisition unit 211 at predetermined intervals such as every 1 minute. Note that, as described earlier, a communication time for the measurement information acquisition unit 211 to collect the measurement information (information about the identifier, the amount of power and the time) from the power generation unit 101 and the consumption unit 102, or a wait time for waiting for a predetermined time to acquire the measurement information from all of the power generation units 101 and the consumption units 102 at predetermined intervals such as every 1 minute in consideration of a time lag between the power identification device 200 and the power generation unit 101 or the consumption unit 102 may be set.

Further, in addition to the measurement information, the measurement information collection and accumulation unit 206 receives virtual measurement information from the virtual measurement information acquisition unit 208 at predetermined intervals such as every 1 minute, and stores the received virtual measurement information into the measurement information storage unit 207 defined in FIG. 2. The virtual measurement information is information similar to the measurement information described above, and it is information about identifiers for identifying a virtual power producer and a virtual power producer, the virtual amount of power generation and the virtual amount of power consumption, and the virtual measurement times at which those virtual amounts of power are measured.

The measurement information collection and accumulation unit 206 may request and acquire the virtual measurement information from the virtual measurement information acquisition unit 208 at predetermined intervals such as every 1 minute, or it may receive a notice (measurement information) autonomously transmitted from the virtual measurement information acquisition unit 208 at predetermined intervals such as every 1 minute.

Further, the measurement information collection and accumulation unit 206 passes the measurement information stored in the measurement information storage unit 207 to the attribute computation unit 201. The measurement information to be passed to the attribute computation unit 201 is both of the measurement information which is the actual measured value acquired from the measurement information acquisition unit 211 and the virtual measurement information acquired from the virtual measurement information acquisition unit 208.

<Virtual Measurement Information Acquisition Unit 208>

The virtual measurement information acquisition unit 208 receives the loss rule from the attribute computation unit 201 and receives the measurement information from the measurement information acquisition unit 211, generates the virtual measurement information based on the received loss rule and the measurement information, and passes the generated virtual measurement information to the measurement information collection and accumulation unit 206. The derails are as follows.

The virtual measurement information acquisition unit 208 first receives the loss rule from the attribute computation unit 201. Further, the virtual measurement information acquisition unit 208 receives the measurement information from the measurement information acquisition unit 211 at predetermined intervals such as every 1 minute.

The virtual measurement information acquisition unit 208 may request and acquire the measurement information from the measurement information acquisition unit 211 at predetermined intervals such as every 1 minute, or it may receive a notice (measurement information) autonomously transmitted from the measurement information acquisition unit 211 at predetermined intervals such as every 1 minute. Note that, as described earlier, a communication time for the measurement information acquisition unit 211 to collect the measurement information (information about the identifier, the amount of power and the time) from the power generation unit 101 and the consumption unit 102, or a wait time for waiting for a predetermined time to acquire the measurement information from all of the power generation units 101 and the consumption units 102 at predetermined intervals such as every 1 minute in consideration of a time lag between the power identification device 200 and the power generation unit 101 or the consumption unit 102 may be set.

When the virtual measurement information acquisition unit 208 acquires the loss rule and the measurement information, it generates the virtual measurement information based on the acquired loss rule and measurement information. For example, when the acquired loss rule specifies that the loss rate is fixed to 10% for any combination of a power producer and a consumer as illustrated in FIG. 9, and the acquired measurement information is the information illustrated in FIGS. 4A and 4B (information indicating that the power producer identifier is the power producer 1, the amount of power generation measured at the time 2014/1/1 00:00:00 is 10 Wh, the consumer identifier is the consumer 1, and the amount of power consumption measured at the time 2014/1/1 00:00:00 is 15 Wh), the virtual measurement information is generated in the following procedure.

(Step A1):

First, the sum Psum of the amounts of power generated by the power producer 1 is calculated from the measurement information of the power producer whose power producer identifier is the power producer 1.

(Step A2):

By applying the loss rule (loss rate of 10%) to the amount of power Psum (Psum=10 Wh in the case of FIG. 4A) generated by the power producer 1 which is calculated in the above step (Step A1), the amount of power (Psum×9/10: Psum×9/10=10×9/10 Wh in the case of FIG. 4A) supplied from the power producer 1 to the consumer whose consumer identifier is the consumer 1 at the measurement time is calculated.

(Step A3):

Then, the sum Csum (Csum=15 Wh in the case of FIG. 4B) of the amount of power consumed by the consumer 1 is calculated from the measurement information of the consumer whose consumer identifier is the consumer 1.

(Step A4):

Based on a result of comparing the amount of power Csum consumed by the consumer 1 which is calculated in the above step (Step A3) with the amount of power (the amount of power supplied to the consumer 1) obtained by subtracting a loss by the loss rule from the amount of power Psum generated by the power producer 1 which is calculated in the above step (Step A2), virtual measurement information (shortage of power generation Csum−Psum×9/10=15−10×9/10=6 Wh in the case of FIGS. 4A and 4B) for offsetting the excess or shortage of power generation by the power producer 1 is generated. Specifically, the virtual measurement information acquisition unit 208 generates the following information.

(a) In Case of "(Psum−Loss)≥Csum"

This is the case where the amount of power supplied from the power producer 1 to the consumer 1 is equal to or more than the amount of power consumed by the consumer 1, and the virtual measurement information acquisition unit 208 generates the virtual measurement information of the virtual power producer indicating that the amount of power sold by an electricity company is 0 Wh which is generated by the virtual power generation unit 209 defined in FIG. 2.

Further, a difference between the sum of the amount of power of the power producer 1 to which the loss rule has been applied and the sum of the amount of power of the consumer 1 (i.e., the excess of power generation=(Psum−loss)−Csum) as the excess of power generation. After that, the virtual measurement information acquisition unit 208 generates the virtual measurement information of the virtual consumer that contains the excess of power generation by the power producer 1, as the information indicating the amount of power purchased by an electricity company which is generated by the virtual consumption unit 210 defined in FIG. 2.

(b) In Case of "(Psum−loss)<Csum"

This is the case where the amount of power supplied from the power producer 1 to the consumer 1 is less than the amount of power consumed by the consumer 1, and the virtual measurement information acquisition unit 208 calculates a difference between the sum of the amount of power of the power producer 1 to which the loss rule has been applied and the sum of the amount of power of the consumer 1 (i.e., the shortage of power generation=Csum−(Psum−loss): 6 Wh in the case of FIGS. 4A and 4B as described above) as the shortage of power generation.

Then, the amount of power of the virtual power producer for offsetting the shortage of power generation is calculated. The amount of power of the virtual power producer (i.e., the amount of power sold by an electricity company) should be the amount of power to which a loss of 10% is supplemented (the amount of power of the virtual power producer=the shortage of power generation×10/9:6×10/9 Wh in the case of FIGS. 4A and 4B) because the loss fixed value of 10% by the loss rule occurs until the power is supplied to the consumption unit 102 of the consumer 1.

After that, the virtual measurement information acquisition unit 208 generates the virtual measurement information of the virtual power producer that contains the calculated amount of power of the virtual power producer as the information indicating the amount of power sold by an electricity company, which is generated by the virtual power generation unit 209 defined in FIG. 2. Further, the virtual measurement information acquisition unit 208 generates the virtual measurement information of the virtual power producer indicating that the amount of power purchased by an electricity company is 0 Wh, which is generated by the virtual consumption unit 210 defined in FIG. 2.

After generating the virtual measurement information, the virtual measurement information acquisition unit 208 passes the generated virtual measurement information to the measurement information collection and accumulation unit 206.

<Measurement Information Acquisition Unit 211>

The measurement information acquisition unit 211 acquires the amount of power and the measurement time at predetermined intervals such as every 1 minute from each of the power generation units 101 and each of the consumption units 102 shown in FIG. 1 through a communication network such as the Internet, for example.

The measurement information acquisition unit 211 may request and acquire information about the amount of power and the measurement time from each of the power generation units 101 and each of the consumption units 102 at predetermined intervals such as every 1 minute, or it may receive a notice of information about the amount of power and the measurement time that is autonomously transmitted from each of the power generation units 101 and each of the consumption units 102 at predetermined intervals such as every 1 minute as described above. Note that, as described above, a communication time for collecting the information about the amount of power and the measurement time from the power generation unit 101 and the consumption unit 102, or a wait time for waiting for a predetermined time to acquire the information about the measured value of the amount of power and the measurement time from all of the power generation units 101 and the consumption units 102 in consideration of a time lag between the power identification device 200 and the power generation unit 101 or the consumption unit 102 may be set.

Further, in order to identify the power generation units 101 and the consumption units 102 from which the information about the amount of power and the measurement time are acquired, the measurement information acquisition unit 211 adds the identifiers of the power generation units 101 and the consumption units 102 to the collected information about the amount of power and the measurement time and thereby generates the measurement information. In the case where it is necessary to more clearly describe the definition of the measurement information, the measurement information generated based on the information acquired from the power generation unit 101 is referred to as "power producer measurement information", and the measurement information generated based on the information acquired from the consumption unit 102 is referred to as "consumer measurement information" hereinbelow.

Note that the measurement information acquisition unit 211 prestores the addresses on a communication network, such as IP (Internet Protocol) addresses on the Internet, of the power generation units 101 and the consumption units 102 and the identifiers of the power generation units 101 and the consumption units 102 in association with each other. FIGS. 10A and 10B are tables illustrating, in a table form, an example of information that associates the IP addresses and the identifiers of the power generation units 101 and the consumption units 102 in the first exemplary embodiment of the present invention.

In the association tables shown in FIGS. 10A and 10B, FIG. 10A shows an example in which the consumer identifier: Consumer 1 and the IP address: AAA.BBB.CCC.DDD are associated with each other, and FIG. 10B shows an example in which the power producer identifier: Power producer 1 and the IP address: EEE.FFF.GGG.HHH are associated with each other. When the measurement information acquisition unit 211 accesses the power generation units 101 or the consumption units 102, it extracts the IP address of the power generation unit 101 or the consumption unit 102 that is set in the association tables shown in FIGS. 10A and 10B and uses it as the address information on the Internet.

Further, the measurement information acquisition unit 211 determines the identifier of the power generation units 101 or the consumption units 102 from which the amount of power and the measurement time are acquired by referring to the association tables shown in FIGS. 10A and 10B and using the IP address of the power generation unit 101 or the consumption unit 102 indicating the sender when the amount of power is received from each of the power generation unit 101 and the consumption unit 102 or the IP address used when accessing the power generation units 101 or the consumption units 102. Note that the address information on the Internet of the power generation unit 101 or the consumption unit 102 that is set to the association table is not limited to the IP address, and any information that can uniquely identify the power generation unit 101 or the consumption unit 102 on the Internet, such as URI (Uniform Resource Identifier) or URL (Uniform Resource Locator) in HTTP (Hypertext Transfer Protocol), a client certificate in SSL (Secure Socket Layer) or ID/password, may be used as appropriate.

<<Hardware Configuration of Power Identification Device 200>>

Figure 11:
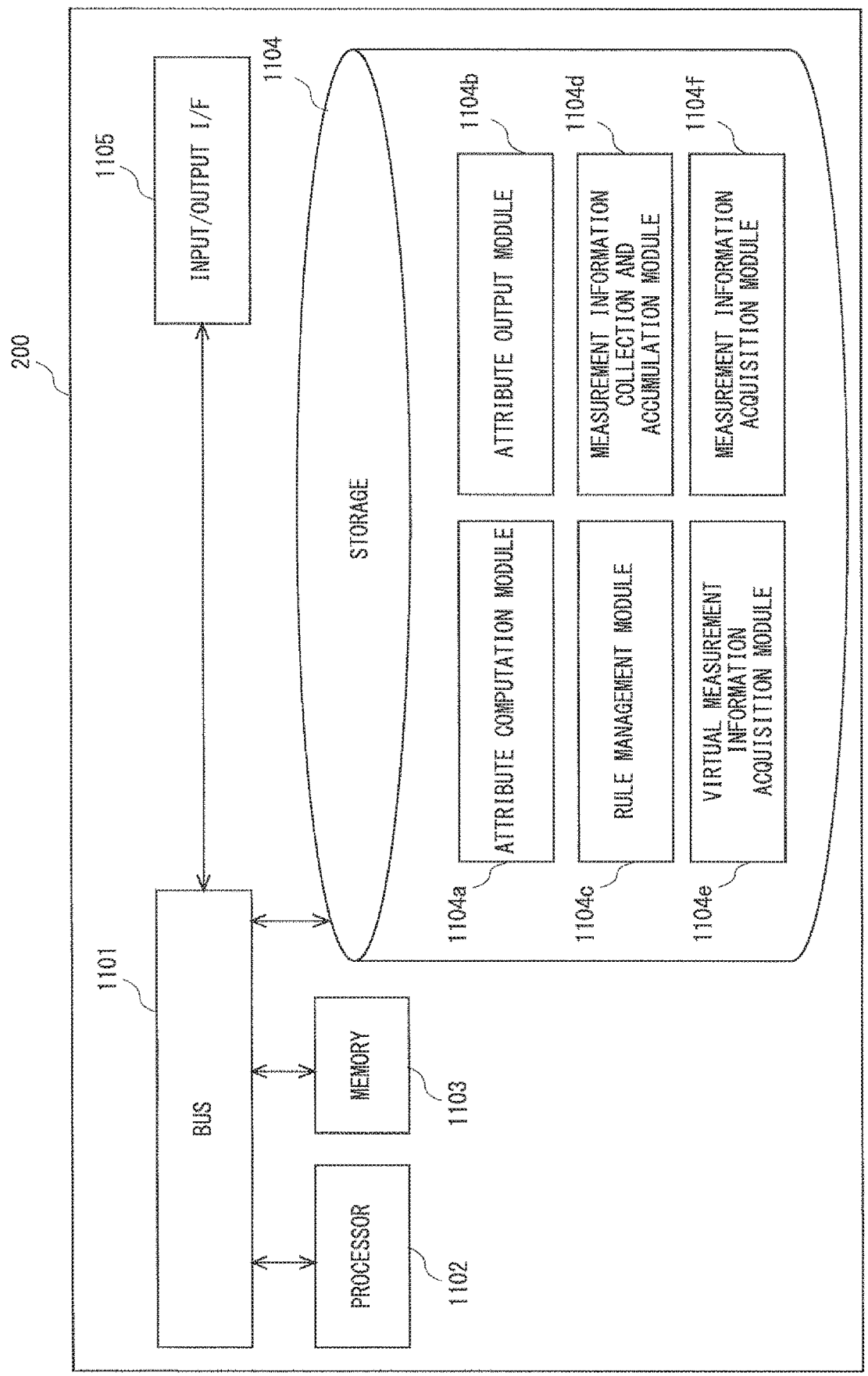
FIG. 11 is a block schematic diagram showing an example of a hardware configuration of the power identification device in the first exemplary embodiment of the present invention.

FIG. 11 is a block schematic diagram showing an example of a hardware configuration of the power identification device 200 in the first exemplary embodiment of the present invention. As shown in FIG. 11, the power identification device 200 at least includes a bus 1101, a processor 1102, a memory 1103, a storage 1104, and an input/output interface 1105. The storage 1104 stores various operation modules such as an attribute computation module 1104a, an attribute output module 1104b, a rule management module 1104c, a measurement information collection and accumulation module 1104d, a virtual measurement information acquisition module 1104e, and a measurement information acquisition module 1104f and the like.

The bus 1101 is a data transmission line for the processor 1102, the memory 1103, the storage 1104 and the input/output interface 1105 to transmit and receive data with one another.

The processor 1102 is a processing unit such as CPU (Central Processing Unit) or GPU (Graphics Processing Unit). The processor 1102 executes the operation modules stored in the storage 1104 and thereby implements the functions of the attribute computation unit 201, the attribute output (visualization) unit 202, the rule management unit 204, the measurement information collection and accumulation unit 206, the virtual measurement information acquisition unit 208 and the measurement information acquisition unit 211 shown in FIG. 3.

The memory 1103 is a memory such as a RAM (Random Access Memory) or a ROM (Read Only Memory).

The storage 1104 is a storage device such as a hard disk, an SSD (Solid State Drive) or a memory card. Alternatively, the storage 1104 may be a memory such as a RAM or a ROM.

The input/output interface 1105 is an input/output interface for the power identification device 200 to transmit and receive data to and from the outside. The "outside" indicates a user (power producer or consumer), an operator, another system or the like. For example, when the power identification device 200 acquires information about the amount of power from the power generation unit 101 or the consumption unit 102, it uses the input/output interface 1105. Note that the input/output interface 1105 may include an interface for acquiring information from an input device such as a keyboard, or may include an interface for acquiring information from an external device such as a storage. Alternatively, the input/output interface 1105 may include an interface for acquiring information through a network.

[Description of Operation Example in First Exemplary Embodiment]

Figure 12:
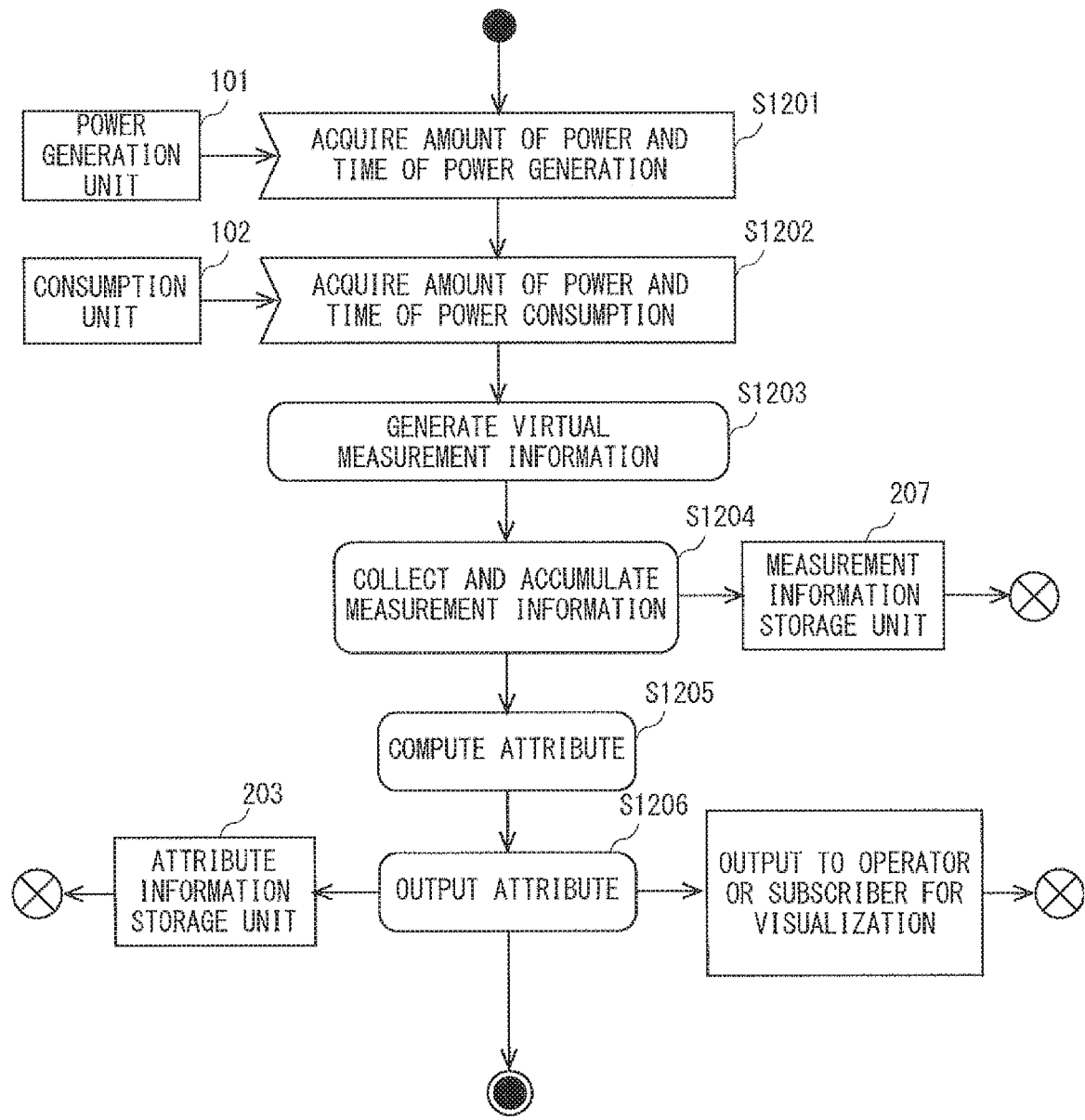
FIG. 12 is a flowchart illustrating an example of a power identification operation of the power identification device in the first exemplary embodiment of the present invention.
Figure 13:
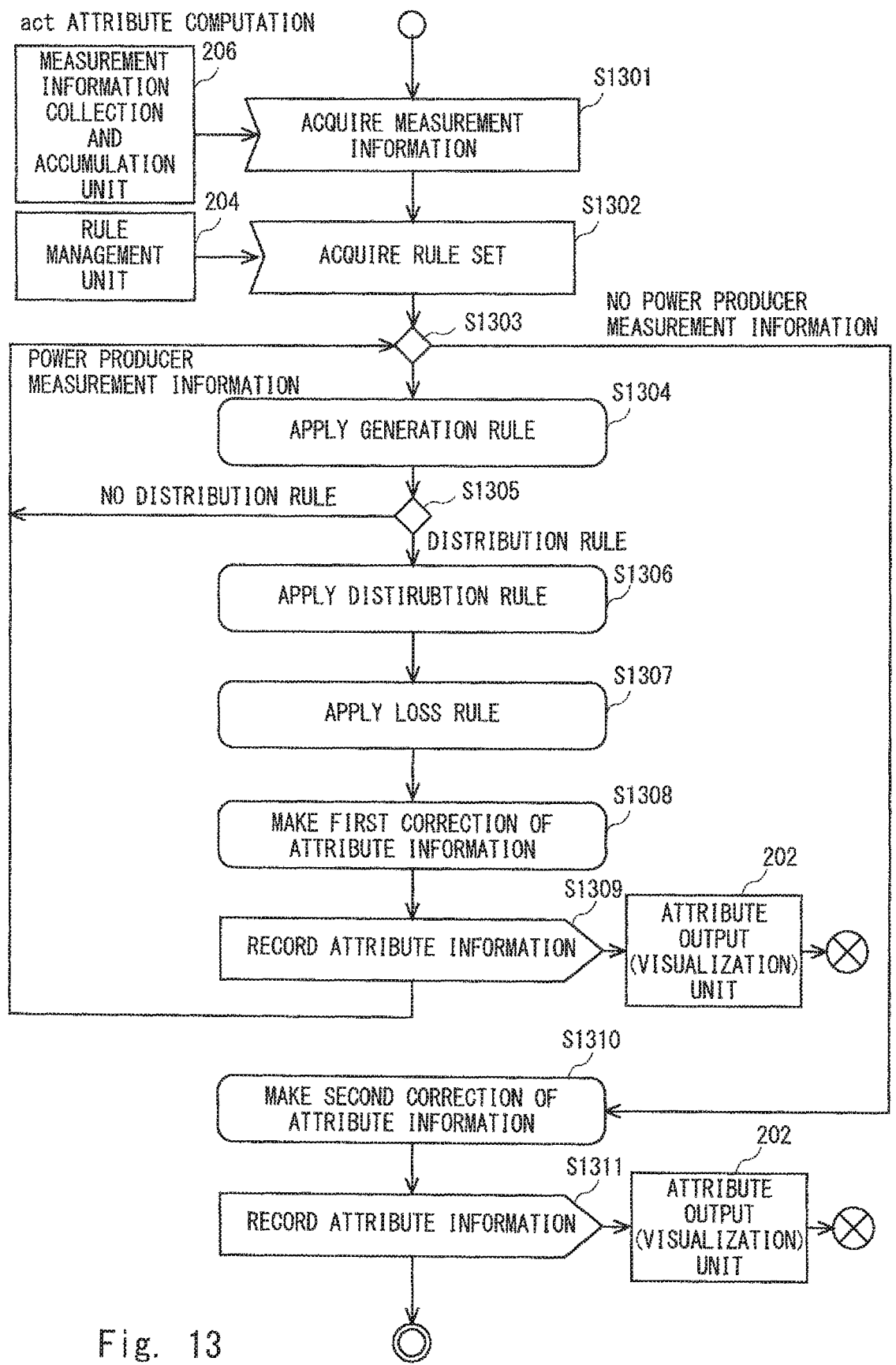
FIG. 13 is a flowchart illustrating an example of an attribute computation operation of the power identification device in the first exemplary embodiment of the present invention.

An example of the overall operation of the power identification device 200 according to the first exemplary embodiment of the present invention is described hereinafter in detail with reference to the flowchart of FIG. 12 and the flowchart of FIG. 13. FIG. 12 is a flowchart illustrating an example of a power identification operation of the power identification device 200 in the first exemplary embodiment of the present invention. FIG. 13 is a flowchart illustrating an example of an attribute computation operation of the power identification device 200 in the first exemplary embodiment of the present invention. In the following description, the case where the measurement information is the information shown in FIGS. 4A and 4B, the virtual measurement information is the information shown in FIGS. 5A and 5B, the generation rule is the rule shown in FIG. 7, the distribution rule is the rule shown in FIG. 8, and the loss rule is the rule shown in FIG. 9 is specifically described as an example. Note that the power identification operation illustrated in FIG. 12 is performed at predetermined intervals such as every 1 minute, for example.

The flow of the power identification operation of the power identification device 200 is sequentially described with reference to the flowchart of FIG. 12.

(1) Step S1201: Acquisition of the Amount of Power Generation and the Time

The measurement information acquisition unit 211 shown in FIG. 3 acquires the amount of power generation and the measurement time from each of the power generation units 101, generates the measurement information (power producer measurement information), and passes the generated measurement information to the measurement information collection and accumulation unit 206.

(2) Step S1202: Acquisition of the Amount of Power Consumption and the Time

The measurement information acquisition unit 211 acquires the amount of power consumption and the measurement time from each of the consumption units 102, generates the measurement information (consumer measurement information), and passes the generated measurement information to the measurement information collection and accumulation unit 206.

(3) Step S1203: Generation of Virtual Measurement Information

The virtual measurement information acquisition unit 208 shown in FIG. 3 acquires the measurement information from the measurement information acquisition unit 211 and also acquires the loss rule from the attribute computation unit 201, generates the virtual measurement information based on the acquired measurement information and the loss rule, and passes the generated virtual measurement information to the measurement information collection and accumulation unit 206. The attribute computation unit 201 acquires the loss rule from the rule management unit 204 in response to a request from the virtual measurement information acquisition unit 208, and passes the acquired loss rule to the virtual measurement information acquisition unit 208.

A procedure to generate the virtual measurement information in the virtual measurement information acquisition unit 208 is described in detail hereinbelow.

(Step B1):

First, the sum Psum of the amount of power of the power producer is calculated based on the power producer measurement information acquired from the measurement information acquisition unit 211. As shown in the measurement information of FIG. 4A, the power producer measurement information is only information related to the power producer 1. Thus, the sum of the amount of power of the power producer is calculated as Psum=10 Wh.

(Step B2):

After that, the loss rule is applied to the calculated sum Psum of the amount of power of the power producer, and the amount of power at the time when the amount of power of the power producer is supplied to the consumer. As a specific numerical example, a loss 10% (the amount of loss 1 Wh) is subtracted from the sum Psum=10 Wh of the amount of power of the power producer calculated in the above step (Step B1) by applying the loss rule shown in FIG. 9 (the rule indicating that the loss rate is fixed to 10% when power is distributed from any power producer to a consumer), and the result is 9 Wh.

(Step B3):

Then, the sum Csum of the amount of power of the consumer is calculated based on the consumer measurement information acquired from the measurement information acquisition unit 211. As shown in the measurement information of FIG. 4B, the consumer measurement information is only information related to the consumer 1. Thus, the sum of the amount of power of the consumer is calculated as Csum=15 Wh.

(Step B4):

After that, the virtual measurement information for offsetting the excess or shortage of power generation of the power producer is generated based on a result of comparing the amount of power of the power producer at the time when it is supplied to the consumer which is calculated by applying the loss rule in the above step (Step B2) with the sum Csum of the amount of power of the consumer which is calculated in the above step (Step B3). In the above-described specific numerical example, "Psum-loss)<Csum" as shown in the calculation result in the above steps (Step B2) and (Step B3). Thus, the amount of power that is required as a virtual power producer (the amount of power sold by an electricity company) is, in consideration of a loss by the loss rule, $$\{Csum - (Psum - \text{loss})\} \times 10/9 = \{15 - (10 - 1)\} \times 10/9$$
$$= 6 \text{ Wh} \times 10/9$$
$$= 60/9 \text{ Wh,}$$

and the amount of power purchased by an electricity company as the virtual consumer is calculated as 0 Wh.

Based on the result of calculation described above, virtual power producer measurement information where the power producer identifier indicating an electricity company as the virtual power producer is the power producer 0, the measurement time is 2014/1/1 00:00:00, and the virtual amount of power is 60/9 Wh is generated, and virtual consumer measurement information where the consumer identifier indicating the virtual consumer is the consumer 0, the measurement time is 2014/1/1 00:00:00, and the virtual amount of power is 0 Wh is generated, as shown in the virtual measurement information of FIGS. 5A and 5B.

(4) Step S1204: Collection and Accumulation of Measurement Information

Referring back to the flowchart of FIG. 12, the measurement information collection and accumulation unit 206 shown in FIG. 3 receives the measurement information and the virtual measurement information from the measurement information acquisition unit 211 and the virtual measurement information acquisition unit 208, respectively, and stores the received measurement information and virtual measurement information into the measurement information storage unit 207 defined in FIG. 2. Further, the measurement information collection and accumulation unit 206 passes the received measurement information and virtual measurement information to the attribute computation unit 201.

(5) Step S1205: Attribute Computation

When the attribute computation unit 201 shown in FIG. 3 acquires the measurement information (information that includes not only the actual measurement information but also the virtual measurement information) from the measurement information collection and accumulation unit 206, it acquires the generation rule out of the desired rule set from the rule management unit 204. For the loss rule, the rule that has been acquired from the rule management unit 204 in Step S1203 is used. After that, the attribute computation unit 201 generates attribute information based on the acquired generation rule, the acquired loss rule, and the measurement information (including the virtual measurement information) acquired from the measurement information collection and accumulation unit 206, and passes the generated attribute information to the attribute output (visualization) unit 202. Note that the detailed operation of the attribute computation is described later with reference to the flowchart of FIG. 13.

(6) Step S1206: Attribute Output

Then, the attribute output (visualization) unit 202 shown in FIG. 3 acquires the attribute information passed from the attribute computation unit 201, and stores the acquired attribute information into the attribute information storage unit 203 defined in FIG. 2. Further, the attribute output (visualization) unit 202 converts the attribute information into visualized information (to be specific, information that can be displayed on a screen by a display function of a Web application such as a browser, for example) and outputs the information to an operator, a user (a subscriber such as a power producer or a consumer) or the like.

The flow of the attribute computation operation of the power identification device 200 (i.e., the detailed flow of Step S1205 in FIG. 12) is sequentially described hereinafter with reference to the flowchart of FIG. 13.

(1) Step S1301: Acquisition of Measurement Information

First, the attribute computation unit 201 shown in FIG. 3 acquires the measurement information (information that includes the actual measurement information and the virtual measurement information) from the measurement information collection and accumulation unit 206.

(2) Step S1302: Acquisition of Rule Set

Next, the attribute computation unit 201 acquires the generation rule and the distribution rule as a desired rule set from the rule management unit 204. Note that, for the loss rule, which is the remaining rule that constitutes the desired rule set, the rule that has been acquired in Step S1203 of the flowchart in FIG. 12 is used.

(3) Step S1303: Determination on Presence or Absence of Power Producer Measurement Information Then, the attribute computation unit 201 selects one of power producer (including virtual power producer) measurement information. When the power producer measurement information exists, the process proceeds to Step S1304, and when the power producer measurement information does not exist, the process proceeds to Step S1310. In the above-described specific example, the measurement information of the power producer 1 and the measurement information of the power producer 0 exist as the power producer measurement information, as shown in the measurement information of FIG. 4A and the virtual measurement information of FIG. 5A. Note that the order of selecting the power producer measurement information in the attribute computation unit 201 may be at random or in numerical order.

(4) Step S1304: Application of Generation Rule

When the power producer measurement information exists, the attribute computation unit 201 extracts the related generation rule, using the power producer identifier in the power producer measurement information selected in Step S1303 as a key. After that, based on the extracted generation rule, the attribute computation unit 201 generates attribute information from the power producer measurement information. Hereinafter, the case where the selected power producer measurement information is the measurement information of the power producer 1 in FIG. 4A, and the power producer identifier is the power producer 1 is described as an example, and the attribute information is generated in the following procedure.

The attribute computation unit 201 calculates the amount of power generation and the additive attribute (the power source type) in the attribute information based on the power producer measurement information and the generation rule. As illustrated in the measurement information of FIG. 4A, in the power producer measurement information of this example, the power producer identifier is the power producer 1, the measurement time is 2014/1/1 00:00:00, and the amount of power generation is 10 Wh. Further, as the generation rule related to the power producer 1, the rule which specifies that the power producer identifier in the generation condition is the power producer 1, the power source type which is the additive attribute in the corresponding generation method is wind power, and the ratio is 100% (i.e., the power source type is only wind power) is detected as illustrated in the generation rule of FIG. 7. Based on such power producer measurement information and information about the generation rule, the attribute computation unit 201 generates the following attribute information A as the attribute information (values as attribute information are filled in the following items (a), (b), (c) and (e) as a result of this generation operation).

Attribute information (attribute information A) to be generated
  (a) Amount of power: 10 Wh
  (b) Time: 2014/1/1 00:00:00
  (c) Power producer identifier: Power producer 1
  (d) Consumer identifier: Null
  (e) Power source type: Wind power
  (f) Expected amount of power: Null Note that, in the case where the generation rule related to the power producer measurement information corresponding to the selected measurement information does not exist, the attribute information is generated based on the assumption that "Any" indicating an arbitrary power source type is specified with the ratio of 100% as the power source type in the item (e).

As another example for further description, the attribute information related to the power producer 2 is described. The generation rule related to the power producer 2, as illustrated in FIG. 7, specifies that the ratio of thermal power is 80% and the ratio of wind power is 20% as the additive attribute (power source type) generated from the measurement information of the power producer 2. In such a case, the amount of power in the measurement information of the power producer 2 is divided into two at the above-described ratio which is specified by the generation rule, thereby generating two pieces of attribute information. The power source type in the first attribute information is thermal power, the power source type in the second attribute information is wind power, and the amount of power of each of the two pieces of attribute information is generated as the value obtained by distributing the amount of power in the measurement information at the ratio of 8:2 (the amount of power in the first attribute information is 8 Wh, and the amount of power in the second attribute information is 2 Wh).

In this Step S1304, the attribute information generation process is performed not only for the accrual measurement information but also for the virtual measurement information. As illustrated in the virtual measurement information of FIG. 5A, in the virtual power producer virtual measurement information of this example, the power producer identifier is the power producer 0, the measurement time is 2014/1/1 00:00:00, and the amount of power is 60/9 Wh(=6 Wh×10/9). Further, as the generation rule related to the power producer 0, the rule which specifies that the power producer identifier in the generation condition is the power producer 0, the power source type which is the additive attribute in the corresponding generation method is electricity company power, and the ratio is 100% (i.e., the power source type is only electricity company power) is detected as illustrated in the generation rule of FIG. 7. Based on such virtual power producer virtual measurement information and information about the generation rule, the attribute computation unit 201 generates the following attribute information B as the attribute information (values as attribute information are filled in the following items (a), (b), (c) and (e) as a result of this generation operation).

Attribute information (attribute information B) to be generated
(a) Amount of power: 60/9 Wh
(b) Time: 2014/1/1 00:00:00
(c) Power producer identifier: Power producer 0
(d) Consumer identifier: Null
(e) Power source type: Electricity company power
(f) Expected amount of power: Null (5) Step S1305: Determination on Presence or Absence of Distribution Rule Then, the attribute computation unit 201 determines the presence or absence of the distribution rule related to the attribute information generated in Step S1304. Specifically, the related distribution rule is extracted by using the power producer identifier in this attribute information as a key. When the distribution rule of the power producer indicated by the power producer identifier in this attribute information exists, the process proceeds to Step S1306. On the other hand, when the distribution rule of this power producer does not exist, the process returns to Step S1303 in order to process the next measurement information without distributing the attribute information. Note that, however, even when the process returns to Step S1303, the attribute information generated in Step S1304 is not discarded and temporarily stored as undistributed attribute information that has not been distributed to a consumer. The distribution rule is a rule that defines the ratio and amount of distribution in accordance with consumer preferences as described above. Therefore, the distribution rule is not specified for a power producer that does not mach any of consumer preferences.

In the case where the attribute information generated in Step S1304 is the attribute information A, the power producer identifier is the power producer 1, and the distribution rule related to the power producer 1 exists as illustrated in FIG. 8. To be specific, in FIG. 8, it is specified that the power producer identifier is the power producer 1, the consumer identifier is the consumer 1, and the distribution ratio is 100%. Thus, in the case of the attribute information A, the process proceeds to Step S1306.

On the other hand, in the case where the attribute information generated in Step S1304 is the attribute information B, the power producer identifier is the power producer 0, and the distribution rule related to the power producer 0 does not exist in FIG. 8. Thus, in the case of the attribute information B, the process returns to Step S1303 without performing the distribution. As described earlier, even in the case of the attribute information (attribute information B) with no related distribution rule, the attribute information (attribute information B) generated in Step S1304 is not deleted and temporarily stored as undistributed attribute information that has not been distributed to a consumer for the subsequence processing.

(6) Step S1306: Application of Distribution Rule

When the distribution rule exists for the attribute information and the process proceeds to Step S1306, the attribute computation unit 201 intends to distribute the attribute information generated in Step S1304 to a consumer (in the above-described specific example, intends to distribute the attribute information A to the consumer 1) based on the distribution rule related to the attribute information. Note that, at this point of time, the operation is only to provisionally distribute the attribute information to a consumer according to the distribution rule, and it is not to finalize the distribution. Thus, in Step S1306, it is determined to intend to distribute the attribute information as follows.

The distribution rule related to the attribute information A that is generated in Step S1304 specifies that the power producer identifier is the power producer 1, the consumer identifier is the consumer 1, and the distribution ratio is 100%. Thus, all of the attribute information A is to be distributed to the consumer 1. After that, in order to indicate that the attribute information A is intended to be distributed to the consumer 1, the consumer 1 is set as the consumer identifier of the attribute information. As a result, as the attribute information after application of the distribution rule, the attribute information A is updated to the following attribute information C (a value as attribute information is filled in the following item (d) as a result of the update operation). Note that, by the update to the attribute information C, the attribute information A is deleted.

Attribute information (attribute information C) newly generated by update:
(a) Amount of power: 10 Wh
(b) Time: 2014/1/1 00:00:00
(c) Power producer identifier: Power producer 1
(d) Consumer identifier: Consumer 1
(e) Power source type: Wind power
(f) Expected amount of power: Null As another example for further description of the distribution method, the case where the attribute information is the attribute information generated from the measurement information of the power producer 2 is described. In the case of the attribute information related to the power producer 2, the distribution rule specifies two distribution methods as illustrated in FIG. 8. Specifically, the first distribution method specifies the distribution ratio of 60% for the consumer whose consumer identifier is the consumer 2, and the second distribution method specifies the distribution ratio of 40% for the consumer whose consumer identifier is the consumer 3.

Therefore, the amount of power of this attribute information (the attribute information related to the power producer 2) is divided at the ratio of 6:4 and intended to be distributed to the consumer 1 and the consumer 2. Note that, as described in Step S1304, because two pieces of attribute information (i.e., the attribute information where the power source type is thermal power and the attribute information where the power source type is wind power) are generated from the measurement information of the power producer 2, the total 4 (=2×2) pieces of attribute information are generated as a result of intending to distribute each of the two pieces of attribute information to the consumer 2 and the consumer 3.

(7) Step S1307: Application of Loss Rule

After the distribution rule is applied and the attribute information is updated to the attribute information C in Step S1306, the attribute computation unit 201 then subtracts, based on the loss rule, a loss from the amount of power which is the primary attribute in the attribute information (attribute information C) that is intended to be distributed to the consumer 1 in Step S1306.

The loss rule specifies that the loss rate is 10% for any combination of a power producer and a consumer as shown in FIG. 9, and the amount of power which is the primary attribute in the attribute information (attribute information C) is 10 Wh, and therefore the attribute information C is updated to the attribute information D that contains a new amount of power 9 Wh by subtracting a loss 10% from the amount of power 10 W as the primary attribute. Further, the same value as the power of amount calculated in this step is set also to the expected amount of power that indicates the amount of power expected by the power producer 1 to be supplied from the consumer 1. Specifically, as the attribute information after application of the loss rule, the attribute information C is updated to the following attribute information D (values as attribute information are filled in the following items (a) and (f) as a result of the update operation). Note that, by the update to the attribute information D, the attribute information C is deleted.

Attribute information (attribute information D) newly generated by update:
(a) Amount of power: 9 Wh
(b) Time: 2014/1/1 00:00:00
(c) Power producer identifier: Power producer 1
(d) Consumer identifier: Consumer 1
(e) Power source type: Wind power
(f) Expected amount of power: 9 Wh (8) Step S1308: First Correction of Attribute Information Then, the attribute computation unit 201 compares the amount of power that is set to the attribute information (attribute information D) updated in Step S1308 with the amount of power contained in the consumer measurement information acquired in Step S1301, and corrects a deviation of the amount of power between the supplier and the consumer in accordance with a result of the comparison. For example, the following correction is made.

(A) in Case of "the Amount of Power in Attribute Information>the Amount of Power in Measurement Information"

In this case, the amount of power that is actually consumed by the consumer to whom the entire amount of power is to be distributed from the power producer is smaller than the amount of power that is set to the attribute information (attribute information D), and the following two pieces of attribute information are newly generated by copying the attribute information (attribute information D). As the first attribute information, the attribute information related to the amount of power to be distributed to a consumer is generated, and the amount of power in the consumer measurement information that is actually consumed is set as the amount of power as the primary attribute of the attribute information, and distribution to the consumer is finalized.

Further, as the second attribute information, the attribute information related to the excess power of the power producer is generated, and "the amount of power in the attribute information (attribute information D)−the amount of power in the consumer measurement information" is calculated, and the amount of power where application of the loss rule in Step S1307 is cancelled (the amount of power that is multiplied by 10/9 to return to the value without a loss of 10%) is set as the amount of power as the primary attribute. Further as the attribute information that has not been distributed to a consumer, the consumer identifier of the additive attribute is set to Null, and the expected amount of power in the additive attribute is set to Null. Note that, after generating the first attribute information and the second attribute information, the copied attribute information (attribute information D) is deleted. Further, this measurement information is deleted from the measurement information acquired in Step S1301.

(B) In Case of "the Amount of Power in Attribute Information≤the Amount of Power in Measurement Information"

In this case, distribution of the attribute information (attribute information D) to the consumer is finalized. Further, the amount of power in the attribute information (attribute information D) is subtracted from the amount of power in the measurement information acquired in Step S1301, and it is set as a new amount of power in the measurement information related to this consumer.

In the case as illustrated in the measurement information of FIG. 4B, the amount of power consumed by the consumer 1 is 15 Wh, and the amount of power in the attribute information D intended to be distributed to the consumer 1 is 9 Wh. Thus, this corresponds to the case of "the amount of power in attribute information≤the amount of power in measurement information", and distribution of the attribute information D to the consumer 1 is finalized. Further, as a result of subtracting the amount of power 9 Wh in the attribute information D from the amount of power contained in the measurement information related to the consumer 1, only the amount of power 9 Wh is supplied from the power producer 1, among the amount of power 15 Wh consumed by the consumer 1 in the measurement information, and the remaining amount of power in the measurement information for the consumer 1, which is a shortage, is 6 Wh.

As another example for further description, the case where the amount of power in the measurement information related to the consumer 1 acquired in Step S1301 is 5 Wh is described. Because this corresponds to the case of "the amount of power in attribute information>the amount of power in measurement information", the attribute information (attribute information D) is copied and updated to the two pieces of attribute information, attribute information E and attribute information F, as the first correction as described above, and the copied attribute information D is deleted.

Among the two pieces of attribute information newly updated and generated, in the attribute information E as the first attribute information, the amount of power 5 Wh in the consumer measurement information is set as the amount of power which is the primary attribute in the attribute information E. Thus, a value as attribute information in the following item (a) is thereby changed. Further, for the attribute information E as the first attribute information, distribution to the consumer 1 is finalized.

Attribute information (attribute information E) newly generated as first attribute information by update:
(a) Amount of power: 5 Wh
(b) Time: 2014/1/1 00:00:00
(c) Power producer identifier: Power producer 1
(d) Consumer identifier: Consumer 1
(e) Power source type: Wind power
(f) Expected amount of power: 9 Wh Further, in the attribute information F as the second attribute information, the amount of power obtained by multiplying a calculation result of "the amount of power 9 Wh in the attribute information D−the amount of power 5 Wh in the consumer measurement information" by the value 10/9 for cancelling the application of the loss rule is set as the amount of power as the primary attribute of the attribute information F, and Null is set to each of the consumer identifier in the additive attribute and the expected amount of power in the additive attribute. Values as attribute information in the following items (a), (d) and (f) are thereby changed. The attribute information F, which is the second attribute information, is temporarily stored as the attribute information that has not been distributed to a consumer. Further, after generating the first attribute information E and the second attribute information F, the copied attribute information (attribute information D) is deleted. Further, the measurement information related to the consumer 1 to whom distribution of the attribute information E is finalized is deleted.

Attribute information (attribute information F) newly generated as second attribute information by update:
 (a) Amount of power: 40/9 Wh(=4 Wh×10/9)
 (b) Time: 2014/1/1 00:00:00
 (c) Power producer identifier: Power producer 1
 (d) Consumer identifier: Null
 (e) Power source type: Wind power
 (f) Expected amount of power: Null
(9) Step S1309: Recording of Attribute Information After correcting a deviation of the amount of power as the first correction of the attribute information and finalizing the attribute information to be distributed to the consumer in Step S1308, the attribute computation unit 201 passes information about the attribute information of which distribution to the consumer is finalized to the attribute output (visualization) unit 202 so that it is stored into the attribute information storage unit 203 defined in FIG. 2, and then the process returns to the operation of Step S1303. Note that the attribute information that has not been distributed to a consumer, such as the attribute information F described as another example for further description in Step S1308, for example, is temporarily stored.

(10) Step S1310: Second Correction of Attribute Information

When, in Step S1303, it reaches the state where the measurement information of the next power producer to be processed does not exist, the process proceeds to Step S1310, and the attribute computation unit 201 performs the second correction based on the attribute information that has not been distributed to a consumer and the remaining consumer measurement information. Such attribute information corresponds to the attribute information for which the related distribution rule does not exist in Step S1305 (note that, in the above-described specific example, the second attribute information such as the attribute information F where power of the power producer is excessive in Step S1308), and the attribute information that cannot be distributed to a consumer in Step S1308, which is the attribute information related to the amount of power in the measurement information that remains for a consumer as a result that the amount of power supplied from a power producer is insufficient with the relationship of "the amount of power in attribute information<the amount of power in measurement information".

In the above-described specific example, as a result of performing the computation operation in Steps S1301 to S1309, the attribute information that has not been distributed to a consumer and the remaining consumer measurement information are, respectively, the attribute information B related to the power producer 0 for which the related distribution rule does not exist in Step S1305 and the attribute information related to the amount of power 6 W in the measurement information that remains for the consumer 1 due to the shortage of power supply from the power producer 1 out of the amount of power 15 Wh to be consumed by the consumer 1 in the measurement information in Step S1308. In other words, the attribute information that has not been distributed to a consumer is the above-described attribute information B, and the remaining consumer measurement information is as follows.

—Attribute Information that has not been Distributed to a Consumer—
Attribute information B
 (a) Amount of power: 60/9 Wh
 (b) Time: 2014/1/1 00:00:00
 (c) Power producer identifier: Power producer 0
 (d) Consumer identifier: Null
 (e) Power source type: Electricity company power
 (f) Expected amount of power: Null —Remaining Consumer Measurement Information—
The consumer identifier is the consumer 1, the time at which the amount of power consumption is measured is 2014/1/1 00:00:00, and the amount of power consumption is 6 Wh.

In the second correction of the attribute information in this Step S1310, the operation of allocating the attribute information that has not been distributed to a consumer to the remaining consumer measurement information is performed. To be specific, the following allocation operation is performed.

(Step C1)

First, any one of the attribute information that has not been distributed to a consumer is selected. The order of selecting the attribute information may be at random or in numerical order. In the above-described specific example, the above-described attribute information B, for example, is selected as the attribute information that has not been distributed to a consumer.

(Step C2)

Next, the attribute information selected in the above step (Step C1) is evenly distributed to the remaining consumer measurement information. This distribution operation is the same operation as in the case where, in application of the distribution rule in Step S1306, the distribution ratio of this distribution rule is specified as "even to consumers" (it is specified that when there are two corresponding consumers, for example, the distribution ratio to each of the consumers is 50%).

In the above-described specific example, because the corresponding consumer is the consumer 1 only, the attribute information B selected in the above step (Step C1) is not divided and entirely distributed to the consumer 1. Thus, the attribute information B is updated to the following attribute information G as the attribute information after distribution by the second correction (a value as attribute information is filled in the following item (d) as a result of the update operation).

Attribute information (attribute information G) newly generated by update:
 (a) Amount of power: 60/9 Wh
 (b) Time: 2014/1/1 00:00:00
 (c) Power producer identifier: Power producer 0
 (d) Consumer identifier: Consumer 1
 (e) Power source type: Electricity company power
 (f) Expected amount of power: Null (Step C3)

Further, the loss rule is applied to the attribute information G generated in the above step (Step C2). This operation is exactly the same as in the case of applying the loss rule in Step S1307 except that the expected amount of power, which is one of the additive attributes in the attribute information, is not set. In the above-described specific example, as shown in FIG. 9, the loss rule specifies that the loss rate is 10% for any combination of a power producer and a consumer, a new amount of power is calculated as 6 Wh by subtracting a loss 10% from the amount of power as the primary attribute of the attribute information G (i.e., 60/9 Wh)×(9/10)=6 Wh). Thus, as the attribute information after application of the loss rule, the attribute information G is updated to the following attribute information H (a value as attribute information is filled in the following item (a) as a result of the update operation).

Attribute information (attribute information H) newly generated by update:

(a) Amount of power: 6 Wh
(b) Time: 2014/1/1 00:00:00
(c) Power producer identifier: Power producer 0
(d) Consumer identifier: Consumer 1
(e) Power source type: Electricity company power
(f) Expected amount of power: Null (Step C4)

After that, a deviation of the amount of power is corrected by comparing the amount of power in the attribute information H updated in the above step (Step C3) with the amount of power contained in the remaining consumer measurement information. In the case where the attribute information is distributed to a plurality of consumers in the above step (Step C2), correction is made to each of the attribute information. This operation of correcting a deviation in the amount of power is the same operation as in the case of the first correction operation in Step S1308, and the operation of correcting a deviation in the amount of power is performed based on a comparison result between the amount of power in the attribute information and the amount of power in the measurement information.

In the above-described specific example, each of the amount of power in the attribute information H and the amount of power in the measurement information of the consumer 1 is equal to 6 Wh, and it is finalized that all of the attribute information H are distributed to the consumer 1. As a result, both of the attribute information that has not been distributed to a consumer and the consumer measurement information that remains without distribution of the attribute information no longer exist.

(Step C5)

Further, in the case where the attribute information that has not been distributed to a consumer and the consumer measurement information where the attribute information has not been distributed still remain as a result of the operation up to the in the above step (Step C4), the computation operation in each of the above steps (Step C1) to (Step C4) is repeated. In the above-described specific example, because both of the attribute information that has not been distributed to a consumer and the remaining consumer measurement information do not exist as described in the above step (Step C4), the second correction operation in Step S1310 ends.

(11) Step S1311: Recording of Attribute Information

Finally, after performing the correction operation for undistributed attribute information and remaining measurement information as the second correction of the attribute information and finalizing the attribute information to be distributed to a consumer in Step S1310, the attribute computation unit 201 passes information about the attribute information of which distribution to the consumer is finalized to the attribute output (visualization) unit 202 so that it is stored into the attribute information storage unit 203 defined in FIG. 2, and then the computation operation of the attribute computation unit 201 ends.

When the above-described computation operation of the attribute computation unit 201 illustrated in FIG. 13 is performed, the operation of Step S1206 in FIG. 12 is performed, and the attribute output (visualization) unit 202 sequentially receives the attribute information D of which distribution to the consumer 1 is finalized in "First correction of attribute information" in Step S1308 and the attribute information H of which distribution to the consumer 1 is finalized in "Second correction of attribute information" in Step S1310, converts them to the visualized information, and outputs the converted information to an operator, a subscriber (consumer or power producer) or a third-party system. As a result, the consumer 1 receives information where the amount of power as the primary attribute in the attribute information D is 9 Wh, the power source type as the additive attribute is wind power, and the expected amount of power as the additive attribute is 9 Wh, and information where the amount of power as the primary attribute in the attribute information H is 6 Wh, the power source type as the additive attribute is electricity company power, and the expected amount of power as the additive attribute is Null, for example.

Thus, the consumer 1 receives two pieces of attribute information, the attribute information D and the attribute information H, and can thereby easily grasp the performance of power supply to the consumer 1 in real time. For example, the consumer 1 compares the amount of power in the attribute information with the expected amount of power and can thereby easily and reliably grasp whether the power supply as expected is obtained or not. Further, from the amount of power and the power source type in the two attribute information, the consumer 1 can easily and reliably grasp that the wind power is 9 Wh and the electricity company power is 6 Wh as a breakdown of the power source type related to the power consumption 15 Wh by the consumer 1.

Note that, as another example for further description, the case where the amount of power in the measurement information related to the power producer whose power producer identifier is the power producer 1 shown in FIG. 4A is 20 Wh and the distribution rule shown in FIG. 8 specifies that the power producer identifier is the power producer 1 and the distribution ratio to the consumer whose consumer identifier is the consumer 1 is 50% is further described. The other information is the same as those in the above-described specific example.

In this case, the amount of power in the attribute information after applying the distribution ratio of 50% in the distribution rule to the consumer 1 and the loss rate of 10% in the loss rule is 9 Wh (=20 Wh×0.5×0.9), and the amount of power in the measurement information of the consumer 1 is 15 Wh, and therefore it corresponds to the case of "the amount of power in attribute information≤the amount of power in measurement information" in "First correction of attribute information" in Step S1308 of FIG. 13, and the following attribute information I is distributed to the consumer 1, just like the case of the attribute information D described above.

Attribute information I:
(a) Amount of power: 9 Wh (=20 Wh×0.5×0.9)
(b) Time: 2014/1/1 00:00:00
(c) Power producer identifier: Power producer 1
(d) Consumer identifier: Consumer 1
(e) Power source type: Wind power
(f) Expected amount of power: 9 Wh (=20 Wh×0.5×0.9)

Thus, the remaining attribute information that has not been distributed to the consumer 1 in the power producer 1 is the following attribute information J and, on the other hand, the remaining consumer measurement information is where the consumer identifier is the consumer 1, the time is 2014/1/1 00:00:00, and the amount of power is 6 Wh, just like the case of "—Remaining consumer measurement information—" described above.

Attribute information J:
(a) Amount of power: 10 Wh
(b) Time: 2014/1/1 00:00:00
(c) Power producer identifier: Power producer 1
(d) Consumer identifier: Null
(e) Power source type: Wind power
(f) Expected amount of power: Null Further, in "Second correction of attribute information" in Step S1310 of FIG. 13, when it is found that the attribute information that is undistributed to a consumer exists for a power producer (a power producer different from the power producer 1) that can distribute the amount of power to the consumer 1, such as the power producer 3 that can distribute wind power to the consumer 1, as the distribution rule, the attribute information corresponding the amount of power in the remaining consumer measurement information for the consumer 1 is generated and distributed to the consumer 1. As a result, the following attribute information K is further distributed to the consumer 1.

Attribute information K:
(a) Amount of power: 6 Wh
(b) Time: 2014/1/1 00:00:00
(c) Power producer identifier: Power producer 3
(d) Consumer identifier: Consumer 1
(e) Power source type: Wind power
(f) Expected amount of power: Null After that, in Step S1206 of FIG. 12, the attribute output (visualization) unit 202 receives the two pieces of attribute information, the attribute information I and the attribute information K, from the attribute computation unit 201 as the attribute information that is finalized to be distributed to the consumer 1, converts the received attribute information I and the attribute information K to visualized information and outputs them to the consumer 1, for example. The consumer 1 receives information indicating that the amount of power as the primary attribute in the attribute information I is 9 Wh, the power source type as the additive attribute is wind power, and the expected amount of power as the additive attribute is 9 Wh and information indicating that the amount of power as the primary attribute in the attribute information K is 6 Wh, the power source type as the additive attribute is wind power, and the expected amount of power as the additive attribute is Null.

Thus, the consumer 1 receives the two pieces of attribute information, the attribute information I and the attribute information K, and can thereby easily grasp the performance of power supply in real time. For example, the consumer 1 compares the amount of power in the attribute information with the expected amount of power and can thereby easily and reliably grasp whether the power supply as expected is obtained or not. Further, from the amount of power and the power source type in the two attribute information, the consumer 1 can easily and reliably grasp that the source of the entire power 15 Wh is wind power as a breakdown of the power source type related to the power consumption 15 Wh by the consumer 1. Alternatively, by setting of the distribution rule, the power producer 1, which is the same as in the attribute information I, may be used for the attribute information K, and the amount of power to be distributed to the consumer 1 may be set to be larger than the expected amount of power for the consumer 1.

Thus, the attribute information to be distributed to a consumer is different depending on the power producer or consumer measurement information, the distribution rule, or the loss rule. Accordingly, various types of information may be obtained as information which a consumer can grasp, such as "excess or deficiency of power relative to the expected amount of power in attribute information" or "breakdown of the power source type consumed by a consumer".

[Description of Effects of First Exemplary Embodiment]

The effects of the first exemplary embodiment are described hereinafter. According to the first exemplary embodiment, attribute information is generated, and the generated attribute information is presented to a consumer at predetermined intervals such as every 1 minute based on the generation rule for generating attribute information that contains information about the amounts of power of a power producer and a consumer and information such as the power source type, the distribution rule for distributing the attribute information to a consumer in accordance with the consumer preferences, and the loss rule for considering a power loss on a transmission line (transmission line for transmitting and distributing power) from a power producer to a consumer, and therefore the consumer can easily and reliably grasp the performance of power supply in substantially real time at predetermined intervals such as every 1 minute, for example.

Figure 14:
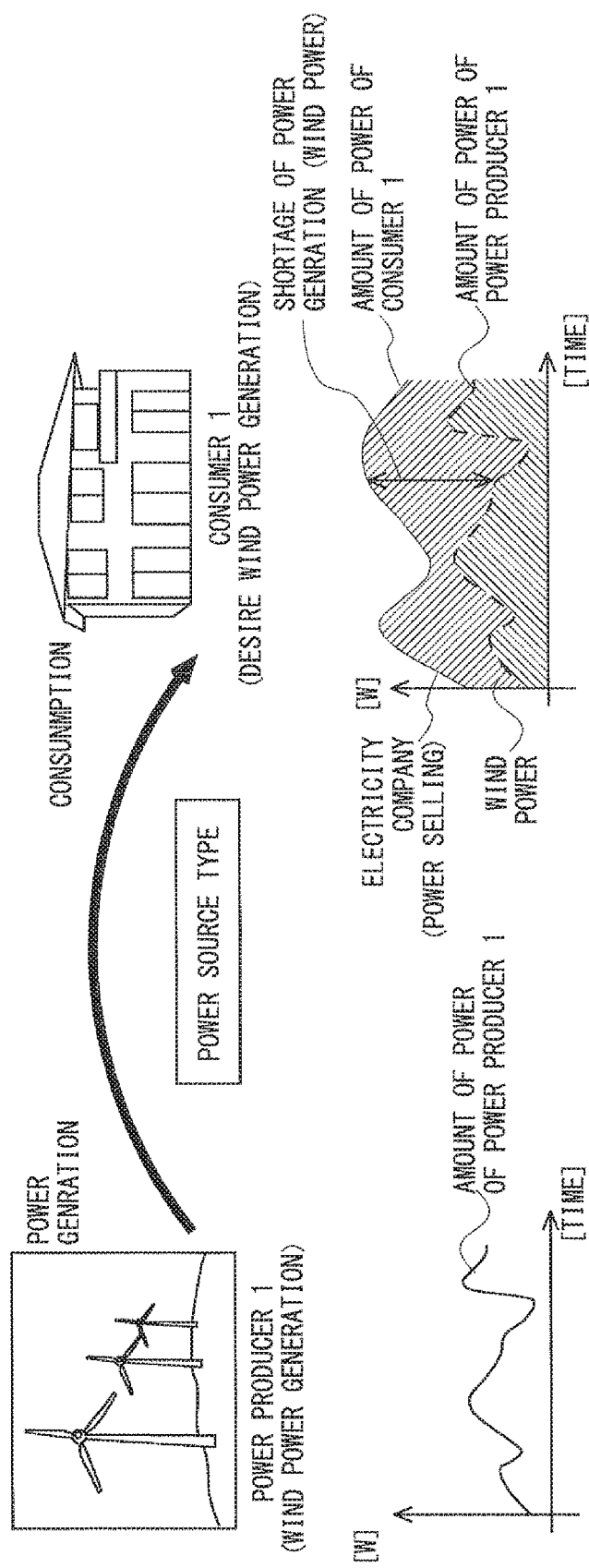
FIG. 14 is an image diagram for describing effects of the first exemplary embodiment of the present invention.
Figure 15:
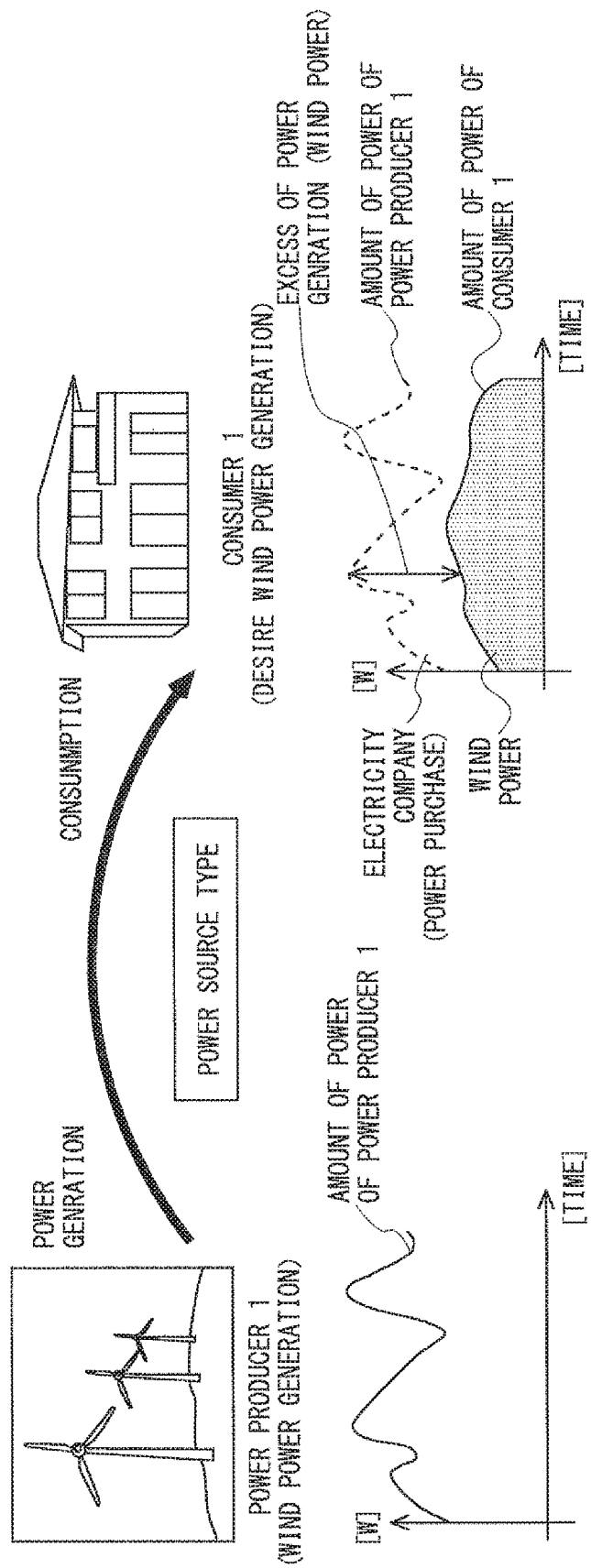
FIG. 15 is an image diagram for describing effects, in a different case from FIG. 14, of the first exemplary embodiment of the present invention.

The effects of the first exemplary embodiment are more specifically described with reference to the image diagrams of FIGS. 14 and 15. FIG. 14 is an image diagram for describing the effects of the first exemplary embodiment of the present invention, and it illustrates an example where a consumer checks the performance of power supply in the case of "the amount of power of a power producer≤the amount of power of a consumer". FIG. 15 is an image diagram for describing the effects, in a different case from FIG. 14, of the first exemplary embodiment of the present invention, and it illustrates an example where a consumer checks the performance of power supply in the case of "the amount of power of a power producer>the amount of power of a consumer".

Note that, each of the image diagrams of FIGS. 14 and 15 shows an example of checking the performance of power supply when the consumer 1 desires wind power generation, and the 100% power of the power producer 1 is supplied to the consumer 1. Note that, the following description is based on the assumption that the generation rule is the rule shown in FIG. 7, the distribution rule is the rule shown in FIG. 8, and the loss rule is 0% in all sections (no transmission line loss), which is different from the above-described rule shown in FIG. 9.

First, in the image diagram of FIG. 14, "the amount of power of a power producer<the amount of power of a consumer" is satisfied for the entire period of time as shown in the graph at the lower right of FIG. 14. Therefore, the consumer 1 refers to the graph as shown in the lower right of FIG. 14 which is output from the attribute output (visualization) unit 202 of the power identification device 200 shown in FIG. 3 at predetermined intervals such as every 1 minute, for example, and can grasp the fact that wind-generated power of the outside (power producer 1) is insufficient relative to the power consumption by the consumer 1 and the fact that not only wind power but also power sold by an electricity company is distributed as a breakdown (power source type) of power consumption by the consumer 1 in substantially real time at predetermined intervals such as every 1 minute.

First, in the image diagram of FIG. 15, because of power purchase from an electricity company by the power producer 1, "the amount of power of a power producer≥the amount of power of a consumer" is satisfied for the entire period of time as shown in the graph at the lower right of FIG. 15. Therefore, the consumer 1 refers to the graph as shown in the lower right of FIG. 15 which is output from the attribute output (visualization) unit 202 of the power identification device 200 shown in FIG. 3 at predetermined intervals such as every 1 minute, for example, and can grasp the fact that the power source is wind power as a breakdown of power consumption by the consumer 1 and the fact that wind-generated power of the outside is excessive relative to the power consumption in substantially real time at predetermined intervals such as every 1 minute.

Further, although the case where the interval of power identification operation is every 1 minute, for example, is described above in the first exemplary embodiment, the present invention is not limited to such a case. The interval of power identification operation may be flexibly set according to the user's needs, such as every 5 minutes, 10 minutes or 30 minutes, for example. To be specific, the power identification device 200 shown in FIG. 3 may be configured so that the measurement information acquisition unit 211 can receive external settings, and thereby the interval for power identification operation can be arbitrary set by an operator, another third-party system or the like. For example, the interval may be set in accordance with varying billing intervals of an external application that affects billing, such as real-time pricing or may be set in accordance with data collection intervals of another system such as a smart meter (for example, every 30 minutes).

Further, although it is described in the first exemplary embodiment that the attribute information contains the power source type, the expected amount of power, the power producer identifier and the consumer identifier as the additive attributes, the present invention is not limited to such a case. For example, the attribute information may contain any information that can be added to information about electric power, such as the price of power supplied from a power producer, the environmental burden ($CO_2$ emissions factor) or the area.

Further, although it is described in the first exemplary embodiment that the distribution rule is specified based on consumer preferences, the present invention is not limited to such a case. For example, any information may be applied as long as it is information that determines the ratio of distribution and the amount of distribution of the attribute information, such as a contract between a power producer and a consumer or a service menu to be provided to a consumer. Note that, as the information that specifies a distribution method in the distribution rule, the amount of distribution may be used in addition to the ratio of distribution (%). Further, the distribution condition in the distribution rule may be designated by a power producer identifier for identifying a power producer, and the distribution method may be designated by a consumer identifier for identifying a consumer and information that specifies the ratio or amount of distribution in accordance with the consumer's preferences. Alternatively, the distribution condition may be designated by a power producer identifier for identifying a power producer and a consumer identifier for identifying a consumer, and the distribution method may be designated by information that specifies the ratio or amount of distribution in accordance with the consumer's preferences.

Further, although it is described in the first exemplary embodiment that the distribution condition and the distribution method of attribute information are specified as the distribution rule, and when the distribution condition is matched, the attribute information is distributed according to the distribution method corresponding to that distribution condition, the present invention is not limited to such a case.

For example, as the distribution rule, attribute information may be equally distributed from a specific power producer to each of consumers who desire this power producer, or attribute information may be equally distributed from a specific power producer to each of consumers desired by that power producer. In such a case, the attribute computation unit 201 in the power identification device 200 of FIG. 3 may operate to equally distribute the attribute information generated from the measurement information of the power producer selected in Step S1303 of the flowchart of FIG. 13 to each of consumers who desire this power producer or to each of consumers desired by this power producer in Step S1306.

Further, in this case, the attribute computation unit 201 may operate to determine the distribution of attribute information that has not been distributed to a consumer preferentially to a consumer who desires the power producer of this attribute information or determine the distribution of this attribute information preferentially to a consumer desired by this power producer in "First correction of attribute information" in Step S1310 in the flowchart of FIG. 13. Note that, in the case where there are a plurality of consumers to whom the attribute information is to be distributed in Step S1310, the attribute information may be equally distributed to each of the consumers just like in Step S1306, or may be distributed to each of the consumers in ascending order of the consumer identifier number or at random.

Further, although the case where the loss rule is common to all sections is described above in the first exemplary embodiment, the present invention is not limited to such a case. For example, the loss rule may be set for each combination of a power producer and a consumer. Specifically, the loss rule may be set so that a loss is 10% in the section from the power producer 1 to the consumer 1, and a loss is 15% in the section from the power producer 1 to the consumer 2, for example. Further, as information that specifies the loss method in the loss rule, the amount of loss may be used in addition to the rate of loss (%).

Further, although it is described as the effects of the first exemplary embodiment that a consumer can grasp the performance of power supply such as a breakdown of power consumption by the consumer and the fact that outside wind power generation is excessive relative to consumption, it is not only a consumer that can obtain the effect of being able to grasp the performance of power supply. For example, an operator of the power identification device, a power producer, or a third party may acquire the attribute information and obtain various effects regarding the performance of power supply.

Second Exemplary Embodiment

[Configuration Example of Second Exemplary Embodiment]

A configuration example of a power identification device according to a second exemplary embodiment of the present invention is described hereinafter in detail with reference to the drawings. Note that, in the following description of the second exemplary embodiment, only the configuration and operation which are different from those of the first exemplary embodiment are described.

In the first exemplary embodiment of the present invention described above, it is described that the attribute information to be distributed to a customer is different depending on the power producer or consumer measurement information, the generation rule, the distribution rule and the loss rule. It is also described that "excess or deficiency of power relative to the expected amount of power in attribute information", for example, occurs as a result.

On the other hand, in the second exemplary embodiment of the present invention, the case where the power identification device 200 can recognize the "excess or deficiency of power relative to the expected amount of power in attribute information" based on the attribute information generated at regular intervals, and give a control instruction to charge or discharge an electric storage device included in the power generation unit 101 or the consumption unit 102 in accordance with the excess or deficiency of power is described.

The connection structure of the power generation unit 101, the consumption unit 102 and the transmission and distribution network 103 for which the power identification device 200 in the second exemplary embodiment of the present invention is configured is substantially the same as the connection structure in the first exemplary embodiment shown in FIG. 1, except that the consumption unit 102 or the power generation unit 101 further includes a control instruction receiving means and has a mechanism to control the charge and discharge of the electric storage device in response to a request from the outside.

Figure 16:
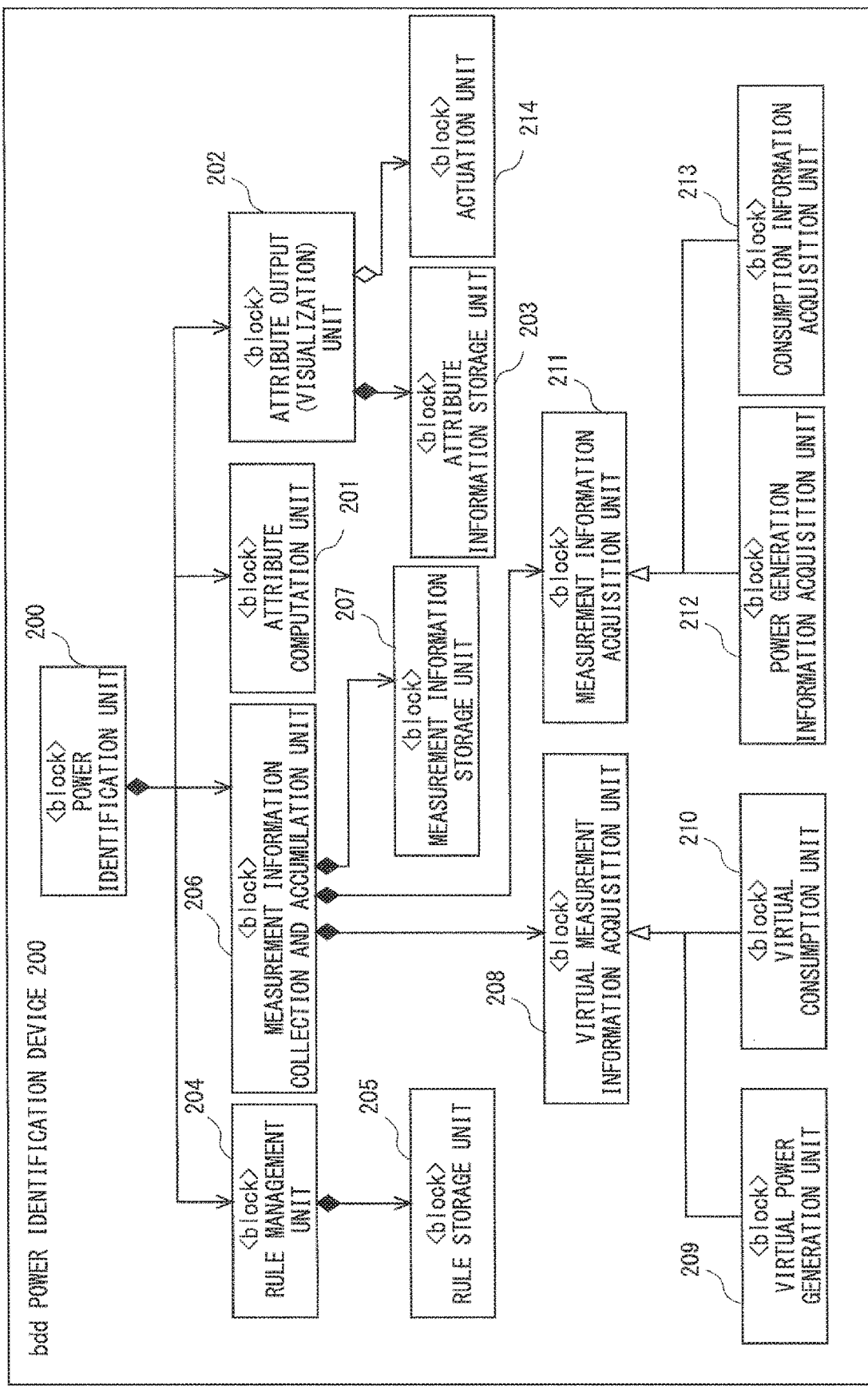
FIG. 16 is a block definition diagram showing an example of functional block definition of a power identification device in a second exemplary embodiment of the present invention.

A configuration example of a power identification device in the second exemplary embodiment of the present invention is described hereinafter with reference to the block definition diagram of FIG. 16. FIG. 16 is a block definition diagram showing an example of functional block definition of the power identification device in the second exemplary embodiment of the present invention. Note that each of the functional blocks shown in FIG. 16 is not a hardware structure but a functional structure, and the arrow shown in each functional block of FIG. 16 indicates the connection between functional blocks, just like in the block definition diagram according to the first exemplary embodiment shown in FIG. 2.

As shown in FIG. 16, a power identification device 200 (i.e. power identification unit 200) according to the second exemplary embodiment at least includes the same functional blocks as those in the block definition diagram of FIG. 2 according to the first exemplary embodiment, and further includes an actuation unit 214. The actuation unit 214 is a component part of (shared by) the attribute output (visualization) unit 202 as indicated by the arrow in FIG. 16.

Figure 17:
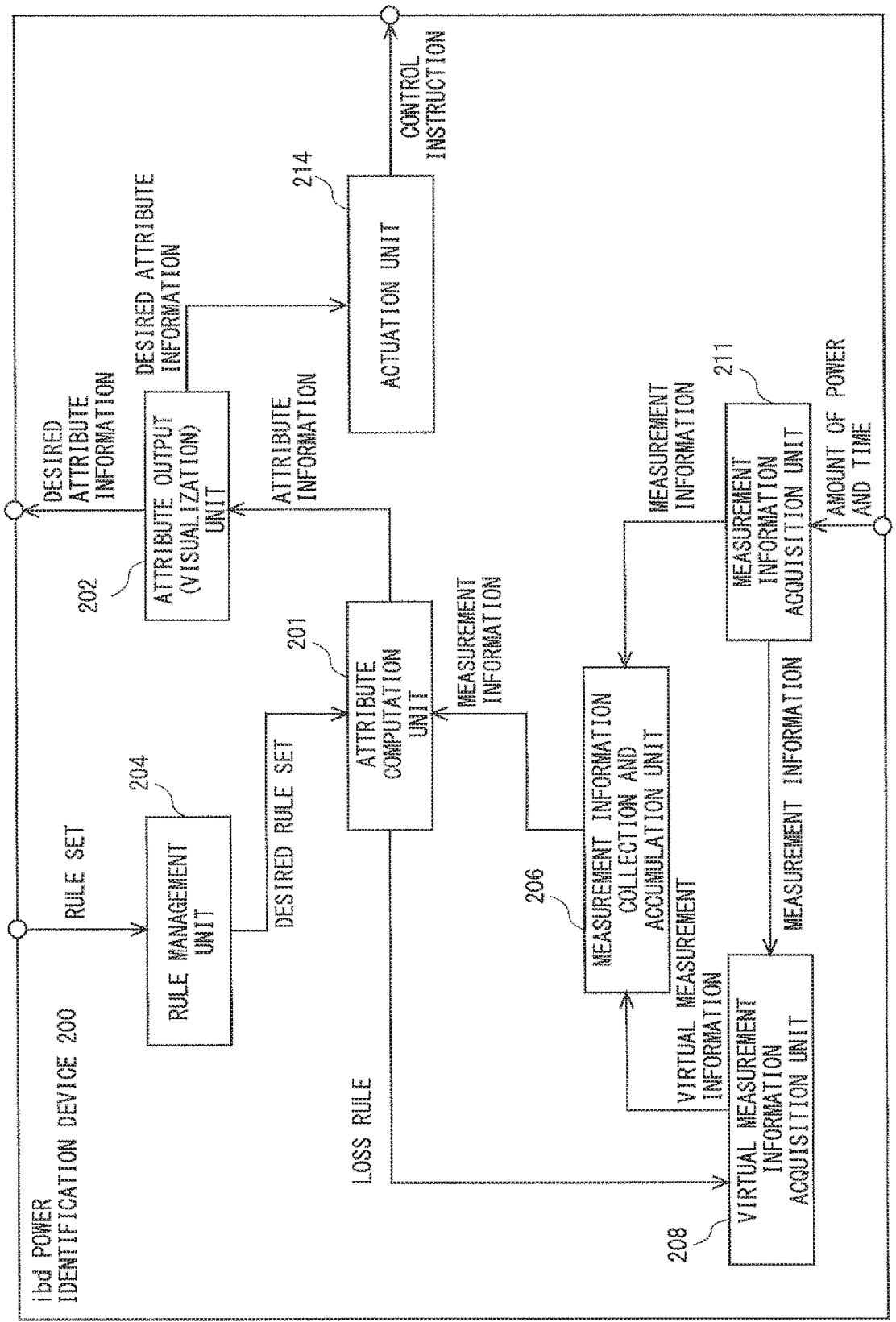
FIG. 17 is an internal block diagram showing an example of an internal block of the power identification device in the second exemplary embodiment of the present invention.

An example of the block configuration of the power identification device 200 of which functional blocks are defined in FIG. 16 is described hereinafter with reference to FIG. 17. FIG. 17 is an internal block diagram showing an example of an internal block of the power identification device in the second exemplary embodiment of the present invention. FIG. 17 also shows the flow of information between the functional blocks of the power identification device 200, just like in the internal block diagram of FIG. 3 according to the first exemplary embodiment. As shown in the internal block diagram of FIG. 17, the power identification device 200 according to the second exemplary embodiment at least includes the same functional blocks as those in the internal block diagram of FIG. 3 according to the first exemplary embodiment, and further includes an actuation unit 214. The actuation unit 214 that is added in the second exemplary embodiment is described hereinafter with reference to the internal block diagram of FIG. 17.

<Actuation Unit 214>

The actuation unit 214 acquires all of the attribute information distributed to a consumer from the attribute output (visualization) unit 202. Note that the attribute information acquired by the actuation unit 214 may be only the attribute information distributed to a specific consumer or only the attribute information where significant information (information that is not Null) is set as "the expected amount of power", which is one of the additive attributes in the attribute information.

Further, the actuation unit 214 calculates a deviation D (=W2−W1) [Wh] between the "amount of power W1" as the primary attribute of the attribute information and "the expected amount of power W2" as the additive attribute of the attribute information. Note that, however, the attribute information where Null, which is invalid information, is set as the expected amount of power is not processed. For example, in the case where the amount of power W1 as the primary attribute of the attribute information is 10 Wh and the expected amount of power W2 as the additive attribute of the same attribute information is 15 Wh, the deviation D [Wh] is 5 Wh. Note that, when "the amount of power W1>the expected amount of power W2", the deviation D [Wh] is a negative value.

Furthermore, the actuation unit 214 calculates charge/discharge power P [W] (which is a positive value for charge and a negative value for discharge) for charging or discharging the deviation D [Wh] for a predetermined time such as 1 minute. Specifically, the charge/discharge power P [W]=D [Wh]×60 is calculated. For example, when the deviation D [Wh] is 5 Wh, the charge/discharge power P=5 Wh×60=300 W (charge power). On the other hand, when the deviation D [Wh] is −5 [Wh], the charge/discharge power P=−300 W (discharge power).

Further, the actuation unit 214 determines a charge/discharge control instruction to the consumption unit 102 that is uniquely identified by the consumer identifier in the acquired attribute information. To be specific, the actuation unit 214 determines power that is the sum of the charge/discharge power newly calculated at the present time and the charge/discharge power contained in the charge/discharge control instruction that has been output in the past as the charge/discharge power to be contained in the charge/discharge control instruction that is output this time to the uniquely identified consumption unit 102.

For example, when the charge/discharge power contained in the past charge/discharge control instruction is 300 W and the charge/discharge power newly calculated at the present time is 300 W, the sum total 600 W (charge power) of both is the charge/discharge power to be contained in the control instruction this time. On the other hand, when the charge/discharge power contained in the past charge/discharge control instruction is 300 W and the charge/discharge power newly calculated at the present time is −300 W, the sum total 0 W of both is the charge/discharge power to be contained in the control instruction this time, and it is an instruction to stop charge/discharge. Further, when the charge/discharge power contained in the past charge/discharge control instruction is 300 W and the charge/discharge power newly calculated at the present time is −600 W, the sum total−300 W (discharge power) of both is the charge/discharge power to be contained in the control instruction this time.

Note that, it is described above that the charge/discharge control instruction that has been output in the past is referred to in order to grasp the current charge/discharge power of the consumption unit 102, the present invention is not limited to such a case. For example, an inquiry about charge/discharge power may be made to the consumption unit 102 in order to grasp the current charge/discharge power.

Further, the actuation unit 214 passes the charge/discharge control instruction to the consumption unit 102 that is uniquely identified by the consumer identifier in the acquired attribute information. For a network identifier of the uniquely identified consumption unit 102, the association information between the consumer indicated by the consumer identifier, which is the consumption unit 102, and the IP address of this consumption unit 102 in the association table of FIG. 10A according to the first exemplary embodiment is used.

[Description of Operation Example of Second Exemplary Embodiment]

An example of the overall operation of the power identification device 200 according to the second exemplary embodiment of the present invention is described hereinafter in detail with reference to the flowchart of FIG. 12 according to the first exemplary embodiment. Note that, in the second exemplary embodiment, the operation related to the attribute computation of the power identification device 200 is exactly the same as the operation illustrated in the flowchart of FIG. 13 according to the first exemplary embodiment, and the redundant description is omitted. First, although not shown in the flowchart of FIG. 12 according to the first exemplary embodiment, the operation of Step S1207 described below is added after Step S1206 in the flowchart of FIG. 12 in the second exemplary embodiment. Specifically, in the power identification device 200 according to the second exemplary embodiment of the present invention, after the same operation as the operation described in the first exemplary embodiment is performed in Steps S1201 to S1206 in the flowchart of FIG. 12, the operation of the newly added Step S1207 is performed.

(1) Step S1207: Performing Actuation

The actuation unit 214 passes the charge/discharge control instruction to the consumption unit 102 that is uniquely identified by the consumer identifier in the attribute information based on the attribute information acquired from the attribute output (visualization) unit 202. Specifically, it operates in the following procedure.

(Step D1):

First, all of the attribute information distributed to a consumer is acquired from the attribute output (visualization) unit 202. Note that, in the second exemplary embodiment, the following attribute information, not all of the distributed attribute information, is acquired. Specifically, the following attribute information E, which is the first attribute information that satisfies "the amount of power in attribute information<the amount of power in measurement information" and that is generated by the update of the attribute information D in Step S1308 (first correction of attribute information) of the first exemplary embodiment, is acquired among the attribute information distributed to a consumer.

Attribute information (attribute information E) newly generated as first attribute information by update:
(a) Amount of power: 5 Wh
(b) Time: 2014/1/1 00:00:00
(c) Power producer identifier: Power producer 1
(d) Consumer identifier: Consumer 1
(e) Power source type: Wind power
(f) Expected amount of power: 9 Wh (Step D2):

Next, the deviation D[Wh] between the amount of power as the primary attribute of the attribute information and the expected amount of power as the additive attribute of the same attribute information is calculated based on the acquired attribute information E. Because the amount of power is 5 Wh and the expected amount of power is 9 Wh in the attribute information E, the deviation D is calculated as 4(=9−5) Wh.

(Step D3):

Then, the charge/discharge power P [W] is calculated based on the deviation D [Wh] calculated in the above step (Step D2). Because the deviation D [Wh] calculated in the above step (Step D2) is 4 Wh, the charge/discharge power P [W] is calculated as 240 W (=4 Wh×60), which is charge power.

(Step D4):

After that, the details of the charge/discharge control instruction to be output to the consumption unit 102 that is uniquely identified by the consumer identifier, which is the additive attribute of the attribute information, are determined. To make this determination, the charge/discharge power that has been specified up to the present time for the consumer unit 102 identified by this attribute information is grasped. In the specific example in this description, it is assumed that the charge/discharge power that has been specified up to the present time for the uniquely identified consumer unit 102 is 0 W. In such a case, because the charge/discharge power to be contained in the charge/discharge control instruction to be output this time to the consumption unit 102 is the sum total of the charge/discharge power 0 W contained in the charge/discharge control instruction output in the past and the charge/discharge power P[W]=240 W newly calculated in the above step (Step D3), the charge/discharge power to be contained in the charge/discharge control instruction is charge power and calculated as 240 W(=0 W+240 W).

(Step D5):

Finally, the charge/discharge control instruction that contains the charge/discharge power 240 W calculated in the above step (Step D4) is passed to the consumer unit 102 that is uniquely identified by the consumer identifier, which is the additive attribute of the attribute information. As shown in the attribute information E, because the consumer identifier of the attribute information is the consumer 1, it is found that the IP address is "AAA.BBB.CCC.DDD" by referring to the association table of FIG. 10A in the first exemplary embodiment. Thus, the charge/discharge control instruction (the control instruction containing the charge/discharge power 240 W) for charging or discharging the electric storage device included in the consumption unit 102 of the consumer 1 is transmitted to the IP address "AAA.BBB.CCC.DDD" through a communication network such as the Internet, for example.

The consumption unit 102 of the consumer 1 receives, by the control instruction receiving means, the charge/discharge control instruction from the power identification device 200 and then causes the electric storage device included in the consumption unit 102 to perform the charge/discharge operation according to this control instruction.

[Description of Effects of Second Exemplary Embodiment]

The effects of the second exemplary embodiment are described hereinafter. In the second exemplary embodiment, the functional block, which is the actuation unit 214, that based on attribute information generated at predetermined intervals such as every 1 minute, outputs the charge/discharge control instruction to the consumer unit 102 that is uniquely identified by this attribute information is newly added to the power identification device 200 according to the first exemplary embodiment, and it is thereby possible to charge or discharge the electric storage device included in the consumption unit 102 of the consumer in accordance with the deviation between the attribute information expected by the consumer (attribute information generated based on the measurement information and the rule set) and the attribute information actually distributed to the consumption unit 102 of this consumer. It is thus possible to prevent the occurrence of "excess or deficiency of power relative to the expected amount of power in attribute information".

Figure 18:
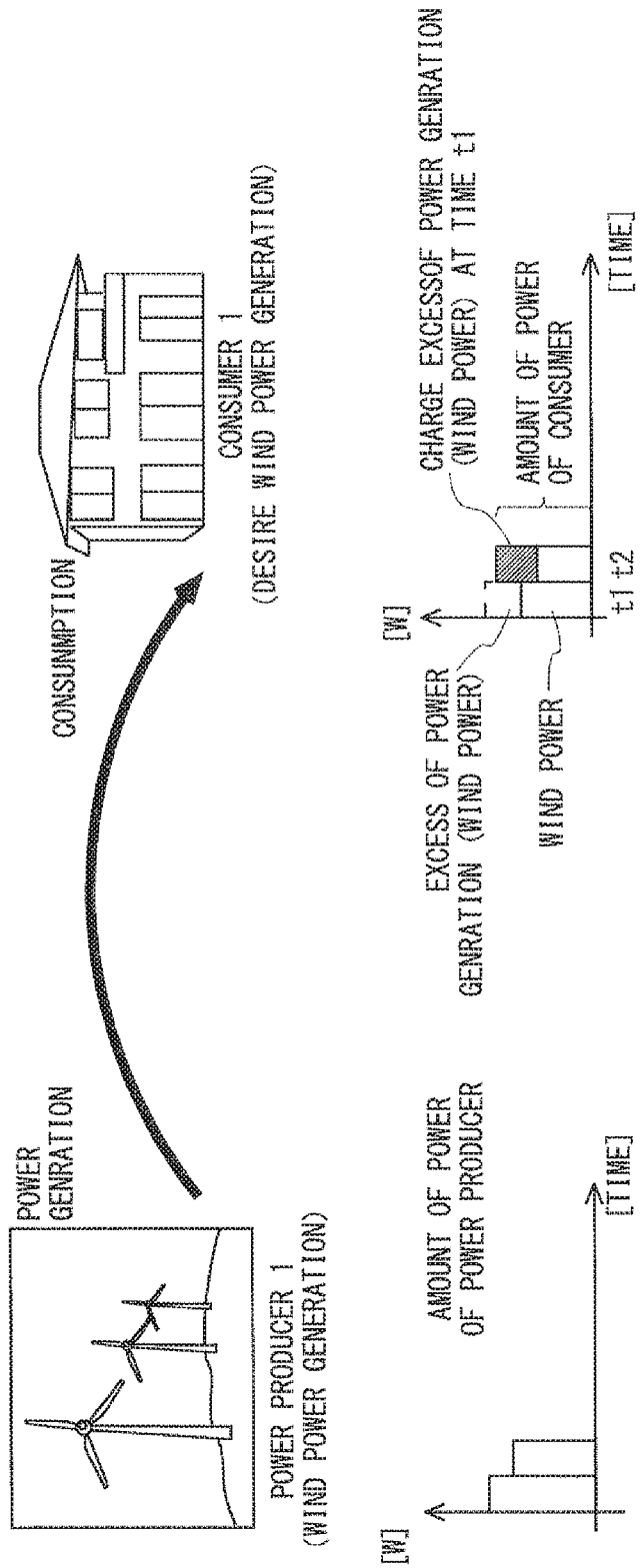
FIG. 18 is an image diagram for describing effects of the second exemplary embodiment of the present invention.
Figure 19:
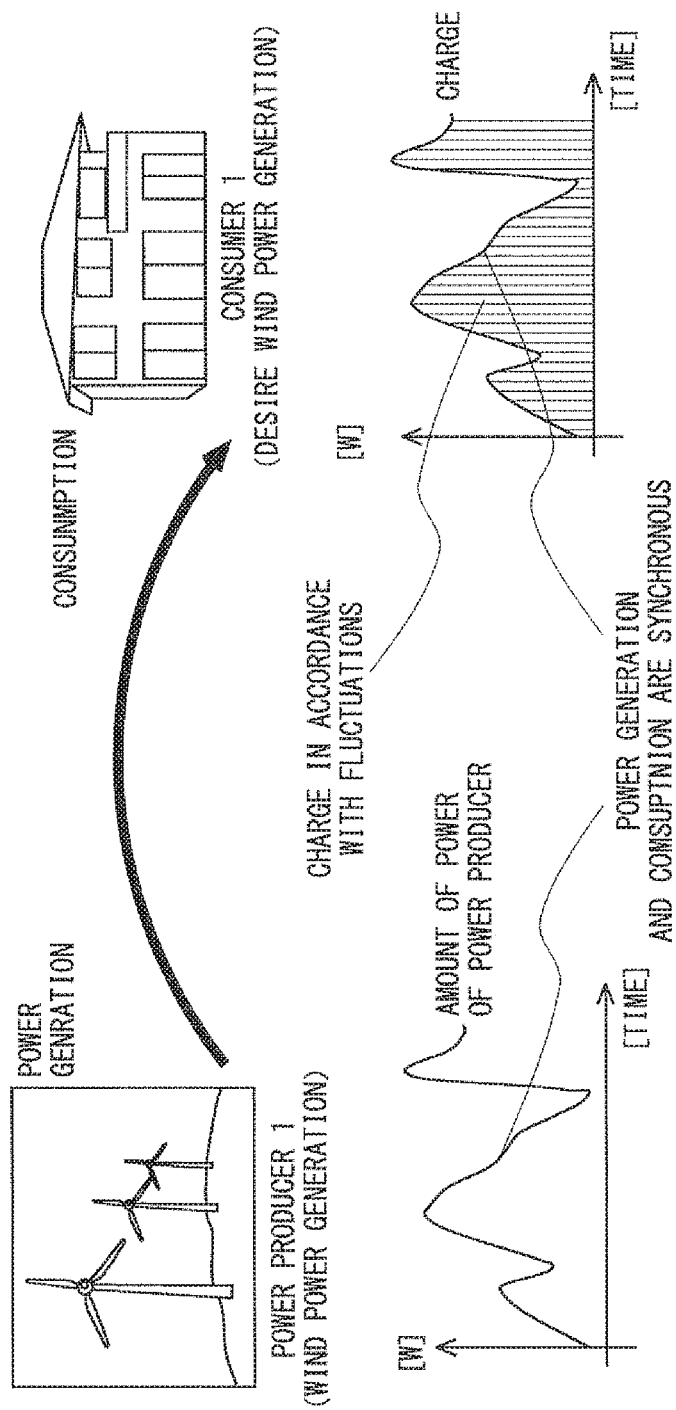
FIG. 19 is an image diagram for describing effects, in a different case from FIG. 18, of the second exemplary embodiment of the present invention.

The effects of the second exemplary embodiment of the present invention are more specifically described with reference to the image diagrams of FIGS. 18 and 19. FIG. 18 is an image diagram for describing the effects of the second exemplary embodiment of the present invention, and it illustrates the case where the electric storage device in the consumption unit 102 is charged by the excess of wind power generation. FIG. 19 is an image diagram for describing the effects, in a different case from FIG. 18, of the second exemplary embodiment of the present invention, and it illustrates the case where the electric storage device in the consumption unit 102 is charged in accordance with fluctuations in wind power generation.

Note that, each of the images diagrams of FIGS. 18 and 19 shows the effects when the consumer 1 that is uniquely identified by the attribute information desires wind power generation, and the 100% power of the power producer 1 is supplied to the consumer 1, just like in the case of FIGS. 14 and 15.

For example, in the image diagram of FIG. 18, in the operation at time t1 (i.e., the computation operation in Steps S1201 to S1206 in the flowchart of FIG. 12 and Step S1207 added in the second exemplary embodiment), the amount of power generated by wind is excessive relative to the amount of power consumed by the consumption unit 102 of the consumer 1 as shown in the graph at the lower right of FIG. 18. Thus, the consumer 1 can grasp in substantially real time the fact that the electric storage device in the consumption unit 102 of the consumer 1 is charged by the excess of power generation (wind power) at the time t1, and the operation of supplying power from the electric storage device that has been charged at the time t1 is performed when the amount of power generation (wind power) is insufficient relative to the amount of power consumption at the next time t2.

Note that, although the case where the actuation unit 214 outputs the charge/discharge control instruction to the corresponding consumption unit 102 in accordance with the deviation between the amount of generated power to be supplied to the consumer and the expected amount of power to be consumed by the consumer in the attribute information is described in the second exemplary embodiment, the present invention is not limited to such a case. For example, the charge/discharge control instruction may be output to the corresponding consumption unit 102 in accordance with the amount of generated power to be supplied from the power producer to the consumer in the attribute information. By performing such an operation, the consumer can charge the electric storage device in the consumption unit 102 in accordance with fluctuations in the amount of power generation by the power producer which is desired by the consumer as shown in the image diagram of FIG. 19.

Further, in the second exemplary embodiment, the actuation unit 214 may output the charge/discharge control instruction to the corresponding consumption unit 102 in accordance with a difference between the sum of the amounts of power in all the attribute information allocated to an arbitrary consumer (which is the same as the amount of power in the consumer measurement information) and the amount of power in specific attribute information. By performing such an operation, the consumer can charge or discharge the electric storage device in the consumption unit 102 in accordance with a deviation between the amount of power generation by the power producer which is desired by the consumer and the amount of power consumption in the consumption unit 102 of the consumer.

Furthermore, although the case where the actuation unit 214 in the power identification device 200 outputs the charge/discharge control instruction to the corresponding consumption unit 102 is described in the second exemplary embodiment, the charge/discharge control instruction may be output to the power generation unit 101, not to the consumption unit 102. In such a case, the power generation unit 101 charges or discharges the electric storage device included in the power generation unit 101 in response to a request from the outside.

Third Exemplary Embodiment

[Configuration Example of Third Exemplary Embodiment]

A configuration example of a power identification device according to a third exemplary embodiment of the present invention is described hereinafter in detail with reference to the drawings. Note that, in the following description of the third exemplary embodiment, only the configuration and operation which are different from those of the first exemplary embodiment are described.

In the first exemplary embodiment of the present invention described above, the power identification device 200 for the case where a loss is uniform in all sections between a consumer and a power producer is described, assuming the use of a transmission and distribution network of an electricity company such as wheeling, for example.

On the other hand, in the third exemplary embodiment of the present invention, the power identification device 200 that is applicable also to an actual transmission line that does not assume the use of a transmission and distribution network of an electricity company, such as a microgrid, which is, a transmission line where the topology is different for each microgrid and a loss varies in each section on the transmission line is described.

Figure 20:
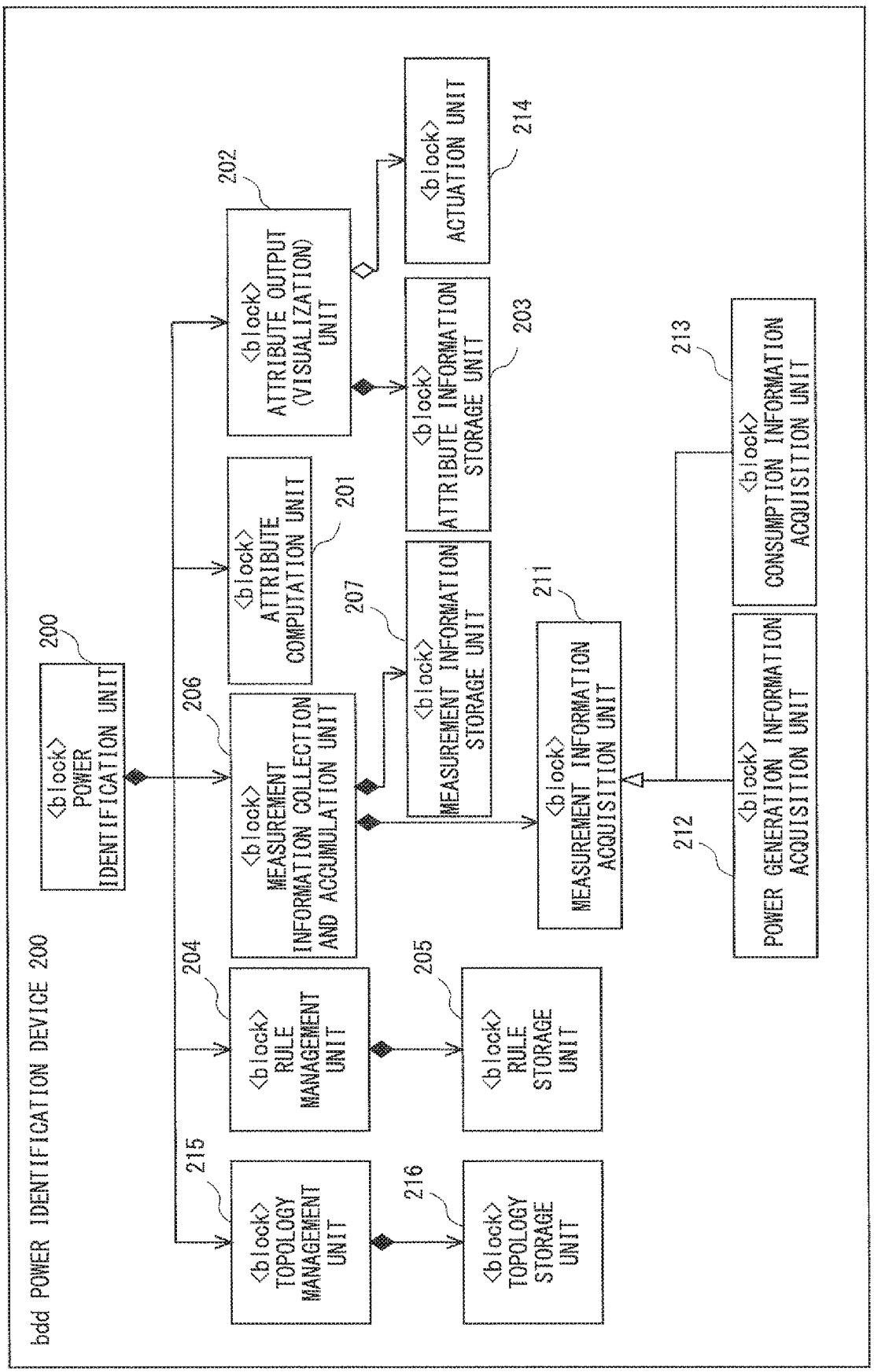
FIG. 20 is a block definition diagram showing an example of functional block definition of a power identification device in a third exemplary embodiment of the present invention.

A configuration example of a power identification device in the third exemplary embodiment of the present invention is described hereinafter with reference to the block definition diagram of FIG. 20. FIG. 20 is a block definition diagram showing an example of functional block definition of the power identification device in the third exemplary embodiment of the present invention. Note that each of the functional blocks shown in FIG. 20 is not a hardware structure but a functional structure, and the arrow shown in each functional block of FIG. 20 indicates the connection between functional blocks, just like in the block definition diagrams of FIGS. 2 and 16 in the first and second exemplary embodiments, respectively.

As shown in FIG. 20, a power identification device 200 (i.e. power identification unit 200) according to the third exemplary embodiment has a configuration where the virtual measurement information acquisition unit 208, and the virtual power generation unit 209 and the virtual consumption unit 210 which are component parts of the unit 208 are removed from, and a topology management unit 215 and a topology storage unit 216 are newly added to, the functional blocks in the block definition diagram of FIG. 16 according to the second exemplary embodiment.

Specifically, in the case of a structure such as a microgrid to which the third exemplary embodiment may be applied, the virtual measurement information acquisition unit 208 and the virtual power generation unit 209 and the virtual consumption unit 210 which are component parts of the unit 208 that virtually generate power purchase or power selling of an electricity company are not needed, and they can be eliminated in the power identification device 200 (i.e. power identification unit 200) according to the third exemplary embodiment. Note that, as indicated by the arrow in FIG. 20, the topology management unit 215 that is newly added is a component part of the power identification device 200 (i.e.

power identification unit 200), and the topology storage unit 216 is a component part of the topology management unit 215.

Figure 21:
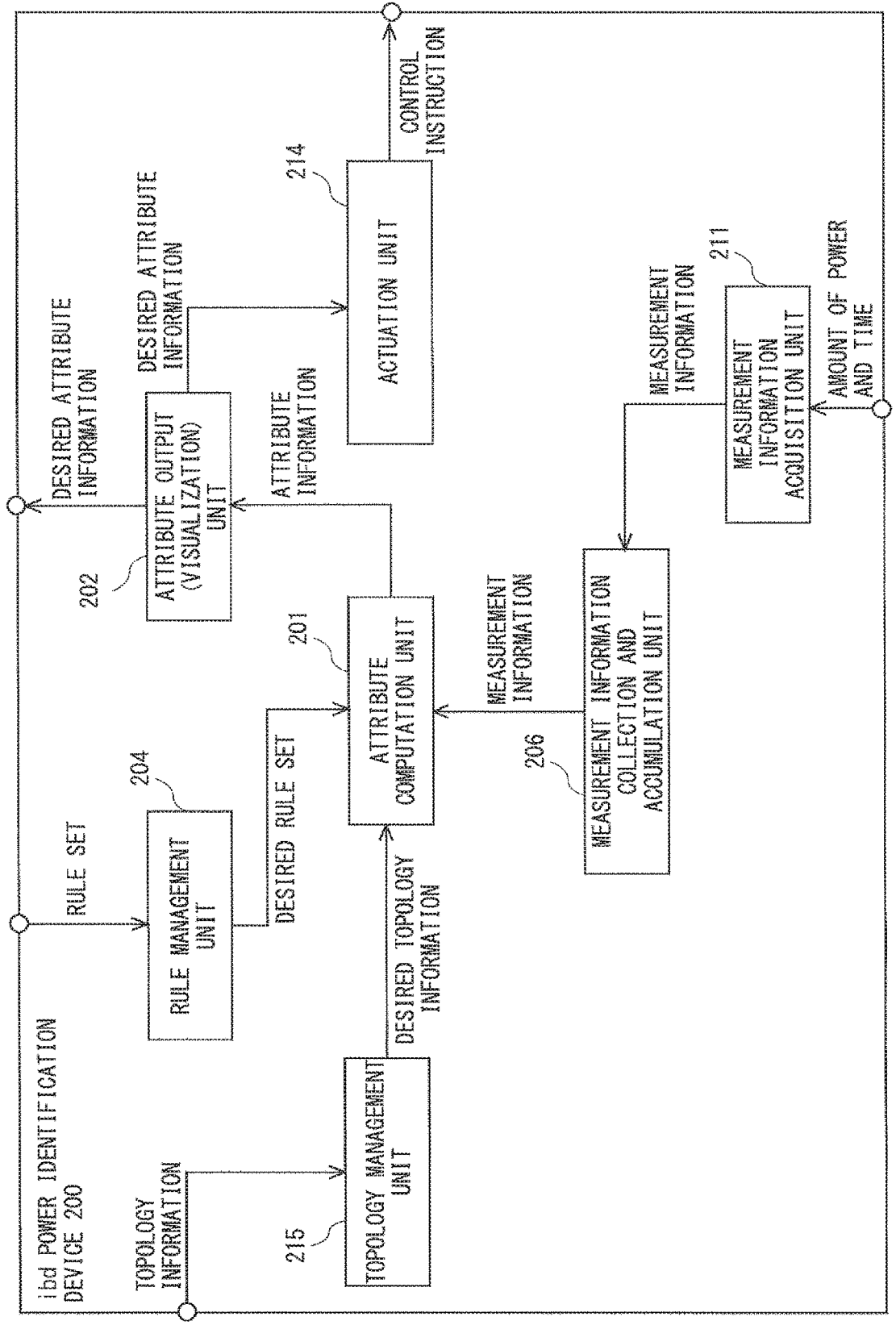
FIG. 21 is an internal block diagram showing an example of an internal block of the power identification device in the third exemplary embodiment of the present invention.

An example of the block configuration of the power identification device 200 of which functional blocks are defined in FIG. 20 is described hereinafter with reference to FIG. 21. FIG. 21 is an internal block diagram showing an example of an internal block of the power identification device in the third exemplary embodiment of the present invention. FIG. 21 also shows the flow of information between the functional blocks of the power identification device 200, just like the internal block diagrams of FIGS. 3 and 17 according to the first and second exemplary embodiments, respectively.

As shown in the internal block diagram of FIG. 21, the power identification device 200 according to the third exemplary embodiment has a structure in which the virtual measurement information acquisition unit 208 is removed from, and the topology management unit 215 is newly added to the functional blocks in the internal block diagram of FIG. 17 in the second exemplary embodiment. The attribute computation unit 201 of which function is partly altered by the elimination of the virtual measurement information acquisition unit 208 and the addition of the topology management unit 215 in the third exemplary embodiment, the topology management unit 215 which is newly added in the third exemplary embodiment, and the rule management unit 204 where a part of the rule set is altered to be able to deal with the case where the topology is different in each section on the transmission line are sequentially described hereinafter with reference to the internal block diagram of FIG. 21.

<Attribute Computation Unit 201>

The attribute computation unit 201 acquires topology information from the topology management unit 215. Further, the attribute computation unit 201 generates attribute information based on measurement information acquired from the measurement information collection and accumulation unit 206 and a desired rule set (generation rule, distribution rule and loss rule) acquired from the rule management unit 204 at predetermined intervals such as every 1 minute, for example, just like the case of the first and second exemplary embodiments. The attribute computation unit 201 passes the generated attribute information to the attribute output (visualization) unit 202 based on the acquired topology information, the distribution rule and the loss rule, and thereby distributes the attribute information to a consumer.

Furthermore, the attribute computation unit 201 models the transmission line (transmission line for transmitting and distributing power) based on the acquired topology information, and transmits the attribute information on the modeled transmission line. Then, the attribute information is distributed based on the distribution rule at the branch point on the modeled transmission line, and further the computation operation that subtracts the attribute information based on the loss rule is performed on the modeled transmission line. Such an operation is different from the operation of the attribute computation unit 201 in the first and second exemplary embodiments, as described in detail later.

<Topology Management Unit 215>

The topology management unit 215 receives topology information from the outside and stores it into the topology storage unit 216 that is defined in FIG. 20. The outside is an operator, another third-party system or the like that generates topology information, although not shown.

The topology information is information that define the adjacency relationship (the presence or absence of a link between two nodes) when the power generation unit 101, the consumption unit 102, and a branch point on the transmission line between the power generation unit 101 and the consumption unit 102 are defined as nodes, and each route on the transmission line is defined as a link. The topology information is represented by the adjacency matrix shown in the following equation (1).

Adjacency Matrix $$A = \begin{pmatrix} a_{1,1} & \cdots & a_{1,n} \\ \vdots & \ddots & \vdots \\ a_{n,1} & \cdots & a_{n,n} \end{pmatrix} \quad (1)$$

Figure 22:
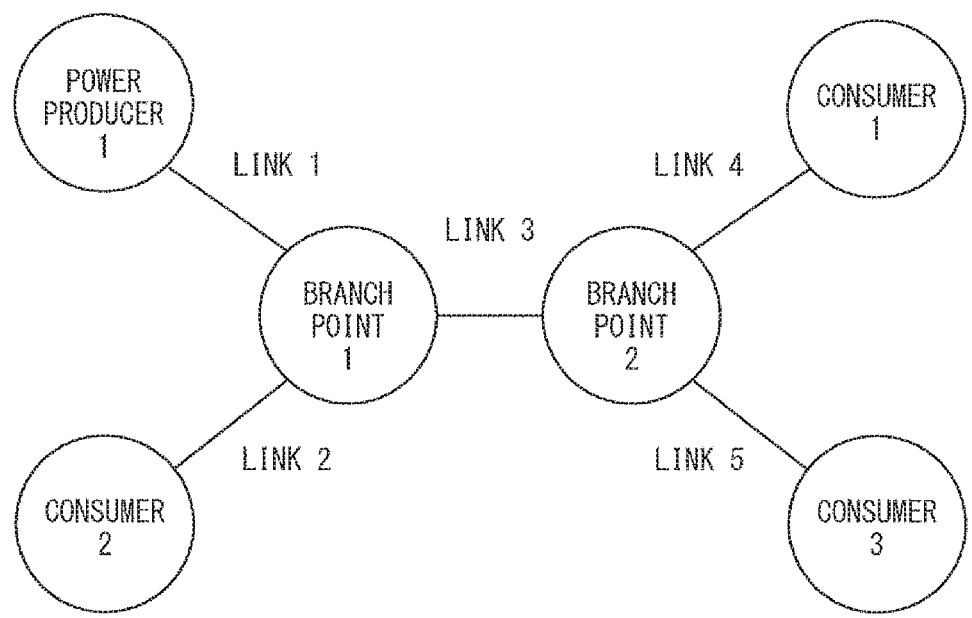
FIG. 22 is a pattern diagram showing an example of a transmission line model which is a model of a transmission line in the third exemplary embodiment of the present invention.

FIG. 22 shows a pattern diagram that models the transmission line between the power generation unit 101 and the consumption unit 102. FIG. 22 is a pattern diagram showing an example of a transmission line model which is a model of a transmission line in the third exemplary embodiment of the present invention. The pattern diagram of FIG. 22 shows the model of the transmission line that is composed of six nodes (one power producer 1 (power generation unit 101), three consumers 1 to 3 (consumption unit 102), and two branch points 1 to 2) and five links (links 1 to 5).

FIG. 23 is a table illustrating, in a table form, an example of topology information for defining a transmission line model in the third exemplary embodiment of the present invention, and it shows the topology information (adjacency matrix) in the transmission line model illustrated in FIG. 22. The intersection in the topology information table of FIG. 23 indicates the connection relationship between nodes of the transmission line model, and "1" is set when there is a link indicating a direct connection between nodes, and "0" is set when there is no link indicating a direct connection.

For example, in the transmission line model of FIG. 22, there is no link indicating a direct connection between the power producer 1 and the consumer 1, and therefore "0" is set for the element at the intersection between the row "power producer 1" or the line "power producer 1" and the line "consumer 1" or the row "consumer 1" in the topology information table of FIG. 23. Further, in the transmission line model of FIG. 22, there is a link indicating a direct connection between the power producer 1 and the branch point 1, and therefore "1" is set for the element at the intersection between the row "power producer 1" or the line "power producer 1" and the line "branch point 1" or the row "branch point 1" in the topology information table of FIG. 23.

Note that the transmission line model shown in FIG. 22 is different according to the form of a transmission line in a microgrid, and the number of nodes such as power producers, consumers and branch points and the number of links that connect the nodes vary, and the topology information (adjacency matrix) defined by the equation (1) also varies accordingly.

<Rule Management Unit 204>

The rule management unit 204 receives the rule set composed of the generation rule, the distribution rule and the loss rule from the outside, and stores the received rule set into the rule storage unit 205 that is defined in FIG. 20. The outside is a consumer, an operator, a power producer, another third-party system (an application or system which generates the rule) or the like. Although the distribution rule and the loss rule in the third exemplary embodiment are respectively different from the distribution rule and the loss rule in the first and second exemplary embodiments, the function of the rule management unit 204 and the generation rule are exactly the same as those in the first and second exemplary embodiments. Examples of the distribution rule and the loss rule that are modified from those in the first and second exemplary embodiments and applied in the third exemplary embodiment are described in detail below.

(Distribution Rule)

The distribution rule is a rule that specifies a distribution condition and a distribution method of attribute information, and specifies to generate the attribute information by using the distribution method that is specified corresponding to the distribution condition when the specified distribution condition is matched. In the third exemplary embodiment, the distribution condition specifies a combination of a power producer identifier and a branch point identifier, and the distribution method specifies information that specifies a distribution destination identifier and specifies the ratio and amount of distribution of on a branch point, for example.

FIG. 24 shows an example of the distribution rule. FIG. 24 is a table illustrating, in a table form, an example of the distribution rule managed by the rule management unit 204 in the third exemplary embodiment of the present invention. The distribution rule illustrated in FIG. 24 shows the case where the distribution condition is information that specifies a power producer identifier in the additive attribute of the attribute information and a branch point identifier for identifying a branch point on the transmission line model, and the distribution method is information that specifies the distribution ratio at each branch point indicated by the branch destination identifier in the distribution condition.

For example, the distribution rule illustrated in FIG. 24 specifies that, when the power producer identifier is the power producer 1 and the branch point identifier is the branch point 1 as the distribution condition, the distribution ratio is 100% and the distribution destination identifier is the branch point 2 as the distribution method at the branch point 1. Specifically, the distribution rule specifies that the distribution condition is matched when the attribute information containing the power producer 1 as the power producer identifier passes the branch point 1, and this attribute information is distributed by 100% to the branch point 2 indicated by the distribution destination identifier as the corresponding distribution method.

Further, the distribution rule specifies that, when the power producer identifier is the power producer 1 and the branch point identifier is the branch point 2 as the distribution condition, the distribution ratio is 100% and the distribution destination identifier is the consumer 1 as the distribution method at the branch point 2. Specifically, the distribution rule specifies that the distribution condition is matched when the attribute information containing the power producer 1 as the power producer identifier passes the branch point 2, and this attribute information is distributed by 100% to the consumer 1 indicated by the distribution destination identifier as the corresponding distribution method.

(Loss Rule)

The loss rule is a rule that specifies a loss condition and a loss method of attribute information, and specifies to subtract the attribute information by using the loss method that is specified corresponding to the loss condition when the specified loss condition is matched. In the third exemplary embodiment, the loss condition specifies a link identifier for identifying a link on the transmission line model, and the loss method specifies the rate and amount of loss in the amount of power in the attribute information on each transmission line indicated by the link identifier, for example.

FIG. 25 shows an example of the loss rule. FIG. 25 is a table illustrating, in a table form, an example of the loss rule managed by the rule management unit 204 in the third exemplary embodiment of the present invention. The loss rule illustrated in FIG. 25 shows the case where the loss condition is a link identifier for identifying a link that connects nodes on the transmission line model and the loss method is information that specifies the loss rate in each link indicated by the link identifier in the loss condition among links that connect nodes on the transmission line model as described above.

For example, the loss rule illustrated in FIG. 25 specifies that, when the link identifier is the link 1 as the loss condition, the loss rate is 10% as the loss method in the link 1. Specifically, the loss rule specifies that the loss condition is matched when the attribute information passes the link 1, and the amount of power in the attribute information is subtracted by 10% as the corresponding loss method.

[Description of Operation Example of Third Exemplary Embodiment]

Figure 26:
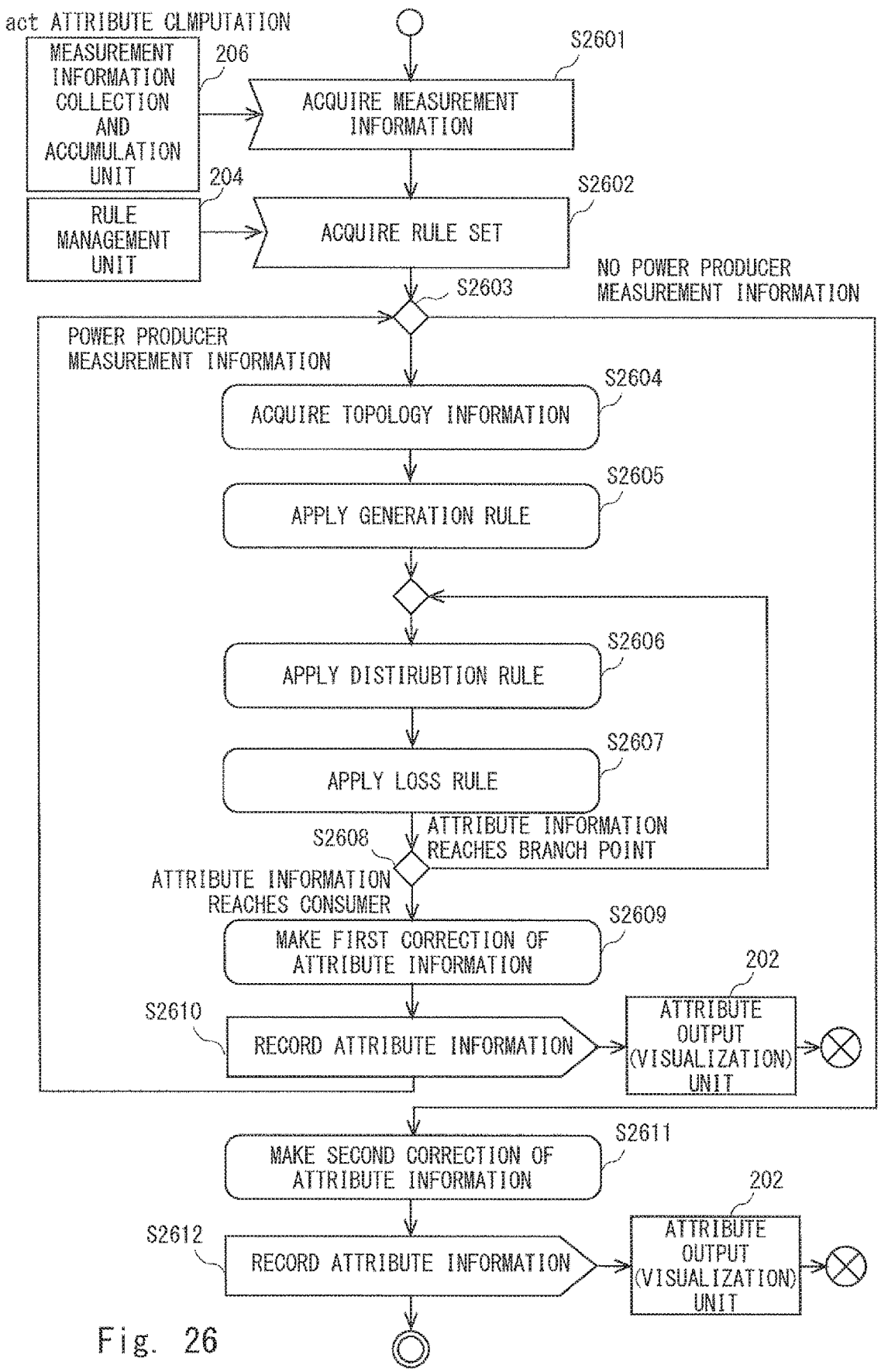
FIG. 26 is a flowchart illustrating an example of an attribute computation operation of the power identification device in the third exemplary embodiment of the present invention.

An example of the overall operation of the power identification device 200 according to the third exemplary embodiment of the present invention is described hereinafter in detail with reference to the flowchart of FIG. 26. FIG. 26 is a flowchart illustrating an example of an attribute computation operation of the power identification device 200 in the third exemplary embodiment of the present invention. Note that, in the third exemplary embodiment, the overall operation related to the power identification of the power identification device 200 is exactly the same as the operation in the first and second exemplary embodiments, and the redundant description is omitted. In the following description, the attribute computation operation of the power identification device 200 in the third exemplary embodiment which is different from the operation in the first and second exemplary embodiments is described in detail, mainly about a difference from the attribute computation operation (the flowchart of FIG. 13) in the first and second exemplary embodiments.

Further, in the following description, the case where the measurement information is the information shown in FIGS. 4A and 4B in the first exemplary embodiment, the generation rule is the rule shown in FIG. 7 in first exemplary embodiment, the distribution rule is the rule shown in FIG. 24, the loss rule is the rule shown in FIG. 25, and the topology information is the information (adjacency matrix) shown in FIG. 23 is specifically described as an example.

The flow of the attribute computation operation of the power identification device 200 is sequentially described with reference to the flowchart of FIG. 26.

(1) Step S2601 to S2603: Acquisition of Measurement Information to Determination on Presence or Absence of Power Producer Measurement Information The operation in these steps is exactly the same as the operation in Steps S1301 to S1303 of FIG. 13 in the first exemplary embodiment, and the redundant description thereof is omitted.

(2) Step S2604: Acquisition of Topology Information

When the attribute computation unit 201 detects that the power producer measurement information exists in Step S2603, it acquires topology information from the topology management unit 215. In this example, the transmission line model illustrated in FIG. 22 is created by acquiring the topology information shown in FIG. 23.

(3) Step S2605: Application of Generation Rule

Then, the attribute computation unit 201 extracts the related generation rule, using the power producer identifier in the power producer measurement information selected in Step S2603 as a key. After that, based on the extracted generation rule, the attribute computation unit 201 generates attribute information from the measurement information of the power producer 1, for example, and places the generated attribute information at the location of the power producer 1, which is the corresponding power producer, in the transmission line model created in Step S2604. In this example, just like in the case of Step S1304 in the first exemplary embodiment of the present invention, the attribute computation unit 201 generates the following attribute information L as the attribute information (values as attribute information are filled in the following items (a), (b), (c) and (e) as a result of this generation operation).

Attribute information (attribute information L) to be generated
    (a) Amount of power: 10 Wh
    (b) Time: 2014/1/1 00:00:00
    (c) Power producer identifier: Power producer 1
    (d) Consumer identifier: Null
    (e) Power source type: Wind power
    (f) Expected amount of power: Null (4) Step S2606: Application of Distribution Rule Then, the attribute computation unit 201 applies the distribution rule acquired in Step S2602 and distributes the attribute information (attribute information L) generated in Step S2605 to the corresponding distribution destination based on the distribution method that matches the distribution condition in the distribution rule. Specifically, the attribute information (attribute information L) is transmitted to the location of the corresponding distribution destination by using the transmission line model created in Step S2604. After the attribute information is transmitted to the branch point as the distribution destination, the attribute information of the distribution source that has been placed is discarded.

Note that, in the case where the attribute information (attribute information L) generated in Step S2605 is placed at the location of the power producer 1 and the distribution condition and the distribution method are not specified as the distribution rule related to the attribute information (attribute information L) as illustrated in the distribution rule of FIG. 24, for example, the attribute information (attribute information L) is transmitted to the branch point 1 to which the power producer 1 is directly connected by using the transmission line model. Then, after the attribute information (attribute information L) is transmitted to the location of the branch point 1 as the branch destination, the attribute information (attribute information L) that has been placed at the location of the power producer 1 is discarded.

Specifically, in the above description in Step S2605, because the attribute information L is placed at the location of the power producer 1, the distribution condition and the distribution method related to this attribute information L placed at the location of the power producer 1 are not specified as the distribution rule shown in FIG. 24. Thus, as described above, the attribute information L is transmitted to the location of the branch point to which the power producer 1 is directly connected by using the transmission line model created in Step S2604.

Since the transmission line model created in Step S2604 has the connection structure shown in FIG. 22, the branch point to which the power producer 1 is directly connected through the link 1 is the branch point 1. Thus, the attribute information L that has been located at the power producer 1 is transmitted to the branch point 1, and then the attribute information L that has been located at the power producer 1 is discarded.

(5) Step S2607: Application of Loss Rule

After the attribute information L is transmitted to the branch point 1 in Step S2606, the attribute computation unit 201 applies the loss rule of FIG. 25 and changes the amount of power in the attribute information L to a value obtained by subtracting, from the amount of power in the attribute information L, a loss of the link 1 used when transmitting the attribute information L from the power producer 1 to the branch point 1 in Step S2606. Further, in the case where the destination of the transmission of the attribute information L that is transmitted to the branch point 1 in Step S2606 is a consumer, the same value as the amount of power after the subtraction is set as the expected amount of power in the attribute information L.

Note that the loss rule of FIG. 25 specifies that the loss rate of the link 1 used when transmitting the attribute information L from the power producer 1 to the branch point 1 is 10%, and the amount of power as the primary attribute in the attribute information L is 10 Wh. Thus, by applying the loss rule, the amount of power in the attribute information L is 9 Wh (=10 Wh×9/10). As a result, the attribute computation unit 201 updates the attribute information L placed at the location of the branch point 1 to the following attribute information M as the attribute information after application of the loss rule (a value as attribute information is filled in the following item (a) as a result of the update operation). Note that, because the distribution destination of the attribute information L in Step S2606 is not a consumer but the branch point 1, the expected amount of power in the attribute information L is not changed. Further, by the update to the attribute information M, the attribute information L is deleted.

Attribute information (attribute information M) newly generated by update:
    (a) Amount of power: 9 Wh
    (b) Time: 2014/1/1 00:00:00
    (c) Power producer identifier: Power producer 1
    (d) Consumer identifier: Null
    (e) Power source type: Wind power
    (f) Expected amount of power: Null (6) Step S2608: Determination of Location of Attribute Information After that, the attribute computation unit 201 determines the present location of the attribute information (attribute information M) that has been transmitted as a result of application of the distribution rule in Step S2606, and when the location of the attribute information (attribute information L) is a branch point, the process returns to Step S2606 and performs the operation in Steps S2606 to S2608 until the location of the attribute information (attribute information L) reaches a consumer. When the attribute information finally reaches the location of a consumer, the process ceases to continue the repetitive operation and proceeds to Step S2609.

In the case of the topology information in FIG. 23 and the transmission line model in FIG. 22, the present location of the attribute information (attribute information M) is the branch point 1, and the consumer as the final destination of transmission of the attribute information (attribute information M) is the consumer 1 as specified in the distribution rule in FIG. 24. Therefore, the attribute information (attribute information M) related to the power producer 1 is first transmitted from the branch point 1, which is the present location, to the branch point 2 through the link 3 according to the distribution rule in FIG. 24. After that, the attribute information (attribute information M) that has been located at the branch point 1 is discarded. After the attribute computation unit 201 transmits the attribute information (attribute information M) from the branch point 1 to the branch point 2, it applies the loss rule in FIG. 25 and changes the amount of power in the attribute information M to a value obtained by subtracting, from the amount of power in the attribute information M, a loss of the link 3 used when transmitting the attribute information (attribute information M) from the branch point 1 to the branch point 2 in Step S2606.

Note that the loss rule of FIG. 25 specifies that the loss rate of the link 3 used when transmitting the attribute information M from the branch point 1 to the branch point 2 is 10%, and the amount of power as the primary attribute in the attribute information M is 9 Wh. Thus, by applying the loss rule, the amount of power in the attribute information M is 8.1 Wh (=9 Wh×9/10). Note that, because the distribution destination of the attribute information M is not a consumer but the branch point 2, the expected amount of power in the attribute information M is not changed. As a result, the attribute computation unit 201 updates the attribute information M placed at the location of the branch point 2 to the following attribute information N as the attribute information after application of the loss rule (a value as attribute information is filled in the following item (a) as a result of the update operation). By the update to the attribute information N, the attribute information M is deleted.

Attribute information (attribute information N) newly generated by update:
(a) Amount of power: 8.1 Wh
(b) Time: 2014/1/1 00:00:00
(c) Power producer identifier: Power producer 1
(d) Consumer identifier: Null
(e) Power source type: Wind power
(f) Expected amount of power: Null After that, the process returns to Step S2606, and when the attribute information (attribute information N) related to the power producer 1 whose location has reached the branch point 2 is transmitted from the branch point 2, which is the present location, to the consumer 1 through the link 4 according to the distribution rule in FIG. 24 in the case of the topology information in FIG. 23 and the transmission line model in FIG. 22, the attribute information (attribute information N) that has been located at the branch point 2 is discarded. The attribute computation unit 201 then applies the loss rule in FIG. 25 and changes the amount of power in the attribute information N to a value obtained by subtracting, from the amount of power in the attribute information N, a loss of the link 4 used when transmitting the attribute information (attribute information N) from the branch point 2 to the consumer 1 in Step S2606.

Note that the loss rule of FIG. 25 specifies that the loss rate of the link 4 used when transmitting the attribute information N from the branch point 2 to the consumer 1 is 10%, and the amount of power as the primary attribute in the attribute information N is 8.1 Wh. Thus, by applying the loss rule, the amount of power in the attribute information N is 7.29 Wh (=8.1 Wh×9/10). Note that, because the distribution destination of the attribute information N is the consumer 1, the consumer identifier in the attribute information N is changed to the consumer 1, and the expected amount of power is set to the same value as the amount of power as the primary attribute after change. As a result, the attribute computation unit 201 updates the attribute information N to the following attribute information O as the attribute information after application of the loss rule (values as attribute information are filled in the following items (a), (d) and (f) as a result of the update operation). By the update to the attribute information O, the attribute information N is deleted.

Attribute information (attribute information O) newly generated by update:
(a) Amount of power: 7.29 Wh
(b) Time: 2014/1/1 00:00:00
(c) Power producer identifier: Power producer 1
(d) Consumer identifier: Consumer 1
(e) Power source type: Wind power
(f) Expected amount of power: 7.29 Wh (7) Step S2609: First Correction of Attribute Information When the attribute information (attribute information O) finally reaches the consumer 1 in Step S2608, the attribute computation unit 201 compares the amount of power that is set to the attribute information (attribute information O) distributed to the consumer 1 with the amount of power contained in the measurement information of the consumer 1 acquired in Step S2601, and corrects a deviation of the amount of power in the attribute information (attribute information O). In the third exemplary embodiment, the operation is different from the operation in Step S1308 (first correction of attribute information) of FIG. 13 in the first exemplary embodiment in the following point. Specifically, when "the amount of power in attribute information<the amount of power in measurement information" is satisfied, the same operation as the operation in Step S1308 in the first exemplary embodiment is performed, whereas when "the amount of power in attribute information>the amount of power in measurement information" is satisfied, a different operation is performed as follows.

(A) in Case of "the Amount of Power in Attribute Information>the Amount of Power in Measurement Information"

In this case, the amount of power that is actually consumed by the consumer 1 to whom the entire amount of power is to be distributed from the power producer 1 is smaller than the amount of power that is set to the attribute information (attribute information O), and the attribute information that has the amount of power corresponding to the amount of power in the measurement information of the consumer 1 (the amount of power to be actually consumed) can be distributed from the power producer 1 to the consumer 1. Thus, the amount of power in the measurement information of the consumer 1 is set as the amount of power as the primary attribute of the attribute information (attribute information O), and distribution to the consumer 1 is finalized. Although, in the first exemplary embodiment, the amount of power is calculated as "the amount of power in the attribute information–the amount of power in the consumer measurement information" and further the amount of power where application of a loss by the loss rule is cancelled is further calculated, and then the attribute information in which the calculated amount of power is set is generated as the second attribute information, which is the attribute information related to the excess amount of power that remains without being distributed to the consumer 1, such an operation of generating the second attribute information is not performed in the third exemplary embodiment.

Note that because the above-described specific example corresponds to the case where "the amount of power (7.29 Wh) in the attribute information O<the amount of power (15 Wh) in the measurement information", the attribute information O from the power producer 1 can be entirely distributed to the consumer 1, and distribution to the consumer 1 is finalized. Further, the amount of power (7.29 Wh) in the attribute information that is distributed to the consumer 1 is subtracted from the amount of power (15 Wh) in the measurement information of the consumer 1, and the remaining amount of power (7.71 Wh) is set as a new amount of power in the measurement information related to the consumer 1.

Note that, as another example for further description, the case is described where the amount of power in the measurement information related to the consumer 1 acquired in Step S2601 is 5 Wh. Because this corresponds to the case where "the amount of power (7.29 Wh) in the attribute information O>the amount of power (5 Wh) in the measurement information", the attribute information O is updated by the first correction as described above, and the attribute information P in which the amount of power 5 Wh in the measurement information is set as the amount of power as the primary attribute of the primary attribute is generated, and distribution to the consumer 1 is finalized. A value as attribute information in the following item (a) is changed in the attribute information P. After generating the attribute information P, the original attribute information O is deleted. Note that the remaining attribute information (the amount of power 7.29 Wh−5 Wh=2.29 Wh) that has not been distributed to the consumer 1 is deleted in the third exemplary embodiment, without generating the second attribute information as described above. Further, the measurement information (5 Wh) related to the consumer 1 to whom the attribute information P is distributed is also deleted.

Attribute information (attribute information P) newly generated by first correction:
(a) Amount of power: 5 Wh
(b) Time: 2014/1/1 00:00:00
(c) Power producer identifier: Power producer 1
(d) Consumer identifier: Consumer 1
(e) Power source type: Wind power
(f) Expected amount of power: 7.29 Wh (8) Step S2610: Recording of Attribute Information After finalizing the distribution of the attribute information P to the consumer by the first correction in Step S2609, the attribute computation unit 201 passes the attribute information P to the attribute output (visualization) unit 202 so that it is stored into the attribute information storage unit 203 defined in FIG. 20, and then the process returns to the operation of Step S2603.

(9) Step S2611: Second Correction of Attribute Information

When, in Step S2603, it reaches the state where the measurement information of the next power producer to be processed does not exist, the process proceeds to Step S2611, and the attribute computation unit 201 performs the second correction based on the consumer measurement information that remains as a result of the computation from Steps S2601 to S2610. In the above-described specific example, the following consumer measurement information remains.

—Remaining consumer measurement information—

The consumer identifier is the consumer 1, the time when the amount of power consumption is measured is 2014/1/1 00:00:00, and the amount of power consumption is 7.71 Wh.

Thus, in the second correction in Step S2611, attribute information is virtually generated for the remaining consumer measurement information as described above and distributed to the consumer. To be specific, the attribute information in which the amount of power in the remaining consumer measurement information is set as the amount of power, the time in this consumer measurement information is set as the time, Any is set as the power producer identifier, the consumer identifier in this consumer measurement information is set as the consumer identifier, Any is set as the power source type, and Null is set as the expected amount of power is generated. Specifically, the attribute computation unit 201 newly generates the following attribute information Q by the second correction (values as attribute information are filled in the following items (a), (b) and (d).

Attribute information (attribute information Q) generated by second correction:
(a) Amount of power: 7.71 Wh
(b) Time: 2014/1/1 00:00:00
(c) Power producer identifier: Any
(d) Consumer identifier: Consumer 1
(e) Power source type: Any
(f) Expected amount of power: Null

(10) Step S2612: Recording of Attribute Information

After performing the second correction of the attribute information in Step S2611, the attribute computation unit 201 finally passes information about the attribute information of which distribution to the consumer is finalized to the attribute output (visualization) unit 202 so that it is stored into the attribute information storage unit 203 defined in FIG. 2, and then the computation operation of the attribute computation unit 201 ends.

[Description of Effects of Third Exemplary Embodiment]

The effects of the third exemplary embodiment are described hereinafter. In the third exemplary embodiment, the topology management unit 215 that receives from the outside and manages topology information (branch points and links) for defining the transmission line model which is a model of the transmission line between the power generation unit 101 and the consumption unit 102 is newly added to the power identification device 200 in the first and second exemplary embodiments, and therefore, by referring to the topology information (branch points and links) of the actual transmission route when transmitting attribute information from a power producer to a consumer, it is possible to distribute more accurate attribute information to the consumer even when a transmission line loss is not uniform, for example.

Although a power loss is specified by the loss rate [%] as the loss rule that is applied in the attribute computation unit 201 in the third exemplary embodiment, it may be specified by the amount of power loss itself.

Alternatively, it may be specified by using a mathematical expression for calculating a loss as represented by the following equation (2).

$$L = \alpha \cdot I^2 \qquad (2)$$

In the equation (2), α is a constant, and it shows that lost power L[Wh] is proportional to the square of current I. When the loss rule is specified using such an equation (2), a loss in the link 3 is calculated as follows when transmitting the attribute information generated based on the measurement information of the power producer 1 from the branch point 1 to the branch point 2 through the link 3, for example, in Step S2607 in the flowchart of FIG. 26 in the third exemplary embodiment.

(Step E1):

First, the sum of "the amounts of power" in all of the attribute information transmitted through the link 3 is calculated. Specifically, all of the attribute information transmitted through the link 3 are specified by repeatedly performing the operations from Step S2603 to Step S2610 for all of the attribute information generated based on all of the power producer measurement information, and the sum of "the amounts of power" in all of the specified attribute information is calculated.

(Step E2):

Next, a loss in the link 3 is calculated by using the sum of "the amounts of power" in all of the attribute information transmitted through the link 3. Specifically, based on the sum PW of "the amounts of power" and the voltage V of the link 3, the current value I (=sum PW of "the amounts of power"/voltage V) is calculated. It is assumed that the voltage V of the link 3 is provided in advance from an operator. After that, the calculated current value I is substituted into the above equation (2) to thereby calculate a loss in the link 3.

[Supplementary Notes]

As is obvious from the detailed description of the exemplary embodiments of the present invention, the whole or part of the exemplary embodiments disclosed above can be described as, but not limited to, the following supplementary notes. It should noted that, although the present invention relates to a power identification device, a power identification method, and a power identification program as described above, it may be further implemented in some cases as a power identification system that includes the power generation unit 101, the consumption unit 102 and the power identification device 200 as described also in FIG. 1. Exemplary embodiments related to the power identification system are also described below.

(Supplementary Note 1)

A power identification device that identifies performance of power supply from a power producer to a consumer, at least comprising:

a measurement information acquisition means for acquiring an amount of power generation by the power producer and an amount of power consumption by the consumer from a power generation unit and a consumption unit, respectively, as measurement information at predetermined intervals;

a rule management means for managing a generation rule for generating attribute information containing a primary attribute related to each of the amount of power generation and the amount of power consumption and an additive attribute related to the amount of power generation, a distribution rule for distributing the attribute information to the consumer through a transmission line in accordance with the consumer's preferences, and a loss rule for specifying a loss on the transmission line;

an attribute computation means for generating the attribute information from the measurement information based on the generation rule, and distributing the generated attribute information from the power producer to the consumer through the transmission line based on the distribution rule and the loss rule; and an attribute output means for storing the attribute information and outputting the attribute information to outside.

(Supplementary Note 2)

The power identification device according to Supplementary note 1, wherein the attribute information contains a primary attribute at least containing information about the amount of power generation and a time when the amount of power generation is measured, and an additive attribute containing any one or a plurality of information items about a power source type of the amount of power generation, an expected value of the amount of power consumed by the consumer, a power producer identifier for identifying the power producer, a consumer identifier for identifying the consumer, a price of power supplied from the power producer, an environmental burden and an area.

(Supplementary Note 3)

The power identification device according to Supplementary note 1 or 2, wherein the generation rule specifies a generation condition and a generation method of the attribute information, and when the generation condition is matched, the attribute information is generated by the specified generation method corresponding to the generation condition.

(Supplementary Note 4)

The power identification device according to Supplementary note 3, wherein the generation condition in the generation rule is designated by a power producer identifier for identifying the power producer, and the generation method is designated by information about details of attributes for generating the attribute information in accordance with the amount of power generation and, when adding a plurality of attributes, information for specifying a ratio or amount of each of the attributes.

(Supplementary Note 5)

The power identification device according to Supplementary note 3, wherein the generation condition in the generation rule is designated by a power producer identifier for identifying the power producer, and the generation method is designated by information for specifying a ratio of the power source type of the power producer.

(Supplementary Note 6)

The power identification device according to any one of Supplementary notes 1 to 5, wherein the distribution rule specifies a distribution condition and a distribution method of the attribute information, and when the distribution condition is matched, the attribute information is distributed by the distribution method specified corresponding to the distribution condition.

(Supplementary Note 7)

The power identification device according to Supplementary note 6, wherein the distribution condition in the distribution rule is designated by a power producer identifier for identifying the power producer, and the distribution method is designated by a consumer identifier for identifying the consumer and information for specifying a distribution ratio or a distribution amount of the attribute information in accordance with the consumer's preferences.

(Supplementary Note 8)

The power identification device according to Supplementary note 6, wherein the distribution condition in the distribution rule is designated by a power producer identifier for identifying the power producer and a consumer identifier for identifying the consumer, and the distribution method is designated by information for specifying a distribution ratio or a distribution amount of the attribute information in accordance with the consumer's preferences.

(Supplementary Note 9)

The power identification device according to Supplementary note 7 or 8, wherein the distribution method in the distribution rule is designated by information for specifying a distribution ratio or a distribution amount of the attribute information in accordance with a contract between the power producer and the consumer or a service menu provided to the consumer, instead of a distribution ratio or a distribution amount of the attribute information in accordance with the consumer's preferences.

(Supplementary Note 10)

The power identification device according to any one of Supplementary notes 1 to 5, wherein the distribution rule specifies that the attribute information is equally distributed from the power producer to each consumer who desires to receive power supply from the power producer, or the attribute information is equally distributed from the power producer to each consumer to whom the power producer desires to make power supply.

(Supplementary Note 11)

The power identification device according to any one of Supplementary notes 1 to 10, wherein the loss rule specifies a loss condition and a loss method of the attribute information, and when the loss condition is matched, the amount of power generation in the attribute information is subtracted by the loss method specified corresponding to the loss condition.

(Supplementary Note 12)

The power identification device according to Supplementary note 11, wherein the loss condition in the loss rule is designated by a power producer identifier for identifying the power producer and a consumer identifier for identifying the consumer, and the loss method is designated by information for specifying a loss rate or a loss amount of the amount of power in the attribute information on a transmission line for transmitting the attribute information from the power producer to the consumer.

(Supplementary Note 13)

The power identification device according to any one of Supplementary notes 1 to 10, wherein the loss rule is set as a rule to be commonly applied to all sections of the transmission line or set for each combination of the power producer and the consumer.

(Supplementary Note 14)

The power identification device according to any one of Supplementary notes 1 to 13, further comprising:

a virtual measurement information acquisition means for generating, as virtual measurement information, the amount of power to offset a difference between a sum of the amount of power generation and a sum of the amount of power consumption.

(Supplementary Note 15)

The power identification device according to Supplementary note 14, wherein information containing the virtual measurement information generated by the virtual measurement information acquisition means is used as the measurement information to be used when generating the attribute information by the attribute computation means.

(Supplementary Note 16)

The power identification device according to any one of Supplementary notes 1 to 15, further comprising:

an actuation means for controlling charge and discharge of an electric storage device included in the consumption unit of the consumer based on the attribute information.

(Supplementary Note 17)

The power identification device according to Supplementary note 16, wherein the actuation means outputs a charge/discharge control instruction for the electric storage device to the consumption unit of the corresponding consumer in accordance with a difference between the amount of power generation and the expected amount of power consumption by the consumer in the attribute information.

(Supplementary Note 18)

The power identification device according to Supplementary note 16, wherein the actuation means outputs a charge/discharge control instruction for the electric storage device to the consumption unit of the corresponding consumer in accordance with the amount of power generation in the attribute information.

(Supplementary Note 19)

The power identification device according to Supplementary note 16, wherein the actuation means outputs a charge/discharge control instruction for the electric storage device to the consumption unit of the corresponding consumer in accordance with a difference between a sum of the amounts of power generation in all the attribute information allocated to the arbitrary consumer and the amount of power generation in the specific attribute information.

(Supplementary Note 20)

The power identification device according to Supplementary note 16, wherein the actuation means outputs a charge/discharge control instruction for an electric storage device included in the power generation unit to the power generation unit of the power producer, not to the consumption unit of the consumer.

(Supplementary Note 21)

The power identification device according to any one of Supplementary notes 1 to 20, further comprising:

a topology management means for managing topology information of a transmission line for distributing the attribute information from the power producer to the consumer.

(Supplementary Note 22)

The power identification device according to Supplementary note 21, wherein the topology management means models the transmission line for transmitting the attribute information as a transmission line model by nodes indicating the power producer, the consumer and branch points on the transmission line and links between the nodes, and manages the topology information as an adjacency matrix by using the nodes and the links on the transmission line model.

(Supplementary Note 23)

The power identification device according to Supplementary note 22, wherein the distribution condition in the distribution rule is designated by a power producer identifier for identifying each of the power producer and a branch point identifier for identifying each of the branch points among the nodes on the transmission line model, and the distribution method is designated by information for specifying a distribution ratio or a distribution amount to each distribution destination on each of the branch points.

(Supplementary Note 24)

The power identification device according to Supplementary note 22 or 23, wherein the loss condition in the loss rule is designated by a link identifier for identifying each of the links on the transmission line model, and the loss method is designated by information for specifying a loss rate or a loss amount of each of the links.

(Supplementary Note 25)

The power identification device according to any one of Supplementary notes 22 to 24, wherein when distributing the attribute information from the power producer to the consumer, the attribute computation means transmits the attribute information on the transmission line model and distributes the attribute information at each of the branch points based on the distribution rule, and subtracts a loss on each of the links from the amount of power generation in the attribute information based on the loss rule.

(Supplementary Note 26)

The power identification device according to any one of Supplementary notes 1 to 26, wherein the attribute output means outputs the attribute information to the outside that is any one or a plurality of the consumer, an operator, the power producer and a third party.

(Supplementary Note 27)

A power identification method that identifies performance of power supply from a power producer to a consumer, at least comprising:

a measurement information acquisition step of acquiring an amount of power generation by the power producer and an amount of power consumption by the consumer from a power generation unit and a consumption unit, respectively, as measurement information at predetermined intervals;

a rule management step of managing a generation rule for generating attribute information containing a primary attribute related to each of the amount of power generation and the amount of power consumption and an additive attribute related to the amount of power generation, a distribution rule for distributing the attribute information to the consumer through a transmission line in accordance with the consumer's preferences, and a loss rule for specifying a loss on the transmission line;

an attribute computation step of generating the attribute information from the measurement information based on the generation rule, and distributing the generated attribute information from the power producer to the consumer through the transmission line based on the distribution rule and the loss rule; and an attribute output step of storing the attribute information and outputting the attribute information to an outside.

(Supplementary Note 28)

The power identification method according to Supplementary note 27, wherein the attribute information contains a primary attribute at least containing information about the amount of power generation and a time when the amount of power generation is measured, and an additive attribute containing any one or a plurality of information about a power source type of the amount of power generation, an expected amount of power by the consumer, a power producer identifier for identifying the power producer, a consumer identifier for identifying the consumer, a price of power supplied from the power producer, an environmental burden and an area.

(Supplementary Note 29)

The power identification method according to Supplementary note 27 or 28, wherein the generation rule specifies a generation condition and a generation method of the attribute information, and when the generation condition is matched, the attribute information is generated by the generation method specified corresponding to the generation condition.

(Supplementary Note 30)

The power identification method according to any one of Supplementary notes 27 to 29, wherein the distribution rule specifies a distribution condition and a distribution method of the attribute information, and when the distribution condition is matched, the attribute information is distributed by the distribution method specified corresponding to the distribution condition.

(Supplementary Note 31)

The power identification method according to any one of Supplementary notes 27 to 30, wherein the loss rule specifies a loss condition and a loss method of the attribute information, and when the loss condition is matched, the amount of power generation in the attribute information is subtracted by the loss method specified corresponding to the loss condition.

(Supplementary Note 32)

The power identification method according to any one of Supplementary notes 27 to 31, further comprising:

a virtual measurement information acquisition step of generating the amount of power to offset a difference between a sum of the amount of power generation and a sum of the amount of power consumption.

(Supplementary Note 33)

The power identification method according to any one of Supplementary notes 27 to 32, further comprising:

an actuation step of controlling charge and discharge of an electric storage device included in the consumption unit of the consumer based on the attribute information.

(Supplementary Note 34)

The power identification method according to any one of Supplementary notes 27 to 33, further comprising:

a topology management step of managing topology information of a transmission line for distributing the attribute information from the power producer to the consumer.

(Supplementary Note 35)

A power identification program that performs the power identification method according to any one of Supplementary notes 27 to 34 as a computer executable program.

(Supplementary Note 36)

A power identification system that identifies performance of power supply from a power producer to a consumer, at least comprising:

a power generation unit that at least includes a power generation information output means for measuring an amount of power generated by the power producer and outputting information about the measured amount of power to an outside;

a consumption unit that at least includes a consumption information output means for measuring an amount of power consumed by the consumer and outputting information about the measured amount of power to an outside;

a measurement information acquisition means for acquiring an amount of power generation by the power producer and an amount of power consumption by the consumer from the power generation unit and the consumption unit, respectively, as measurement information at predetermined intervals;

a rule management means for managing a generation rule for generating attribute information, a distribution rule for distributing the attribute information to the consumer through a transmission line in accordance with the consumer's preferences, and a loss rule for specifying a loss on the transmission line, the attribute information containing a primary attribute related to each of the amount of power generation and the amount of power consumption and an additive attribute related to the amount of power generation;

an attribute computation means for generating the attribute information from the measurement information based on the generation rule, and distributing the generated attribute information from the power producer to the consumer through the transmission line based on the distribution rule and the loss rule; and an attribute output means for storing the attribute information and outputting the attribute information to an outside.

(Supplementary Note 37)

The power identification system according to Supplementary note 36, wherein the consumption unit further includes an electric storage device, and a control instruction receiving means for receiving a charge/discharge control instruction from an outside, and the electric storage device is charged or discharged in response to the charge/discharge control instruction received by the control instruction receiving means.

(Supplementary Note 38)

The power identification system according to Supplementary note 36 or 37, wherein the power generation unit further includes
an electric storage device, and
a control instruction receiving means for receiving a charge/discharge control instruction from an outside, and the electric storage device is charged or discharged in response to the charge/discharge control instruction received by the control instruction receiving means.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

101 POWER GENERATION UNIT
102 CONSUMPTION UNIT
103 TRANSMISSION AND DISTRIBUTION NETWORK
200 POWER IDENTIFICATION DEVICE (POWER IDENTIFICATION UNIT)
201 ATTRIBUTE COMPUTATION UNIT
202 ATTRIBUTE OUTPUT (VISUALIZATION) UNIT
203 ATTRIBUTE INFORMATION STORAGE UNIT
204 RULE MANAGEMENT UNIT
205 RULE STORAGE UNIT
206 MEASUREMENT INFORMATION COLLECTION AND ACCUMULATION UNIT
207 MEASUREMENT INFORMATION STORAGE UNIT
208 VIRTUAL MEASUREMENT INFORMATION ACQUISITION UNIT
209 VIRTUAL POWER GENERATION UNIT
210 VIRTUAL CONSUMPTION UNIT
211 MEASUREMENT INFORMATION ACQUISITION UNIT
212 POWER GENERATION INFORMATION ACQUISITION UNIT
213 CONSUMPTION INFORMATION ACQUISITION UNIT
214 ACTUATION UNIT
215 TOPOLOGY MANAGEMENT UNIT
216 TOPOLOGY STORAGE UNIT
1101 BUS
1102 PROCESSOR
1103 MEMORY
1104 STORAGE
1104a ATTRIBUTE COMPUTATION MODULE
1104b ATTRIBUTE OUTPUT MODULE
1104c RULE MANAGEMENT MODULE
1104d MEASUREMENT INFORMATION COLLECTION AND ACCUMULATION MODULE
1104e VIRTUAL MEASUREMENT INFORMATION ACQUISITION MODULE
1104f MEASUREMENT INFORMATION ACQUISITION MODULE
1105 INPUT/OUTPUT INTERFACE

The invention claimed is:

1. A power identification device that identifies performance of power supply from a power producer to a consumer, at least comprising:

a measurement information acquisition unit configured to acquire an amount of power generation by the power producer and an amount of power consumption by the consumer from a power generation unit and a consumption unit, respectively, as measurement information at predetermined intervals;

a rule management unit configured to manage a generation rule for generating attribute information, a distribution rule for distributing the attribute information to the consumer through a transmission line in accordance with the consumer's preference, and a loss rule for specifying a loss on the transmission line, the attribute information containing a primary attribute related to each of the amount of power generation and the amount of power consumption and an additive attribute related to the amount of power generation;

an attribute computation unit configured to generate the attribute information from the measurement information based on the generation rule, and distribute the generated attribute information from the power producer to the consumer through the transmission line based on the distribution rule and the loss rule; and an attribute output unit configured to store the attribute information and output the attribute information to outside.

2. The power identification device according to claim 1, wherein the attribute information contains a primary attribute at least containing information about the amount of power generation and a time when the amount of power generation is measured, and an additive attribute containing any one or a plurality of information items about a power source type of the amount of power generation, an expected amount of power consumed by the consumer, a power producer identifier for identifying the power producer, a consumer identifier for identifying the consumer, a price of power supplied from the power producer, an environmental burden and an area.

3. The power identification device according to claim 1, wherein the generation rule specifies a generation condition and a generation method of the attribute information, and when the generation condition is matched, the attribute information is generated by the specified generation method corresponding to the generation condition.

4. The power identification device according to claim 1, wherein the distribution rule specifies a distribution condition and a distribution method of the attribute information, and when the distribution condition is matched, the attribute information is distributed by the distribution method specified corresponding to the distribution condition.

5. The power identification device according to claim 1, wherein the loss rule specifies a loss condition and a loss method of the attribute information, and when the loss condition is matched, the amount of power generation in the attribute information is subtracted by the loss method specified corresponding to the loss condition.

6. The power identification device according to claim 1, further comprising a virtual measurement information acquisition unit configured to generate the amount of power to offset a difference between a sum of the amount of power generation and a sum of the amount of power consumption.

7. The power identification device according to claim 1, further comprising an actuation unit configured to control charge and discharge of an electric storage device included in the consumption unit of the consumer based on the attribute information.

8. The power identification device according to claim 1, further comprising
a topology management unit configured to manage topology information of a transmission line for distributing the attribute information from the power producer to the consumer.

9. A power identification method that identifies performance of power supply from a power producer to a consumer, at least comprising:
a measurement information acquisition step of acquiring an amount of power generation by the power producer and an amount of power consumption by the consumer from a power generation unit and a consumption unit, respectively, as measurement information at predetermined intervals;
a rule management step of managing a generation rule for generating attribute information, a distribution rule for distributing the attribute information to the consumer through a transmission line in accordance with the consumer's preferences, and a loss rule for specifying a loss on the transmission line, the attribute information containing a primary attribute related to each of the amount of power generation and the amount of power consumption and an additive attribute related to the amount of power generation;
an attribute computation step of generating the attribute information from the measurement information based on the generation rule, and distributing the generated attribute information from the power producer to the consumer through the transmission line based on the distribution rule and the loss rule; and
an attribute output step of storing the attribute information and outputting the attribute information to outside.

10. A non-transitory computer readable medium storing a power identification program causing a computer to execute the power identification method according to claim 9.

11. The power identification device according to claim 3, wherein the generation condition in the generation rule is designated by a power producer identifier for identifying the power producer, and the generation method is designated by information about details of attributes for generating the attribute information in accordance with the amount of power generation and, when adding a plurality of attributes, information for specifying a ratio or amount of each of the attributes.

12. The power identification device according to claim 3, wherein the generation condition in the generation rule is designated by a power producer identifier for identifying the power producer, and the generation method is designated by information for specifying a ratio of the power source type of the power producer.

13. The power identification device according to claim 4, wherein the distribution condition in the distribution rule is designated by a power producer identifier for identifying the power producer, and the distribution method is designated by a consumer identifier for identifying the consumer and information for specifying a distribution ratio or a distribution amount of the attribute information in accordance with the consumer's preferences.

14. The power identification device according to claim 4, wherein the distribution condition in the distribution rule is designated by a power producer identifier for identifying the power producer and a consumer identifier for identifying the consumer, and the distribution method is designated by information for specifying a distribution ratio or a distribution amount of the attribute information in accordance with the consumer's preferences.

15. The power identification device according to claim 13, wherein the distribution method in the distribution rule is designated by information for specifying a distribution ratio or a distribution amount of the attribute information in accordance with a contract between the power producer and the consumer or a service menu provided to the consumer, instead of a distribution ratio or a distribution amount of the attribute information in accordance with the consumer's preferences.

16. The power identification device according to claim 1, wherein the distribution rule specifies that the attribute information is equally distributed from the power producer to each consumer who desires to receive power supply from the power producer, or the attribute information is equally distributed from the power producer to each consumer to whom the power producer desires to make power supply.

17. The power identification device according to claim 5, wherein the loss condition in the loss rule is designated by a power producer identifier for identifying the power producer and a consumer identifier for identifying the consumer, and the loss method is designated by information for specifying a loss rate or a loss amount of the amount of power in the attribute information on a transmission line for transmitting the attribute information from the power producer to the consumer.

18. The power identification device according to claim 1, wherein the loss rule is set as a rule to be commonly applied to all sections of the transmission line or set for each combination of the power producer and the consumer.

19. The power identification device according to claim 6, wherein information containing the virtual measurement information is used as the measurement information to be used when generating the attribute information.

20. The power identification device according to claim 1, wherein the outside, from which the attribute information is output, is any one or a plurality of the consumer, an operator, the power producer and a third party.

* * * * *